(12) United States Patent
Kubota et al.

(10) Patent No.: US 6,355,314 B1
(45) Date of Patent: Mar. 12, 2002

(54) MACROMOLECULAR DISPERSION TYPE LIQUID CRYSTAL DISPLAY ELEMENT AND METHOD OF MANUFACTURING THE SAME

(75) Inventors: Hirofumi Kubota, Osaka; Shinya Kosako, Kadoma; Kenji Nakao, Osaka; Noriko Naito, Ishikawa-gun; Tsuyoshi Uemura, Kadoma; Masao Yamamoto, Kishiwada, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/712,126

(22) Filed: Nov. 15, 2000

Related U.S. Application Data

(63) Continuation of application No. 09/068,451, filed as application No. PCT/JP97/03266 on Sep. 16, 1997, now abandoned.

(30) Foreign Application Priority Data

| | | |
|---|---|---|
| Sep. 13, 1996 | (JP) | 8-242755 |
| Nov. 21, 1996 | (JP) | 8-310335 |
| Nov. 28, 1996 | (JP) | 8-317509 |
| Dec. 20, 1996 | (JP) | 8-341013 |
| May 1, 1997 | (JP) | 9-113782 |

(51) Int. Cl.⁷ .............. C09K 19/38; G02F 1/1333; B32B 5/16
(52) U.S. Cl. .............. 428/1.1; 252/299.01; 349/86; 349/88; 349/89; 349/92; 428/402.2
(58) Field of Search .............. 252/299.01; 349/86, 349/88, 89, 92; 428/1.1, 402.2

(56) References Cited

U.S. PATENT DOCUMENTS

| | | | |
|---|---|---|---|
| 5,641,426 A | 6/1997 | Nerad et al. | 212/299.1 |
| 5,867,238 A | 2/1999 | Miller et al. | 349/92 |
| 6,093,344 A | * 7/2000 | Park et al. | 252/299.01 |
| 6,221,443 B1 | * 4/2001 | Kubota et al. | 428/1.1 |

FOREIGN PATENT DOCUMENTS

| | | |
|---|---|---|
| JP | 3-46620 | 2/1991 |
| JP | 3-107819 | 5/1991 |
| JP | 4-186221 | 7/1992 |
| JP | 4-309922 | 11/1992 |
| JP | 4-329517 | 11/1992 |
| JP | 5-127174 | 5/1993 |
| JP | 5-203931 | 8/1993 |
| JP | 5-303083 | 11/1993 |
| JP | 6-110042 | 4/1994 |
| JP | 6-202086 | 7/1994 |
| JP | 7-77683 | 3/1995 |

* cited by examiner

*Primary Examiner*—Shean C. Wu
(74) *Attorney, Agent, or Firm*—Parkhurst & Wendel, L.L.P.

(57) ABSTRACT

A polymer dispersion type liquid crystal display element is disclosed. The element has a polymer dispersion type liquid crystal sandwiched between a pair of substrates, each having an inside electrode. Liquid crystal droplets are dispersed either in a polymer matrix continuous phase or in a three-dimensional matrix-containing polymer. When no voltage is applied to the electrodes, the liquid crystal molecules in the droplets present a bipolar-form orientation pattern having at least two poles in the vicinity of the interfaces between the liquid crystal droplets and the polymer. When a clear point transition temperature of the liquid crystal is Tni, the pattern of bipolar-form orientation is maintained at least when the element is operating at a temperature in the range of 5° C. to (Tni−5)° C.

37 Claims, 32 Drawing Sheets

(a)

At the time of separation
of liquid crystal droplets

At the completion
of phase-separation (b)

At the time of separation
of liquid crystal droplets

At the completion
of phase-separation (a)

At the time of separation of liquid crystal droplets

At the completion of phase-separation (b)

At the time of separation of liquid crystal droplets

At the completion of phase-separation (a)

(b)

(a)

(b)

(a)

(b)

(1) Bipolar-form orientation (2) Radial-form orientation

MACROMOLECULAR DISPERSION TYPE LIQUID CRYSTAL DISPLAY ELEMENT AND METHOD OF MANUFACTURING THE SAME

This is a Continuation of application Ser. No. 09/068,451 filed May 8, 1998 now abandoned, which is a national stage of PCT/JP97/03266 filed Sept. 16, 1997.

TECHNICAL FIELD

The present invention relates to a liquid crystal display element and, more particularly, to a polymer dispersion type liquid crystal display element in which liquid crystals are dispersed in polymer. The polymer dispersion type liquid crystal according to the present invention includes both of polymer dispersion type liquid crystal in a narrow sense in which liquid crystal droplets are dispersed and held in a continuous phase in a polymer matrix and the so-called polymer network liquid crystal in which liquid crystal droplets are dispersed and held in networks of polymer matrix in the form of a three dimensional network.

1. Background Art

The liquid crystal display element, which is a display element featuring low profile, lightweight and low power consumption, has been widely used as a display screen of word processors and of TVs hitherto. Of the known liquid crystal display elements, the polymer dispersion type liquid crystal display element using light-scattering mode, which requires no polarizers and also requires no alignment layer treatment to substrates, enables a simplified structure and bright and good contrast ratio display. In particular, when the polymer dispersion type liquid crystal display element is applied to projection type liquid crystal display adapted to project images on the screen, a large image of bright and excellent contrast ratio can be easily created on the screen, and accordingly the use of the polymer dispersion type liquid crystal display element in this field is being progressing.

The polymer dispersion type display element has however a delay in development, as compared with the liquid crystal display elements of TN (Twisted Nematic) mode and STN (Super Twisted Nematic) mode and still has the following disadvantages. Since the polymer dispersion type liquid crystal is such that microscopic liquid crystal droplets of micron order are confined in the polymer matrix, liquid crystal molecules in the liquid crystal droplets are affected by physical restrictive force (hereinafter it is called as "anchoring") from an interfacial boundary of the polymer matrix. Because of this, the polymer dispersion type liquid crystal display element is poorer in response of the liquid crystal molecules to electric field than other types of liquid crystal display elements and has a hysteresis that creates a difference in transmittance of the element between at a raised voltage and at a dropped voltage. Further, since the anchoring strength varies depending on temperature of the element, as ambient temperature around the element varies, the transmittance characteristics of the element relevant to the response to electric field and to driving voltage vary considerably. Due to this, although the polymer dispersion type liquid crystal display element holds promise as the coming generation liquid crystal display element, the element of high reliability with satisfactory performance have not yet been realized in the present circumstances.

Following techniques for the polymer dispersion type liquid crystal display element have been hitherto disclosed.

(1) Disclosed by Flat Panel Display '91, on page 221, published by NIKKEI BP and others is the technique according to which after a compatible mixture of a liquid crystal material and polymerizable monomer is injected in between two opposing substrates, the compatible mixture is irradiated with ultraviolet from above of the substrates under a given temperature condition, to polymerize the monomer while phase separation of the liquid crystal is produced, to thereby produce the polymer dispersion type liquid crystal in which liquid crystals are dispersed in polymer matrix or are dispersed with continuously linked to each other.

(2) Disclosed by Japanese Laid-open Patent Publication No. Hei 5(1993)-158020 is the technique of controlling phase separation by concentration of polymerization initiator in the liquid-crystal-polymer mixture, polymerization temperature and intensity of ultraviolet being all controlled simultaneously.

(3) Disclosed by Japanese Laid-open Patent Publication No. Hei 5(1993)-224180 is the technique of controlling a rate of polymerization of monomers in the guest host type of polymer dispersion type liquid crystal display element.

(4) Disclosed by Japanese Laid-open Patent Publication No. Hei 5(1993)-158020 is the technique of improving intensity of ultraviolet from a conventional range of about 10 mW/cm$^2$ (cf. Symposium on page 414 of The 21$^{st}$ Liquid Crystal Symposium by Mr. Fujikake and others, for example) to the range of from 0.5 mW/cm$^2$ or more to 100 mW/cm$^2$ or less.

(5) Disclosed by Japanese Laid-open Patent Publication No. Hei 5(1993)-127174 is the technique according to which intensity of ultraviolet is set to be 15 mW/cm$^2$ or more when a radical polymerization initiator is used, while on the other hand, the intensity of ultraviolet is set to be in the range of from 100 mW/cm$^2$ or more to 150 mW/cm$^2$ or less when an ionic polymerization initiator is used.

(6) Disclosed by Japanese Laid-open Patent Publication No. Hei 6(1994)-194629 is the technique on a surface temperature of a liquid crystal panel irradiated with ultraviolet, according to which polymerization is produced under temperatures higher than thermal phase separation temperature by a minimum requiring extent, to allow for solubility limit of liquid crystals.

However, these conventional techniques were not enough to solve the abovesaid problems satisfactorily and were also disadvantageous in that it takes much time to accomplish the phase separation by, for example, irradiation of ultraviolet (it takes much time to solidify polymer matrix), due to which great variations in size of liquid crystal droplets and interval between neighboring liquid crystal droplets are caused. Also, the conventional techniques involve the problem that since the anchoring strength of interface liquid crystal/polymer is not adequately adjusted, the response to electric field is not sufficient and the optical hysteresis in high temperature range is as large as 3 to 5% and also the optical hysteresis in low temperature range (less than 10° C.) increases further.

At present, what is physical value that controls the optical hysteresis directly is not thoroughly clarified. For this reason, the measurements to improve the optical hysteresis effectively have not yet been found out.

2. Disclosure of the Invention

The present invention as a group has been made in the light of the present circumstances described above. It is the primary object of the present invention to develop a new technique for determining optical hysteresis precisely so that a polymer dispersion type liquid crystal display element of improved optical hysteresis can be provided by the application of the new technique. It is the secondary object of the present invention to develop a technique for adjusting anchoring properly to thereby provide a polymer dispersion type liquid crystal display element with improved response to electric field and improved optical hysteresis. Further, it is the tertiary object of the present invention to provide an improved polymer dispersion type liquid crystal display element based on the above-mentioned two objects.

It is noted that although the present invention as a group is on the basis of the same or similar conception, since the each individual invention is embodied into different examples, the present invention as a group is divided into the first inventive group; the second inventive group; the third inventive group; and the fourth inventive group for every closely related invention in the specification. Hereinafter, the description on the content of the invention is given in sequence for every group (inventive group).

According to the first inventive group, the relationship between manufacturing conditions (polymerization temperature, intensity of ultraviolet and ultraviolet irradiation time) and optical hysteresis is determined, on the basis of which the optical hysteresis of the liquid crystal display element is reduced.

The first inventive group comprises following aspects:

(1) A polymer dispersion type liquid crystal display element, in which a polymer dispersion type liquid crystal is sandwiched between a pair of substrates each having an electrode at the inside thereof,
  wherein said polymer dispersion type liquid crystal is such that liquid crystal droplets are dispersed and held in a continuous phase of matrix comprising polymer compound or are dispersed and held in networks of a three dimensional network form of matrix comprising polymer compound, and
  wherein said liquid crystal droplets located in all areas except an area in the vicinity of interfaces between said substrates and said polymer dispersion type liquid crystal are substantially identical to each other in shape and size.

(2) In the above described aspect (1), standard deviation in average particle size of said liquid crystal droplets is within the range of ±5% of a mean value.

(3) In the above described aspect (1) or (2), wherein said polymer compound comprises polymers including monofunctional acrylate and/or multifunctional acrylate.

(4) In the above described aspect (3), said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

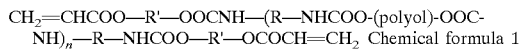
CH$_2$=CHCOO—R'—OOCNH—(R—NHCOO-(polyol)-OOC-NH)$_n$—R—NHCOO—R'—OCOCH=CH$_2$  Chemical formula 1 where n=an integer.

(5) A method for producing a polymer dispersion type liquid crystal display element, said method comprising a phase separation step in which after a liquid crystal polymer precursor compatible solution including liquid crystal and polymer precursor is placed between a pair of substrates each having an electrode at the inside thereof, a surface of said substrates is irradiated with ultraviolet so that said liquid crystal and said polymer precursor in said liquid crystal polymer precursor compatible solution can be phase-separated from each other and also said polymer precursor can be polymerized and cured, to thereby produce a polymer dispersion type liquid crystal in which liquid crystal droplets are dispersed and held in a continuous phase of matrix comprising polymer compound or are dispersed and held in networks of a three dimensional network form of matrix comprising polymer compound, said phase separation step comprising the step of controlling the time T from initiation of the irradiation of ultraviolet until completion of the phase separation so that at least any one of a degree of polymerization of said polymer precursor of said liquid crystal polymer precursor compatible solution, a rate of phase separation and a generating density of liquid crystal nuclei separated can be controlled to even particle sizes of the liquid crystal droplets dispersed and held in said matrix.

(6) In the above described aspect (5), where T1 is the time from said irradiation of ultraviolet until the initiation of phase separation of said liquid crystal polymer precursor compatible solution and $T_{10-90}$ is the time required for a rate of progress of phase separation to change from 10% to 90% when the rate of progress of the phase separation for all liquid crystals to be separated from said liquid crystal polymer precursor compatible solution is defined as 100%, the control of said time T is performed by controlling said time T1, said time $T_{10-90}$, or both of said time T1 and $T_{10-90}$.

(7) In the above described aspect (5), temperature of said liquid crystal polymer precursor compatible solution and intensity of ultraviolet with which said liquid crystal polymer precursor compatible solution is irradiated are controlled so that the relation of $T_{10-90}$=a×T1+b (a, b are constants of a linear function) can hold between said time T1 and said time $T_{10-90}$ and said a can be within the range of from 0.4 or more to 0.7 or less.

(8) In the above described aspect (6), said time T1 is controlled to be 5 seconds or less by controlling temperature of said liquid crystal polymer precursor compatible solution and intensity of ultraviolet with which said liquid crystal polymer precursor compatible solution is irradiated.

(9) In the above described aspect (8), said intensity of ultraviolet is not less than 100 mW/cm$^2$.

(10) In the above described aspect (8), said intensity of ultraviolet is not less than 100 mW/cm$^2$ and also said temperature of said liquid crystal polymer precursor compatible solution is higher than thermal phase separation temperature of said liquid crystal polymer precursor compatible solution by 2 to 15° C.

(11) In the above described aspect (8), said intensity of ultraviolet is in the range of 160 mW/cm$^2$ to 400 mW/cm$^2$ and also said temperature of said liquid crystal polymer precursor compatible solution is higher than thermal phase separation temperature of said liquid crystal polymer precursor compatible solution by 6 to 13° C.

(12) In the above described aspect (6), temperature of said liquid crystal polymer precursor compatible solution and intensity of ultraviolet with which liquid crystal polymer precursor compatible solution is irradiated are controlled so that said time $T_{10-90}$ can be 6 seconds or less.

(13) In the above described aspect (12), said intensity of ultraviolet is notless than 100 mW/cm$^2$.

(14) In the above described aspect (12), said intensity of ultraviolet is not less than 100 mW/cm$^2$ and also s aid temperature of said liquid crystal polymer precursor compatible solution is higher than thermal phase separation temperature of said liquid crystal polymer precursor compatible solution by 2 to 15° C.

(15) In the above described aspect (12), said intensity of ultraviolet is in the range of 160 mW/cm$^2$ to 400 mW/cm$^2$ and also said temperature of said liquid crystal polymer precursor compatible solution is higher than thermal phase separation temperature of said liquid crystal polymer precursor compatible solution by 6 to 13° C.

(16) In the above described aspect (6), said time T1 and said time $T_{10-90}$ are controlled to be 5 seconds or less and 6 seconds or less, respectively, by controlling temperature of said liquid crystal polymer precursor compatible solution and intensity of ultraviolet with which said liquid crystal polymer precursor compatible solution is irradiated.

(17) In the above described aspect (5) or (16), said liquid crystal polymer precursor compatible solution includes monofunctional acrylate and/or multifunctional acrylate.

(18) In the above described aspect (17), said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

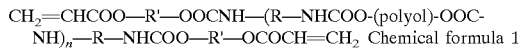

CH$_2$=CHCOO—R'—OOCNH—(R—NHCOO-(polyol)-OOC-NH)$_n$—R—NHCOO—R'—OCOCH=CH$_2$ Chemical formula 1 where n=an integer.

Next, the significance of the constructions described above will be described below.

Shown in FIG. 1 is an example of measured optical hysteresis (ambient temperature of 30° C. when measured) of a conventional polymer dispersion type liquid crystal display element. In FIG. 1, a solid line represents a transmittance curve at a raised voltage (an applied voltage is gradually raised) and a broken line represents a transmittance curve at a dropped voltage (an applied voltage is gradually dropped). As shown in FIG. 1, a general type of polymer dispersion type liquid crystal display element has a strong optical hysteresis. The term of "optical hysteresis" used herein is intended to mean the property of causing a difference in transmittance between in the process of the voltage being raised and in the process of the voltage being dropped when the same voltage is applied, and the magnitude is represented by percentage for luminance of white level.

Incidentally, in the polymer dispersion type liquid crystal, there are two orientation patterns of liquid crystal molecules in the liquid crystal droplets to be oriented in the direction of the major axes (Sov. Phys. JETP58(6), December 1983). One of the orientation patters is the bipolar form having two poles. In the bipolar-form orientation pattern, each liquid crystal molecule in the droplet is oriented toward two poles, with the major axis being in parallel to the interfacial boundary (spherical surface). Another one is the radial form. In the radial-form orientation pattern, a single pole (point defect) exists in the vicinity of the center of liquid crystal droplet and each liquid crystal molecule in the droplet is oriented in the radial direction, with one end of the major axis oriented toward said single pole and the other oriented to the spherical surface.

In general, the polymer dispersion type liquid crystal display element exhibits strong optical hysteresis in the relation to operating temperature. The origin of this hysteresis effect will be examined in association with the orientation patterns mentioned above. It is known that the polymer dispersion type liquid crystal display element has a tendency of the optical hysteresis increasing excessively at temperatures lower than a certain temperature. The origin is thought to be due to the transition of the orientation pattern of the liquid crystal molecules from the bipolar form to the radial form when temperature of the element becomes lower than a certain temperature. Also, it is thought that the primary origin of the optical hysteresis caused when the temperature for the bipolar-form orientation pattern to be produced exceeds the certain temperature is due to displacement of the poles in the bipolar-form orientation pattern or disappearance of the poles being caused by variations in applied voltage (e.g. Liquid Crystal Dispersions written by P.S. Drzaic at page 269, World Scientific 1996). On the other hand, in the radial-form orientation pattern of liquid crystals, there inevitably exist some liquid crystal molecules orienting in a direction perpendicular to the substrates while no voltage is applied as well. Due to this, in the polymer dispersion type liquid crystal element in which liquid crystal molecular orientation is controlled to make the switching between scattering condition and permeation, the liquid crystal droplets are required to take the bipolar-form orientation pattern, from the view point of contrast.

In short, reduction of the optical hysteresis requires that the liquid crystal molecules take the bipolar-form orientation pattern and also the bipolar-form orientation pattern is stably maintained in an operating temperature range of the liquid crystal display element (a driving temperature range of the element). As illustrated in the experiments discussed later, the inventors found out the fact that generation of oriented poles and transition of the poles caused by the application of voltage are highly dependent on the shape of liquid crystal droplet and a magnitude of interfacial restrictive force (anchoring) of the polymer surrounding the liquid crystal droplets.

Specifically, the more the form of the liquid crystal droplets nears to a low-distortion ellipsoid of revolution, the more the movement of the poles decreases, whereby the orientation pattern is stabilized and the optical hysteresis is reduced. In particular, when variability of the particle size of the liquid crystal droplets is within the range of 10%, the optical hysteresis is reduced drastically. However, because of wettability between the substrates and the liquid crystals, the liquid crystal droplets in the vicinity of the substrates come into semi-spherical in shape, with their great circle contacting with the substrates. It is thus difficult to control the shape of the liquid crystal droplets contacting with the substrates, so the remaining liquid crystal droplets except those contacting with the substrates should be controlled to be formed into a substantial ellipsoid of revolution form. Also, as long as the liquid crystal droplets each have a substantial ellipsoid of revolution, the liquid crystal droplets may be partially linked with another liquid crystal droplets.

The higher the percentage of the liquid crystal content in liquid crystal polymer precursor compatible solution in preparation of the polymer dispersion type liquid crystal, the more outstandingly the optical hysteresis appears. This is a consequence of: with a higher percentage of the liquid crystal content, the particle size of the liquid crystal droplets increases in general to facilitate distortion of the liquid crystal droplets, which in turn allows extra poles (more than two poles) to occur.

When the interfacial anchoring strength is weak, even if there exists an extra pole, since the extra pole other than the poles in the bipolar orientation is destroyed with the application of an electric field, the optical hysteresis is weakened. However, any weak anchoring strength is not always of desirable. This is because, in the case of significantly weak anchoring strength, the liquid crystal molecules do not go back to their original state even with de-energization of the applied voltage, which in turn makes it difficult to do the light-and-dark switching by the control of the application of voltage. Therefore, the anchoring strength must be adjusted to a proper strength. In general, the optical hysteresis in the high temperature range is antinomic with that in the low temperature range. There is the tendency that when the optical hysteresis in the high temperature range is tried to be reduced, the optical hysteresis in the low temperature range increases, and vise versa. Due to this, the prior arts have not succeeded in accomplishing the polymer dispersion type liquid crystal display element having the optical hysteresis which is capable to be reduced in a wide temperature range.

Next, the ways of reducing distortion of the liquid crystal droplets to adjust the form of the liquid crystal droplets will be described below. The first way is to accelerate a rate of polymerization of the polymer when phase separation and polymerization of the polymer are made by irradiation of ultraviolet to the liquid crystal polymer precursor compatible solution.

Description on this will be given with reference to FIG. 2. FIG. 2 schematically illustrates the forming states of liquid crystal droplets: FIG. 2(a) illustrates the form of the liquid crystal droplets in the case of the rate of polymerization being fast (e.g. the rate of polymerization not more than 6 sec.) and FIG. 2(b) illustrates the form of the liquid crystal droplets in the case of the rate of polymerization being slow (e.g. the rate of polymerization not less than 10 sec.). With an accelerated rate of polymerization, the liquid crystal droplet separating nuclei (microscopic liquid crystal droplets produced immediately after the phase separation) are allowed to spread uniformly, which in turn can allow the separating nuclei to grow to liquid crystal droplets within a short time. Consequently, neighboring liquid crystal droplets are kept with properly spaced intervals from each other, and liquid crystal droplets with relatively uniform form are formed. On the other hand, with a decelerated rate of polymerization; it take lots of time until completion of polymerization, which can allow other liquid crystal droplets to squeeze in spaces between the neighboring liquid crystals in stages of growth of the liquid crystal droplets, to cause mutual forms of the droplets to be distorted and thereby form liquid crystal droplets of uneven in shape. In addition, with the decelerated rate of polymerization, excessively large liquid crystal droplets can be produced. As discussed later in detail, the rate of polymerization of the polymer precursor can be controlled by adjusting temperature of the liquid crystal polymer precursor compatible solution (hereinafter it is referred to as "polymerization temperature") and intensity of irradiation of ultraviolet (hereinafter it is simply referred to as "intensity of ultraviolet") during the phase separation.

The second way is to adjust viscosity and hardness of the polymer precursors surrounding the separating nuclei during the separation. When the polymer precursors are low in degree of polymerization, their viscosity is low and their hardness remains soft, so that the separating nuclei are affected, during growth, by fluctuation of the liquid crystal polymer precursor compatible solution and thus are liable to develop into a distorted form. On the other hand, when the separating nuclei separate in a stage in the full development of polymerization of the polymer precursors, the growth of the separating nuclei is restricted by the polymer precursors high in viscosity and high in hardness (e.g. dimer or trimer), and the separating nuclei avoid high-hardness portions of the polymer precursor, during growth. As a result of this, distorted liquid crystal droplets are formed.

It will be appreciated from the above that there exists an optimum range in the degree of polymerization of the polymer precursors (which corresponds to the hardness of the polymer precursors) during a stage of separation of liquid crystals. It should be noted that the hardness of the polymer precursors can be adjusted, at the time of separation of the separating nuclei, by either controlling the degree of the polymerization of the polymer precursors properly or selecting type and composition of the polymer precursor properly.

The third way is to control a generating density of separating liquid crystal nuclei in a proper manner. FIG. 3(a) is a schematic showing of separating liquid crystal nuclei of a high generating density and FIG. 3(b) is a schematic showing of separating liquid crystal nuclei of a low generating density. When the generating density of the nuclei is excessively high, the separating nuclei contact or connect to each other in the process of growth to cause distortion of the nuclei. On the other hand, when the generating density of the nuclei is excessively low, the separating nuclei matures into excessively large liquid crystal droplets, while the number of liquid crystal droplets decrease, leading to deterioration of scattering characteristics. For this reason, it is necessary to limit the generating density of the nuclei of the liquid crystal droplets to an optimum range. The generating density of the nuclei is dependent on factors such as polymerization temperature, a rate of polymerization, degree of polymerization of polymer precursors, and intensity of ultraviolet. Hence, the generating density of the separating nuclei can be controlled by adjusting the polymerization temperature and the intensity of irradiation of ultraviolet. In addition, the generating density can be also controlled by setting the compositions of the liquid crystal polymer precursor compatible solution properly.

As described above, the adjustment of rate of polymerization, degree of polymerization and generating density of the separating nuclei can allow the liquid crystal droplets to have uniform form and also allow the optical hysteresis to be reduced. The factors above can be controlled by varying the polymerization temperature and the intensity of ultraviolet. However, there is a few precedents for the study of the degree of polymerization and the rate of polymerization in the phase separation having been made. Among others, there is no precedent for the study of the optical hysteresis characteristics of the liquid crystal display element having been made from the viewpoints of rate of polymerization, degree of polymerization, and generating density of the separating nuclei.

Accordingly, the inventors have introduced capacitance as a physical value which reflects the behavior of liquid crystal molecules more directly in its relation with the applied voltage, developing the technique of estimating the rate of polymerization, the degree of polymerization and generating density of the separating nuclei by use of the capacitance. And, they have succeeded in forming the polymer dispersion type liquid crystal display element which displays low optical hysteresis in a wide temperature range, based on the results obtained by the developed technique. The liquid crystal display element thus formed have performance which has never been accomplished by conventional techniques, specifically, stable display performance in a wide temperature range.

The significance of capacitance as the physical value is described below. When the liquid crystal polymer precursor compatible solution injected in between a pair of substrates (hereinafter they are referred to as "liquid crystal panel") is irradiated with ultraviolet, with a bias voltage being applied thereto, the separating liquid crystal nuclei are formed by phase separation, and at the same time as the form of the separating nuclei, the liquid crystal molecules in the separating nuclei rise in response to the bias voltage. Thus, the capacitance of the liquid crystal panel varies in response to the form of the separating nuclei and the growth (which means increase in the amount of separating liquid crystals). Hence, the proportion of separating liquid crystals (to the total separating amounts) at some point in the progress of phase separation can be grasped by measuring the capacitance in the progress of phase separation with increased time. As long as the liquid crystal polymer precursor compatible solution is identical in composition and also the polymerization temperature (temperature of liquid crystal panel) is constant, the separation of liquid crystals in the phase separation is determined by the degree of progress of polymerization of the polymer precursors. Accordingly, the degree of progress of polymerization (the degree of polymerization) and the rate of polymerization can be found by estimating the proportion of separating liquid crystal by the capacitance. Further, this will be specifically described with reference to experiments.

Experiment 1

In Experiment 1, the significance of measuring the capacitance is experimentally clarified. In this experiment, the liquid crystal panel similar to that prepared in Example 1-1 as described later (in which liquid crystal polymer precursor compatible solution is filled), which was set at a temperature higher than thermal phase separation temperature of the liquid crystal polymer precursor compatible solution by 9° C., was irradiated with ultraviolet of intensity of 200 mW/cm$^2$, to measure the capacitance in the progress of phase separation. The methods of adjusting the liquid crystal panel temperature, of measuring the capacitance and of preparing the liquid crystal panel and other detailed conditions are described later, with reference to Example 1-1 of the first inventive group.

FIG. 4 shows the measurement results of the capacitance. As shown in FIG. 4, the capacitance did not change for a certain time (T1) from the start of ultraviolet irradiation. After the passage of the certain time, the capacitance increased sharply and thereafter was kept stable in a high level. This result shows that after the passage of the certain time (T1), the phase separation started, from the point of which the separating of the liquid crystals progressed rapidly. Additionally, the stabilized capacitance indicates the completion of the separating of liquid crystals (the completion of polymerization of polymer).

As shown in FIG. 4, where the time from the irradiation before the start of phase separation is T1, the time from the start of phase separation before the completion thereof is T2, and the time required for the capacitance to change from 10% to 90% is $T_{10-90}$, when the T2 is estimated by the $T_{10-90}$, the time T1 corresponds to the time from the start of irradiation of ultraviolet before the start of phase separation and the time $T_{10-9}$ corresponds to the rate of polymerization. It is to be noted that the reason for letting the time T2 be $T_{10-90}$, not $T_{0-100}$, is that letting $T2=T_{0-100}$, leads to increase in error of measurement.

In general, the intenser the intensity of ultraviolet, the faster the rate of polymerization of a polymer precursor becomes. Accordingly, with increasing intensity of ultraviolet, the time T1, T2, particularly the time T2, shortens. In addition, the higher the compatible solution temperature (which is the panel temperature and the polymerization temperature) as compared with thermal phase separation temperature of the liquid crystal polymer precursor compatible solution, the more frequently the phase separation does not occur until the polymerization of the polymer precursor progresses to some extent. As a result, the time T1 from after the start of irradiation of ultraviolet before the start of phase separation lengthens. In other words, the lengthening time T1 means that polymerization of the polymer precursor is being in progress before the phase separation starts, which in turn means that at the time of separating of liquid crystals, the polymer precursor grows into polymer such as dimer or trimer. Polymer is high in viscosity and in hardness, as compared with monomer, so that as the time T1 increases, the viscosity and hardness of the polymer precursor increase and the generating density of the separating liquid crystal nuclei decreases. This means that as the time T1 increases, deformed liquid crystal droplets are easily produced increasingly, as mentioned above.

Further, there is a close relation between the polymerization temperature of liquid crystal polymer precursor compatible solution and the rate of polymerization, also. The higher the polymerization temperature, the longer the time T2 becomes.

It will be understood from the above that the measurements of the time T1 and T2 enable a desirable phase separation condition for forming the well-formed liquid crystal droplets to be determined, in association with the intensity of ultraviolet and the liquid crystal panel temperature (polymerization temperature).

Experiment 2

In Experiment 2, the relationship between the degree of polymerization (viscosity·hardness) of the polymer precursor and the degree of deformation of the liquid crystal droplets (the factor on which the optical hysteresis is dependent), the relationship between the intensity of ultraviolet and the optical hysteresis, and the relationship between the intensity of ultraviolet and the optical hysteresis under the condition of constant polymerization temperature are clarified. Other conditions than the intensity of ultraviolet and the polymerization temperature are the same as those in the above Example 1, unless otherwise specified.

First of all, the relationship between the polymerization temperature and the optical hysteresis is described with reference to FIG. 5 (as conceptually illustrated). As already discussed, the polymerization temperature, close to the thermal phase separation temperature of liquid crystal polymer precursor compatible solution, causes the phase separation easily, and as such can allow liquid crystal separating nuclei to separate out in the polymer precursor low in the degree of polymerization. As a result of this, although the generating density of the separating nuclei increases, since the viscosity·hardness of the polymer precursor is low, the separating droplets are linked to each other in the stage of growth to thereby produce the distorted liquid crystal droplets. On the other hand, when the polymerization temperature is high, the phase separation does not occur until he polymerization of the polymer precursor progresses to some extent. Thus, as a consequence of the phase separation occurring at a stage of the polymerization progressing to some extent, the generating density of the separating nuclei is reduced, and since the viscosity·hardness of the polymer precursor around the separating nuclei is high, the liquid crystal droplets are rendered prone to deformation. Thus, in either case, the polymer dispersion type liquid crystal in which deformed liquid crystal droplets are dispersed is formed, resulting in increase in optical hysteresis. In view of the above, it is necessary to find out a proper polymerization temperature that enables the optical hysteresis to decrease.

FIG. 6 shows the measurement results of the optical hysteresis resulting from changes in the intensity of ultraviolet and the polymerization temperature for the liquid crystal panel (details are described later in Example 1-5). In this measuring experiment, the liquid crystal polymer precursor compatible solution whose thermal phase separation temperature is about 10° C. is used.

It will be understood from the result shown in FIG. 6 that at the intensity of ultraviolet of 110 mW/cm$^2$ (♦—♦), the lower the polymerization temperature, the smaller the hysteresis becomes. It will be also appreciated that at the intensity of ultraviolet of 200 mW/cm$^2$, 300 mW/cm$^2$, 400 mW/cm$^2$, and 550 mW/cm$^2$, there exist polymerization temperatures in which the optical hysteresis takes minimum values, and there is a tendency that with increasing intensity of ultraviolet, the polymerization temperatures coming to the minimum shift to higher temperatures. Further, the weaker the intensity of ultraviolet, the larger the optical hysteresis. This means that the weak intensity of ultraviolet leads to decrease in the rate (progress speed) of phase separation after the start of phase separation, and the high polymerization temperature leads to increase in the viscosity·hardness and in turn leads to deceleration in the progress speed of the phase separation, so that, in any case, the distortion of the liquid crystal droplets increases and resultantly the optical hysteresis increases.

In FIG. 6, the temperatures in which the optical hysteresis takes the minimum values range from 12° C. (at 110 mW/cm$^2$) to 23° C. (at 400 mW/cm$^2$ and 550 mW/cm$^2$) in the polymerization temperature, with the minimum values ranging from 16° C. to 23° C. Also, it will be understood that the intensity of ultraviolet of not less than 200 mW/cm$^2$ is required for achieving the optical hysteresis of not more than 1%. It is noted that the 23° C. is the temperature higher than the thermal phase separation temperature (10° C.) by 13° C.

Shown in FIG. 12 is the result of FIG. 6 presented by the connection between the intensity of ultraviolet and the polymerization temperature at which the optical hysteresis is reduced to the minimum. The liquid crystal display element having small hysteresis can be obtained by setting the polymerization temperature and the intensity of ultraviolet properly based on FIG. 12. However, it is preferable to set the intensity of ultraviolet to be in the range of 110 mW/cm$^2$ or more to 400 mW/cm$^2$ or less, to allow for photodecomposition of the liquid crystals as well as the optical hysteresis reduction effect in the low temperature range.

From the above result it is understood that the optical hysteresis can be reduced significantly by selecting a temperature in the vicinity of the polymerization temperature in which the optical hysteresis is reduced to the minimum, according to the intensity of ultraviolet, to perform the phase separation·polymerization.

Experiment 3

In Experiment 3, the liquid crystal panels were prepared, with intensity of ultraviolet of 200 mW/cm$^2$ irradiated to the liquid crystal panels in common but changes in the polymerization temperature only. The liquid crystal panel thus prepared was measured in respect of the time T1 and the time T2 in association with the polymerization temperature. The remaining manufacturing conditions are the same as those of Example 1-1 described later.

FIG. 7 shows the measurement results. As apparent from FIG. 7, with rising polymerization temperature, the time T1 and the time T2 both generally lengthened. That the higher the polymerization temperature, the longer the time T1 means that the phase separation is started in a stage in which the polymerization of polymer precursor is in progress. Also, the time T2 from the start of the phase separation to the completion of the phase separation lengthened more at higher polymerization temperatures than at lower polymerization temperatures. That is presumed to be because the polymerization progresses considerably before the start of phase separation, to increase the viscosity, which resultantly retards the polymerization reaction after the start of the phase separation.

Experiment 4

Further, various kinds of elements were prepared, with the polymerization temperature kept constant at 13° C. and with the remaining conditions being in common with those in the case of FIG. 6 but changes in the intensity of ultraviolet only. The elements thus prepared were measured in respect of the connection between the intensity of ultraviolet and the optical hysteresis. The results are shown in FIG. 8. It is understood from FIG. 8 that at an increasing intensity of ultraviolet, the element can have reduced optical hysteresis, and at the intensity of ultraviolet of 100 mW/cm$^2$ or more, the optical hysteresis is brought to 1.5% or less. In detail, at the intensity of ultraviolet of 200 mW/cm$^2$, for example, the optical hysteresis is brought to about 1%, and at intensity of ultraviolet of 300 mW/cm$^2$ and of 500 mW/cm$^2$, the optical hysteresis characteristics of the liquid crystal display elements are brought to about 0.8% and to about 0.3%, respectively.

It is thought that the reason why at increasing intensity of ultraviolet, the optical hysteresis has a tendency to be reduced is that with increasing intensity of ultraviolet, the rate of polymerization increases to contribute rapid growth of the liquid crystal droplets, and as such can allow the liquid crystal droplets to be small in distortion and equal in size. To ensure this effect of the intensity of ultraviolet, T2 (equivalent to the rate of polymerization) which is determined by combination of the intensity of ultraviolet with the polymerization temperature can be measured.

Experiment 5

In Experiment 5, the liquid crystal panels, prepared with various changes in the intensity of ultraviolet as well as in the polymerization temperature, were measured in respect of capacitance in the same manner as in Experiment 1, to determine the time T1 and the time T2 (the time T2 defined by 10% –90%), on the basis of which the relationship between the time T1 and the time T2 was clarified.

Shown in FIG. 9 are the measurement results in the relationship between the time T2 and the optical hysteresis. From FIG. 9 it can be seen that when the time T2 is 6 seconds or less, the optical hysteresis is brought to about 2% or less; that when the time T2 is 4.5 seconds or less, the optical hysteresis is brought to about 1.4% or less; and that the time T2 is required to be set 2.5 seconds or less, in order to bring the optical hysteresis to about 0.8% or less. It is also seen that the time T2 is required to be set 1.5 seconds or less, in order to bring the optical hysteresis to 0.5% or less.

Shown in FIG. 14 are the measurement results of Experiment 5 in the relationship between the time T1 and the time T2. It can be seen from FIG. 14 that there is a generally regular correlation between the time T1 and the time T2, so that they can make approximations with T2=a·T1+b (a, b are constants of a linear function). And, it became clear that the number a in the linear function has not so much dependence on the intensity of ultraviolet and is estimated to be 0.4 or more to 0.7 or less.

The results of FIG. 14 are thought to indicate that when the time T1 from the start of irradiation of ultraviolet before the start of phase separation is long, the polymerization of polymer precursor progresses before the start of phase separation, which allows the solution to increase in viscosity and in hardness, with the result that the time T2 (the rate of polymerization) is rendered slow.

The rate of polymerization can be regulated also by changing the composition of the polymer precursor compositions including an additive by addition of a polymerization promoter, for example.

The inventors confirmed that the rate of phase separation was changed by forming an insulation layer at the interface of the substrate. That is thought to be because the liquid crystals separated out in the vicinity of the interface of the substrate are affected by surface tension of the substrate. The larger the surface tension to the liquid crystals, the sooner the liquid crystals are separated out from the compatible solution.

(2) 2nd inventive group

It is the primary object of the invention of the second inventive group that the relation of manufacturing conditions for the phase separation of polymer dispersion type liquid crystals (polymerization temperature, intensity of ultraviolet and ultraviolet irradiation time) with particle size of the liquid crystal droplets, orientation transition temperature of the liquid crystal molecules, tilt angles of the liquid crystal molecules and anchoring strength and the relationship between these and the optical hysteresis are determined, on the basis of which the optical hysteresis of the liquid crystal display element is reduced drastically in the operating temperature range of the liquid crystal display element (temperature of the element during driving), in a low temperature in particular, to thereby produce a satisfactory display performance of the liquid crystal display element.

In the second inventive group, the anchoring index defined by the following expression 2-1 is introduced as an index to estimate a magnitude of the anchoring strength, for making use of the anchoring index.

$$\text{Anchoring index} = (V90 \times R)/d \quad \text{Expression 2-1,}$$

where
V90: an applied voltage required for the transmittance to become 90% in the temperature of element of 30° C.;
d:($\mu$m) an interval between the substrates; and
R:($\mu$m) size of a liquid crystal droplet an average particle interval of a three dimensional network form of matrix comprising polymer compound.

The second inventive group comprises the following aspects.

(19) A polymer dispersion type liquid crystal display element in which a polymer dispersion type liquid crystal is sandwiched between a pair of substrates each having an electrode at the inside thereof, wherein said polymer dispersion type liquid crystal is such that liquid crystal droplets are dispersed and held in a continuous phase of matrix comprising polymer compound or are dispersed and held in networks of a three dimensional network form of matrix comprising polymer compound, wherein liquid crystal molecules in said liquid crystal droplets present a bipolar-form orientation pattern having at least two poles in the vicinity of interfaces between said liquid crystal droplets and said polymer compound, while no voltage is applied to said electrodes, and wherein, where a clear point transition temperature of said liquid crystal is let be Tni, said bipolar-form orientation pattern is maintained at least when an operating temperature of the element falls in the range of from 5° C. to (Tni–5)° C.

(20) In the above described aspect (19), tilt angles of said liquid crystal molecules, in the vicinity of interfaces between said liquid crystal droplets and said polymer compound, to said interfaces are not more than 10 degrees, while no voltage is applied to said electrodes.

(21) In the above described aspect (19), said bipolar-form orientation pattern is maintained under an operating temperature of said element falling in the range of from 0° C. to (Tni–5)° C.

(22) In the above described aspect (21), tilt angles of said liquid crystal molecules, in the vicinity of interfaces between said liquid crystal droplets and said polymer compound, to said interfaces are not more than 10 degrees, while no voltage is applied to said electrodes.

(23) In the above described aspect (19), said bipolar-form orientation pattern is maintained under an operating temperature of said element falling in the range of from –5° C. to (Tni–5)° C.

(24) In the above aspect (23), tilt angles of said liquid crystal molecules, in the vicinity of interfaces between said liquid crystal droplets and said polymer compound, to said interfaces are not more than 10 degrees, while no voltage is applied to said electrodes.

(25) In the above aspect (19), said liquid crystal droplets located in all areas except an area in the vicinity of interfaces between said substrates and said polymer dispersion type liquid crystal are substantially identical to each other in shape and size.

(26) In the above aspect (25), variations in size of said liquid crystal droplets are Within 10%.

(27) In the above aspect (19), said liquid crystal droplets located in all areas except an area in the vicinity of interfaces between said substrates and said polymer dispersion type liquid crystal are substantially identical to each other in shape and size, and wherein tilt angles of said liquid crystal molecules, in the vicinity of interfaces between said liquid crystal droplets and said polymer compound, to said interfaces are not more than 10 degrees, while no voltage is applied to said electrodes.

(28) In the above aspects (19) to (27), said polymer compound comprises polymers including monofunctional acrylate and/or multifunctional acrylate.

(29) In the above described aspect (28), said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

CH₂=CHCOO—R'—OOCNH—(R—NHCOO-(polyol)-OOC-NH)ₙ—R—NHCOO—R'—OCOCH=CH₂ Chemical formula 1 where n=an integer.

(30) A polymer dispersion type liquid crystal display element in which a polymer dispersion type liquid crystal is sandwiched between a pair of substrates each having an electrode at the inside thereof, wherein said polymer dispersion type liquid crystal is such that liquid crystal droplets are dispersed and held in a continuous phase of matrix comprising polymer compound or are dispersed and held in networks of a three dimensional network form of matrix comprising polymer compound, and wherein a value of (V90(Volt)×R)/d is 0.7 or more, where V90 is an applied voltage required for transmittance of a voltage transmittance characteristic of said polymer dispersion type liquid crystal display element to become 90% under 30° C. of the temperature of element; d ($\mu$m) is an interval between said pair of substrates; and R ($\mu$m) is an average particle size of said liquid crystal droplets.

(31) In the above described aspect (28), liquid crystal molecules in said liquid crystal droplets present a bipolar-form orientation pattern having at least two poles in the vicinity of interfaces between said liquid crystal droplets and said polymer compound.

(32) In the above described aspect (31), tilt angles of said liquid crystal molecules, in the vicinity of interfaces between said liquid crystal droplets and said polymer compound, to said interfaces are not more than 10 degrees, while no voltage is applied to said electrodes.

(33) In the above described aspect (31), a clear point transition temperature of said liquid crystal is let be Tni, said bipolar-form orientation pattern is maintained at least when operating temperature of said element falls in the range of from 5° C. to (Tni–5)° C.

(34) In the above described aspect (33), tilt angles of said liquid crystal molecules, in the vicinity of interfaces between said liquid crystal droplets and said polymer compound, to said interfaces are not more than 10 degrees, while no voltage is applied to said electrodes.

(35) In the above described aspect (30), where a clear point transition temperature of said liquid crystal is let be Tni, said bipolar-form orientation pattern is maintained at least when an operating temperature of said element falls in the range of from 0° C. to (Tni–5)° C.

(36) In the above described aspect (35), tilt angles of said liquid crystal molecules, in the vicinity of interfaces between said liquid crystal droplets and said polymer compound, to said interfaces are not more than 10 degrees, while no voltage is applied to said electrodes.

(37) In the above described aspect (31), where a clear point transition temperature of said liquid crystal is let be Tni, said bipolar-form orientation pattern is maintained when an operating temperature of said element falls in the range of from –5° C. to (Tni–5)° C.

(38) In the above described aspect (37), tilt angles of said liquid crystal molecules, in the vicinity of interfaces between said liquid crystal droplets and said polymer compound, to said interfaces are not more than 10 degrees, while no voltage is applied to said electrodes.

(39) A method for producing a polymer dispersion type liquid crystal display element, said method comprising the phase separation step in which after a liquid crystal polymer precursor compatible solution including liquid crystal and polymer precursor is placed between a pair of substrates each having an electrode at the inside thereof, said substrates is irradiated on their surface with ultraviolet so that said liquid crystal and said polymer precursor in said liquid crystal polymer precursor compatible solution can be phase-separated from each other to thereby produce a polymer dispersion type liquid crystal in which liquid crystal droplets are dispersed and held in a polymer matrix, wherein temperature of said liquid crystal polymer precursor compatible solution at the time of said irradiation of ultraviolet is rendered higher than a thermal phase separation temperature of said liquid crystal polymer precursor compatible solution.

(40) In the above described aspect (39), said temperature of said liquid crystal polymer precursor compatible solution is rendered higher than said thermal phase separation temperature of said liquid crystal polymer precursor compatible solution by 2 to 15° C.

(41) In the above described aspect (39), intensity of ultraviolet irradiation is set to be not less than 160 mW/cm$^2$.

(42) In the above described aspect (39), said temperature of said liquid crystal polymer precursor compatible solution is rendered higher than said thermal phase separation temperature of said liquid crystal polymer precursor compatible solution by 6 to 13° C. and also said intensity of ultraviolet irradiation is set at 160 mW/cm$^2$ to 400 mW/cm$^2$.

(43) A method for producing a polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein liquid crystal molecules in said liquid crystal droplets present a bipolar-form orientation pattern having at least two poles in the vicinity of interfaces between said liquid crystal droplets and said polymer compound, while no voltage is applied to said electrodes, and wherein, where a clear point transition temperature of said liquid crystal used in said polymer dispersion type liquid crystal display element is let be Tni, said bipolar-form orientation pattern is maintained under an operating temperature of said element falling in the range of from 5° C. to (Tni–5)° C., said method comprising the step that under the condition that said liquid crystal polymer precursor compatible solution including liquid crystal and polymer precursor placed between said pair of substrates is kept at a higher temperature than a thermal phase separation temperature of said liquid crystal polymer precursor compatible solution, said liquid crystal polymer precursor compatible solution is irradiate with ultraviolet to allow said liquid crystal and said polymer compound to be phase-separated from each other.

(44) In the above described aspect (39), said temperature of said liquid crystal polymer precursor compatible solution is rendered higher than said thermal phase separation temperature of said liquid crystal polymer precursor compatible solution by 2 to 15° C. and also said intensity of ultraviolet irradiation is set at not less than 100 mW/cm$^2$.

(45) In the above described aspect (43), said temperature of said liquid crystal polymer precursor compatible solution is rendered higher than said thermal phase separation temperature of said liquid crystal polymer precursor compatible solution by 6 to 13° C. and also said intensity of ultraviolet irradiation is set at 160 mW/cm$^2$ to 400 mW/cm$^2$.

(46) In the above described aspects (39) to (45), said liquid crystal polymer precursor compatible solution includes monofunctional acrylate and/or multifunctional acrylate.

(47) In the above described aspect (46), said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

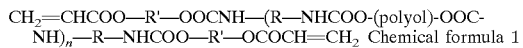

CH$_2$=CHCOO—R'—OOCNH—(R—NHCOO-(polyol)-OOC-NH)$_n$—R—NHCOO—R'—OCOCH=CH$_2$    Chemical formula 1 where n=an integer.

(48) A method for producing a polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein a value of (V90×R)/d is 0.7 or more, where V90 is an applied voltage required for transmittance of a voltage-transmittance characteristic of said polymer dispersion type liquid crystal display element to become 90% under 30° C. of the temperature of element; d is an interval between said pair of substrates; and R is an average particle size of said liquid crystal droplets, said method comprising the step that under the condition that said liquid crystal polymer precursor compatible solution including liquid crystal and polymer precursor placed between said pair of substrates is maintained at a higher temperature than a thermal phase separation temperature of said liquid crystal polymer precursor compatible solution, said liquid crystal polymer precursor compatible solution is irradiate with ultraviolet to allow said liquid crystal and said polymer precursor to be phase-separated from each other.

(49) In the above described aspect (48), said temperature of said liquid crystal polymer precursor compatible solution is rendered higher than said thermal phase separation temperature of said liquid crystal polymer precursor compatible solution by 2 to 15° C. and also said intensity of ultraviolet irradiation is set at not less than 100 mW/cm$^2$.

(50) In the above described aspect (48), said temperature of said liquid crystal polymer precursor compatible solution is rendered higher than said thermal phase separation temperature of said liquid crystal polymer precursor compatible solution by 6 to 13° C. and also said intensity of ultraviolet irradiation is set at 160 mW/cm$^2$ to 400 mW/cm$^2$.

(51) In the above described aspects (48) to (50), said liquid crystal polymer precursor compatible solution includes monofunctional acrylate and/or multifunctional acrylate.

(52) In the above described aspect (51), said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

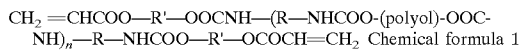

CH$_2$=CHCOO—R'—OOCNH—(R—NHCOO-(polyol)-OOC-NH)$_n$—R—NHCOO—R'—OCOCH=CH$_2$    Chemical formula 1 where n=an integer.

(53) A polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein said polymer dispersion type liquid crystal display element is so constructed that when capacitance ratio of said element is defined by Expression 3-3 given below, said capacitance ratio becomes 60% or more for a voltage required for light transmittance of said element to become 10% or more:

Capacitance ratio=(capacitance for the case of any selected voltage being applied to the element/a maximum capacitance for the applied voltage) ×100    Expression 3-3

(54) In the above described aspect (53), said maximum applied voltage is 10V or more.

Next, the significance of the constructions described above will be described below.

As described above, the inventors measured the electro-optical characteristics caused by the change in the orientation pattern in the polymer matrix and discovered the phenomenon that the optical hysteresis increases when the liquid crystals are transformed from the bipolar-form orientation pattern to the radial-form orientation pattern in low temperature. Accordingly, the transition to the radial-form orientation pattern is suppressed in relatively low temperatures as well, in other words, the orientation pattern of the liquid crystals is allowed to be substantially invariable within the operating temperature range of the liquid crystal display element, whereby the optical hysteresis can be drastically reduced particularly in low temperatures to accomplish a satisfactory display performance in a wide temperature range.

A mechanism for the transition of orientation to be caused is briefly described below, before the description on the suppression of the transition of orientation pattern is given.

The liquid crystal molecules at their interfaces with the polymer are oriented with given tilt angles under relatively high temperatures, while on the other hand, they are oriented with their orienting vertical to the interfaces at low temperatures. Incidentally, the orientation pattern of the liquid crystal molecules in the polymer matrix of the polymer dispersion type liquid crystal display element, in which liquid crystals are dispersed in the polymer, is strongly dependent on the orientation of the liquid crystal molecules at their interfaces with the polymer. In other words, the liquid crystals in the polymer matrix take on an orientation pattern in which elastic energy, including potential energy, of the liquid crystal molecules at the interfaces assumes a minimum. Accordingly, under relatively high temperatures, the liquid crystal molecules inside of the liquid crystal droplets take on the orientation determined by this nature, resulting in the bipolar-form orientation pattern.

On the other hand, with decreasing temperature, there arises the transition to the radial-form orientation pattern.

The inventors found out that the above-described orientation transition temperature is dependent on anchoring strength in the interfaces between the polymer and the liquid crystals, and as such can allow the orientation transition temperature to decrease by increasing the anchoring strength. It seems that that is because orientation of the liquid crystal molecules at the interfaces of the polymer and the liquid crystal adjoining each other is determined by the anchoring strength at the interfaces, so that, when the anchoring strength is weak, the molecular major axis of each liquid crystal molecule tends to rotate easily, while on the other hand, when the anchoring strength is strong, the molecular major axis is strongly restrained by the interfaces and thus the liquid crystal molecules in the vicinity of the interfacial boundary tend to have difficulties in moving.

However, existing techniques have great difficulties in measuring the anchoring strength directly. Accordingly, the inventors introduced the above-mentioned expression of (V90×R)/d as an anchoring index to estimate a magnitude of the anchoring strength, as mentioned above, where V90 (volt) is an applied voltage required for the transmittance to become 90% at temperature of element of 30° C.; d ($\mu$m) is an interval between the substrates; and R ($\mu$m) is an average particle size of a liquid crystal droplet in polymer matrix, or an average interval of a three dimensional network form of matrix comprising polymer compound.

Specifically, suppose that the liquid crystal droplets having a particle size of R are formed with linking with each other in the thickness direction of a pair of substrates spaced at an interval of d, the number of liquid crystal droplets existing between the substrates can be determined by d/R. So, when V90 is divided by the d/R, that follows (V90×R)/d, which indicates an applied voltage per matrix when the transmittance is 90%. Thus, the value of (V90×R)/d decreases when the anchoring strength of the interfaces is weak, and increases when reverse. This is because the weaker the anchoring strength, the more the liquid crystal molecules tend to be oriented in the electric field direction with a smaller field intensity.

The measurement result on the correlation between the anchoring strength and the orientation transition temperature is shown in FIG. 20. This proved that reduction of a lower limit of the operating temperature range to 10° C. or less requires (V90×R)/d$\geq$0.7. Similarly, reduction of a lower limit of the operating temperature range to 5° C. or less requires (V9×R)/d$\geq$0.8, and reduction of a lower limit of the operating temperature range to 0° C. or less requires (V90×R)/d$\geq$0.9. Thus, the liquid crystal display element responsive to a desired operating temperature range can be produced by controlling the anchoring index (anchoring strength). In particular, the polymer dispersion type liquid crystal display element usable at lower temperatures than ever can be produced by increasing the anchoring index.

Further, the inventors discovered that the anchoring strength is dependent on polymerization temperature of polymer during irradiation of ultraviolet and established the technique of setting the anchoring strength at a desired value. In general, the liquid crystal display element is produced by the following. A liquid crystal panel, in which compatible material of polymer driver and liquid crystal is injected in between a pair of spaced apart opposing glass substrates, is kept at a given temperature and is irradiated with ultraviolet, so as to allow the liquid crystals to separate by phase separation and also allow the polymer driver to be polymerized. During the irradiation of ultraviolet, the liquid crystal panel was conventionally kept at the given temperature which was substantially the same as the temperature for the phase separation to be generated. In contrast to this, when the liquid crystal panel is irradiated with ultraviolet, with its kept at a certain temperature slightly higher than the temperature for the phase separation to be generated, a phase separation line of the spinodal decomposition which indicates a temperature condition for generation of a phase separation is shifted toward higher temperature rapidly to allow the phase separation to occur when the phase separation line reaches the temperature of the liquid crystal panel. Thus, the anchoring strength can be set at any desired magnitude by controlling the above-described certain temperature (the temperature of the mixed solution of the polymer driver and the liquid crystal) during the irradiation of ultraviolet.

The variations of the anchoring strength, depending on temperatures of the liquid crystal panel during the irradiation of ultraviolet, is thought to be due to the following. The degree of polymerization of the polymer precursor around the liquid crystals separated by the phase separation varies in response to the temperature of the then liquid crystal panel. As the configuration temperature rises, development of the polymer precursor into polymer increases and resultantly the viscosity increases. In addition, the viscosity is correlated with the anchoring strength, and as the viscosity increases, the anchoring strength increases. Due to this, the anchoring strength is increased by rising the temperature of the liquid crystal panel during the irradiation of ultraviolet.

Thus, the transition temperature, in which the orientation pattern is transformed from the bipolar form to the radial form, is allowed to decrease by rising the temperature of the liquid crystal panel during irradiation of ultraviolet in the process of manufacturing the liquid crystal display element, and thereby the optical hysteresis at low temperatures can be reduced to obtain the liquid crystal display element having good display performance in a wide temperature range.

It is noted that in excessively high temperatures, it takes long time for polymerization, to lead to increase in particle size of the liquid crystal droplets. In this case, if there is a scratch defect in the glass substrates, for example, due to variations in the degree of separation of the liquid crystals, variations in the particle size of the liquid crystal droplets are caused easily, so that there is a possible fear that an uniform display over the entire display screen cannot be accomplished. Due to this, it is preferable that the liquid crystal panel is irradiated with ultraviolet, with kept at a constant temperature higher than the phase-separation-generation temperature by 3–15° C. for example.

Also, it is preferable that the intensity of ultraviolet with which the liquid crystal panel is irradiated should be rendered higher than a given intensity. This is because low intensity of ultraviolet causes decreased rate of polymerization and in turn causes increased particle size of the liquid crystal droplets, and accordingly there is a possible fear of failing to realize the uniform display. Specifically, the ultraviolet should be preferably irradiated at an intensity more than 100 mW/cm$^2$, for example.

On the other hand, the transition temperature in which the orientation pattern is transformed from the bipolar form to the radial form can be lowered also by allowing tilt angles of the liquid crystal molecules at their interfaces with the polymer to decrease by adding an additive or equivalent. This is because, with decreasing tilt angles, the difference in energy between the bipolar-form orientation pattern and the radial-form orientation pattern increases and the bipolar-form orientation pattern is more stable in energy. Specifically, the tilt angles should be set to be 10° or less, preferably 5° or less to cause hard transition to the radial-form orientation pattern.

(3) 3rd Inventive Group

In the third inventive group, the capacitance hysteresis Chys defined by the following expression 3-1 and the optical hysteresis Thys defined by the following expression 3-2 are newly introduced as indexes to determine the optical hysteresis in association with the orientation pattern of the liquid crystal molecules, and with the aid of these indexes, the liquid crystal display element small in the optical hysteresis in the operating temperature range of the liquid crystal display element (driving temperature of the element) is accomplished. Detailed description of the capacitance hysteresis Chys will be given later.

$$\text{Capacitance hysteresis Chys}=(C2-C1)/C\max \qquad \text{Expression 3-1,}$$

where
- C1: capacitance for any applied voltage V, in the process of rising, of a voltage-capacitance characteristic;
- C2: capacitance for any applied voltage V, in the process of dropping, of the voltage-capacitance characteristic; and
- Cmax: capacitance for a maximum applied voltage of the voltage-capacitance characteristic.

$$\text{Optical hysteresis Thys}=(T2-T1)/T\max \qquad \text{Expression 3-2,}$$

where
- T1: intensity of transmitted light for any applied voltage V, which is in the process of rising, of the voltage-transmittance quantity characteristic;
- T2: intensity of transmitted light for the applied voltage V, which is in the process of dropping, of the voltage-transmittance quantity characteristic; and
- Tmax: intensity of transmitted light for a maximum applied voltage, of the voltage-transmittance quantity characteristic.

It is noted that the term used above, "a maximum applied voltage", is intended to mean an applied voltage required for the liquid crystal molecules to be fully oriented in the direction of electrical field. This voltage may be varied by variations in panel gap or the like. A general type of polymer dispersion type liquid crystal display element is so formed that a 10–15 volt is required for allowing the liquid crystal molecules to be oriented in the direction of electrical field.

The third inventive group comprises the 55th–64th aspects described below.

(55) A polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein, when capacitance hysteresis in an operating temperature of said polymer dispersion type liquid crystal display element is defined by Chys=(C2−C1)/Cmax, the Chys for any applied voltage V is 1.5% or less, where C1 is capacitance for any applied voltage V, which is in the process of rising, of a voltage-capacitance characteristic; C2 is capacitance for the applied voltage in the process of dropping; and Cmax is capacitance for the maximum applied voltage.

(56) In the above described aspect (55), where a clear point transition temperature of said liquid crystal is let be Tni, said Chys is 1.5% or less in operating temperatures of said element falling in the range of from 5° C. to (Tni−5)° C.

(57) In the above described aspect (55), where a clear point transition temperature of said liquid crystal is let be Tni, said Chys is 1.5% or less in operating temperatures of said element falling in the range of from 0° C. to (Tni−5)° C.

(58) In the above described aspect (55), where a clear point transition temperature of said liquid crystal is let be Tni, said Chys is 1.5% or less in operating temperatures of said element falling in the range of from −5° C. to (Tni−5)° C.

(59) In the above described aspects (55) to (58), said maximum applied voltage is 10V or more.

(60) A polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein, when optical hysteresis Thys in an operating temperature range of said polymer dispersion type liquid crystal display element is defined by Thys=(P2−P1)/Pmax, where P1 is intensity of transmitted light for an any applied voltage V, which is in the process of rising, of a voltage-transmittance quantity characteristic; P2 is intensity of transmitted light for the applied voltage in the process of dropping; and Pmax is intensity of transmitted light for a maximum applied voltage, and further when capacitance hysteresis Chys in an operating temperature of said polymer dispersion type liquid crystal display element is defined by Chys=(C2−C1)/Cmax, where C1 is capacitance for any applied voltage V, which is in the process of rising, of a voltage-capacitance characteristic; C2 is capacitance for the applied voltage in the process of dropping; and Cmax is capacitance for the maximum applied voltage, the Chys for the applied voltage with which said Thys is maximized is 0.6% or less.

(61) In the above described aspect (60), a clear point transition temperature of said liquid crystal is let be Tni, the value of said Chys is 0.6% or less in operating temperatures of said element falling in the range of from 5° C. to (Tni−5)° C.

(62) In the above described aspect (60), a clear point transition temperature of said liquid crystal is let be Tni, the value of said Chys is 0.6% or less in operating temperatures of said element falling in the range of from 0° C. to (Tni−5)° C.

(63) In the above described aspect (60), a clear point transition temperature of said liquid crystal is let be Tni, the value of said Chys is 0.6% or less in operating temperatures of said element falling in the range of from −5° C. to (Tni−5)° C.

(64) In the above described aspects (60) to (63), said maximum applied voltage is 10V or more.

Next, the significance of the constructions described above will be described below.

In a general type of polymer dispersion type liquid crystal display element, liquid crystal molecules in the liquid crystal droplets are individually oriented in different directions while no voltage is applied to the element. Due to this, light incident on the element is scattered to produce the opaque state. On the other hand, when voltage is applied thereto, the liquid crystal molecules are oriented in the direction perpendicular to the substrates, and as a result, light can be transmitted to produce the transparent state. In addition, an intermediate state between the scattering state and the transparent state can be displayed by adjusting a level of the applied voltage. However, the polymer dispersion type liquid crystal have the optical hysteresis caused by the interfacial restrictive force, as mentioned above. This causes a difference between the transmittance in the process of voltage rise and the transmittance in the process of voltage drop even at an identical level of voltage, and resultantly causes a problem of unstable display performance in a halftone, in particular.

The inventors tried to pursue the origins of the strong optical hysteresis, particularly, of the optical hysteresis strengthened in the low temperature range, in the polymer dispersion type liquid crystal. Though there is a precedent for the measurement of the optical hysteresis (e.g. Society for information Display+92, Pages 575–578 by S. Niiyama, et. al.), there is no precedent for the optical hysteresis measured in relation to the orientation pattern of the liquid crystals in the polymer dispersion type liquid crystal. Accordingly, the inventors measured capacitance as a physical value, which reflects the orientation pattern of liquid crystals more directly than the transmittance does, to establish the technique of estimating the orientation pattern of the liquid crystals by means of the capacitance and realized the polymer dispersion type liquid crystal display element capable to reduce the optical hysteresis in a low temperature range, based on the information obtained by the established technique.

The capacitance is a physical value originating from anisotropy in dielectric constant of the liquid crystal molecules, and so a magnitude of the capacitance reflects the orientation pattern of the liquid crystals directly. Therefore, the optical hysteresis originating from the shape and the orientation pattern of the liquid crystal droplets can be determined in relation to the behaviors of the liquid crystal molecules by gaining a knowledge of hysteresis in the capacitance (capacitance hysteresis). The optical hysteresis is a property that appears as a result of various factors, including the anchoring strength, the panel gap, and the dielectric constant, refractive index and temperature of the liquid crystal, being intricately affected each other.

The relationship between the optical hysteresis and the capacitance hysteresis is described below, based on the experimental results. Of the experimental results described below, Experiment 1 is the same as Embodiment 3-1 of the third inventive group discussed later, so the details such as measurement conditions, are shown in Embodiment 3-1.

Experiment 1

The measurement result on the transmittance and the capacitance hysteresis at the element temperature of 30° C. is shown in FIG. 22 in the form of voltage-transmittance characteristics and voltage-capacitance characteristics. It is seen from FIG. 22 that a voltage corresponding to the transmittance of 10% was 4.47V and the capacitance ratio C % corresponding to the voltage was 60%.

The capacitance ratio indicates a value defined by the following expression 3-3.

Capacitance ratio $C\% = (C/Cmax) \cdot 100$   Expression 3-3 where Cmax is a capacitance at a maximum applied voltage and C is a capacitance in any applied voltage.

In order to confirm whether the above results can be generalized or not, various kinds of elements different in the optical hysteresis were prepared and were subjected to similar experiments. The experimental conditions are described in Example 3-1 discussed later. The experimental result is shown in FIG. 27. It was confirmed in FIG. 27 that the larger optical hysteresis the liquid crystal display element has, the smaller the capacitance ratio of a 10% -transmittance-providing voltage. In detail, a 2% or less hysteresis requires that a capacitance ratio of the 10%-transmittance-providing voltage of the voltage-transmittance characteristics be set 60% or more. Similarly, an 1% or less optical hysteresis requires that a capacitance ratio of the 10% -transmittance-providing voltage of the voltage-transmittance characteristics be set 66% or more.

It was proven by the above experimental results that the panel having reduced optical hysteresis can be realized by specifying the value of capacitance hysteresis.

Experiment 2

FIG. 23 is a plot of the results of Experiment 1, laying off the values of applied voltages as abscissa and the capacitance hysteresis Chys and the optical hysteresis Thys as ordinate, to indicate the voltage-Chys characteristics and the voltage-Thys characteristics. In this figure, a maximum of Chys is designated as Chys MAX; a maximum of Thys as Thys Max; and a value of Chys in the voltage in which the Thys reaches the maximum as Chys·Thys MAX.

It was understood from FID. 23 that the Chys peaks at a lower voltage than the Thys and that the peak of the Chys is lower than that of the Thys.

Experiment 3

In order to check for the correlation between the Thys and Chys MAX, various kinds of elements were prepared under the manufacturing conditions shown in TABLE 3-1 below and were measured with respect of the voltage-capacitance characteristics with driving temperature varied. The measurement result is shown in TABLE 3-2. Shown in FIG. 24(a) is a showing of the measurement result plotted between the Thys (%) and the Chys MAX (%), and shown in FIG. 24(b) is a showing of the same plotted between the Thys (%) and the Chys·Thys MAX (%).

TABLE 3-1

| Marks in FIG. 24 | Composition of Liquid Crystal Precursor Compatible Solution | UV Intensity mW/cm$^2$ | Polymerization Temperature ° C. |
|---|---|---|---|
| ● | 2 wt % of HDDA is added (N.B.) | 95 | 11 |
| × | The same as Example 3-1 (N.B.) | 95 | 17 |
| * | The same as Example 3-1 (N.B.) | 95 | 21 |
| ▲ | 2 wt % of FM108 is added (N.B.) | 95 | 11 |
| ■ | The same as Example 3-1 (N.B.) | 20 | 11 |

(N.B.) Adding the same to compatible solution of Example 3-1; HDDA: KARARAD available from NIPPON KAYAKU CO., LTD.; and Light Acrylate FM108 available from KYOEISHA CHEMICAL CO., LTD.,

TABLE 3-2

| Marks in FIG. 24 | Hysteresis Characteristics | Measurement Temperature (Element Driving Temperature) ° C. | | | | | | |
|---|---|---|---|---|---|---|---|---|
| | | 0 | 5 | 10 | 20 | 30 | 40 | 50 |
| ● | THys | 2.34 | 2.11 | 2.08 | 3.26 | 4.14 | 4.28 | 4.82 |
| | CHys MAX | 1.78 | 1.68 | 1.70 | 2.07 | 2.36 | 2.32 | 1.97 |
| X | THys | 38.2 | 15.6 | 3.84 | 0.98 | 1.49 | 1.58 | 1.99 |
| | Chys MAX | 14.6 | 7.4 | 3.0 | 1.22 | 1.49 | 1.72 | 1.35 |
| * | THys | 20.0 | 5.96 | 1.87 | 1.68 | 2.50 | 1.84 | 3.0 |
| | Chys MAX | 8.10 | 2.99 | 1.40 | 1.30 | 1.64 | 1.58 | 1.45 |
| ▲ | THys | — | — | 37.7 | 3.53 | 0.83 | 0.92 | 1.10 |
| | Chys MAX | — | — | 9.77 | 2.28 | 1.39 | 1.54 | 1.08 |
| ■ | THys | — | — | 39.6 | 2.74 | 1.74 | 2.16 | 2.60 |
| | Chys MAX | — | — | 15.0 | 2.54 | 1.67 | 1.98 | 1.64 |

It was understood from FIG. 24(a) that a not more than 2% Thys requires setting the Chys MAX to be 1.5% or less, while a not more than 1% Thys requires setting the Chys MAX to be 1.0% or less.

Shown in FIG. 24(b) is a showing of the Chys·Thys MAX, the capacitance hysteresis for a voltage required for the optical hysteresis to comes to peak. It is seen from FIG. 24(b) that there is a correlation between the optical hysteresis and the magnitude of the capacitance hysteresis for the applied voltage required for the optical hysteresis to become a maximum. This correlation indicates that the element having small optical hysteresis can be produced by allowing a peak (Thys MAX) of the optical hysteresis and a peak (Chys MAX) of the capacitance hysteresis shown in FIG. 23(b) to be away from each other or by allowing the peak of the capacitance hysteresis to decrease. It can be also seen that a not more than 2% the optical hysteresis requires the capacitance hysteresis peaking at a voltage to be set to be about 0.6% or less, and a not more than 1% optical hysteresis requires the capacitance hysteresis to be set to be about 0.3% or less. The details of conditions required for preparation are omitted, though the relationship between the Thys % and the Chys MAX in a high optical hysteresis region and the relationship between the Thys% and the Chys·Thys MAX (%) are plotted in a similar manner to the above in FIG. 25(a) and FIG. 25(b), respectively. It was confirmed in these FIGS. also that there exists the above-described correlation therebetween.

It is noted that the difference between the peak of the optical hysteresis (Thys MAX) and the peak of the capacitance hysteresis (Chys MAX) is due to the following. The magnitude of capacitance is a physical value which directly reflects the degree of rise of liquid crystal molecules (the angle between the major axis of rising molecule and the substrate), whereas the transmittance is not in a one-to-one correspondence with the angle above. For example, even when the liquid crystal molecules is raised slightly by application of voltage, the scattering of light is still maintained.

To secure the practical display performance requires the optical hysteresis of the element to be set to be preferably 2% or less, more preferably 1% or less. The reason therefor is that the element of a not more than 2% optical hysteresis is usable as display elements, such as data projections, mainly for displaying characters or letters, and further the element of a not more than 1% optical hysteresis ensures sufficient gray scale display performance so that it can be used to displays for displaying images or equivalent.

As described above, the polymer dispersion type liquid crystal display element having small optical hysteresis can be surely produced by specifying the capacitance hysteresis. In general, the magnitude of the optical hysteresis varies depending on the temperature of element, so it is essential that the optical hysteresis is reduced in the temperature range in which the liquid crystal display element is worked (the driving temperature range of the element). Specifically, the element having a not more than 2% optical hysteresis in the temperature range of 10° C. to 80° C. is usable to projection type displays, and the element having the optical hysteresis of not more than 2% in the temperature range of −20° C. to 80° C. is usable as displays on board of automobiles or equivalent.

The optical hysteresis can be estimated by the degree of difference between the peaks, rather than by a value of the capacitance hysteresis at a peak of the optical hysteresis.

(4) 4th Inventive Group

According to this inventive group, attention is given to the relationship between a surface tension of a droplet-formed liquid crystal of a liquid crystal optical element and a critical surface tension of an insulating film or a polymer compound in the form of a matrix of liquid crystal droplets. The invention as this inventive group aims to improve temperature dependency, a response-to-electric field characteristic, and the like, of the liquid crystal optical element by holding this relation within a given range.

Further, the invention aims to achieve the object by improving the material of the insulating film.

Furthermore, the invention aims to achieve the same object by selecting the material of the polymer compound and to simultaneously provide the method for producing an excellent liquid crystal optical element with efficiency.

The fourth inventive group comprises the 65th–118th aspects.

The $65^{th}$ aspect is characterized in that in a polymer dispersion type liquid crystal display element in which a polymer·liquid crystal complex in which droplets of liquid crystal are dispersed in a polymer compound is filled in a space between a pair of electrodes supported by substrates and covered with insulating films, surface tension γ LC of said liquid crystal and critical surface tension γ P of said insulating films meet the relation of Expression 4-1:

$$\gamma LC - \gamma P < 0 \qquad \text{Expression 4-1.}$$

According to the $66^{th}$ aspect, in the above described aspect 65, said surface tension γ LC of said liquid crystal and said critical surface tension γ P of said insulating films further meet the relation of Expression 4-2:

$$-1 \cdot \text{dyne/cm} < \gamma LC - \gamma P \qquad \text{Expression 4-2.}$$

The $67^{th}$ aspect is characterized in that in the above described aspect 66, said polymer·liquid crystal complex has a value of γ, which indicates steepness of a threshold of a scattering-transmittance characteristic, falling in the range of 1.95 to 2.25.

The $68^{th}$ aspect is characterized in that in a polymer dispersion type liquid crystal display element in which a polymer·liquid crystal complex in which droplets of liquid crystal are dispersed in a polymer compound is filled in a space between a pair of electrodes supported by substrates and covered with insulating films, surface tension γ LC of said liquid crystal and critical surface tension γ P of said insulating films meet the relation of Expression 4-3:

$$0 < \gamma LC - \gamma P < 1 \cdot \text{dyne/cm} \qquad \text{Expression 4-3.}$$

The $69^{th}$ aspect is characterized in that in the above described aspect 65, 66, 67 or 68, said insulating films are made of polyamino acids, polyamino acid derivatives or proteins.

The $70^{th}$ aspect is characterized in that in a polymer dispersion type liquid crystal display element in which a polymer·liquid crystal complex in which droplets of liquid crystal are dispersed in polymer compound is filled in a space between a pair of electrodes supported by substrates and covered with insulating films, critical surface tension γ P of said polymer compound and surface tension γ LC of said liquid crystal meet the relation of Expression 4-4:

$$\gamma P > \gamma LC \qquad \text{Expression 4-4.}$$

The $71^{st}$ aspect is characterized in that in the above described aspect 70, said polymer compound is formed by polymerization of polymerizable monomer and polymerizable oligomer, and further at least one of said polymerizable oligomer and said polymerizable monomer has a polar group.

The 72$^{nd}$ aspect is characterized in that in the above described aspect 71, said polar group is at least one group selected from the group consisting of a hydroxyl group, a carboxyl group and an imino group.

The 73$^{rd}$ aspect is characterized in that in the above described aspect 70, 71 or 72, said γ P and said γ LC meet the relation of an expression 4-4 in a full temperature range (−10° C. to 60° C.) in actual operation of the display element:

$$\gamma P > \gamma LC \qquad \text{Expression 4-4.}$$

The 74$^{th}$ aspect is characterized in a method of producing a polymer dispersion type liquid crystal display element comprising:

the filling step in which a polymer precursor·liquid crystal mixture, including a liquid crystal and a polymer precursor, from which a polymer compound which allows the relation of Expression 4-4 to hold between said liquid crystal and said polymer compound is formed by polymerization, is filled in a space between a pair of electrodes supported by substrates and covered with insulating films, and the polymer·liquid crystal complex forming step in which said polymer compound in said polymer precursor·liquid crystal mixture, after filled, is polymerized to form said polymer compound which allows the relation of Expression 4-2 to hold, while also polymer·liquid crystal complex in which droplets of said liquid crystal are dispersed in the formed polymer compound is formed:

$$\gamma P > \gamma LC \qquad \text{Expression 4-4,}$$

where

γ P is critical surface tension of the polymer compound and γ LC is surface tension of the liquid crystal.

The 75$^{th}$ aspect is characterized in that in the above described aspect 74, said polymer precursor to be treated in said filling step and said polymer precursor·liquid crystal complex forming step is composed of polymerizable monomer and polymerizable oligomer, and further at least one of the polymerizable oligomer and the polymerizable monomer has a polar group.

The 76$^{th}$ aspect is characterized in that in the above described aspect 75, said polar group is at least one group selected from the group consisting of a hydroxyl group, a carboxyl group and an imino group.

The 77$^{th}$ aspect is characterized in that in the above described aspect 74, 75 or 76, said polymerization in said polymer·liquid crystal complex forming step is produced by the method of said polymer precursor·liquid crystal mixture placed between said pair of substrates being irradiated with ultraviolet.

Other aspects are characterized by any proper combination of the 65$^{th}$ to 77th aspects described above.

The significance of the above described constructions will be described below.

Significance of the 65$^{th}$ to 69$^{th}$ Aspects

Of electro-optical characteristics of the general type liquid crystal display elements, the most essential characteristic is a scattering-transmittance characteristic indicating the relationship between the transmittance of light to vertical incident light and an applied voltage. A lot of experiments the inventors made showed that values of γ, which indicate steepness of the threshold characteristic of the scattering-transmittance characteristic, were related to the temperature dependency and the response time of the polymer dispersion type liquid crystal display element, and the inventors found out a certain relative criterion that the values of γ, at which optimal temperature dependency and response time can be obtained, range from about 1.7 to about 2.3. It is noted that the value of γ used here is the one defined by γ=V90/V10, where V10(volt) is a voltage required for the transmittance of light of the liquid crystal display element to vary by 10% and V90(volt) is a voltage required for the transmittance of light of the liquid crystal display element to vary by 90%, when the maximum transmittance of light of the liquid crystal display element is set to be 100%.

Further, it was also found out that the value of γ, which indicates the steepness of the threshold characteristic of the liquid crystal display element, is related to a critical surface tension γ P of an insulating paint film material and a surface tension γ LC of a liquid crystal to be formed into liquid crystal droplets in the polymer dispersion type liquid crystal, so that the value of γ can be controlled by adjusting the mutual surface tensions. The term of "surface tension" used herein is intended to mean surface energy. The significance is specifically described below.

FIG. 28 is a sectional view of a main structure, illustrated in a simplified manner, of the liquid crystal display element of the present invention. The liquid crystal display element of the invention is not essentially different from the conventional type one in the mechanical structure itself.

The polymer dispersion type liquid crystal display element in the 65$^{th}$ to 69$^{th}$ aspects comprises, as shown in FIG. 28, a pair of opposing, support substrates 411, 412 made of transparent glasses or crystals and having inner surfaces on which transference electrodes 413 of indium·tin oxide and insulating paint films 414 made of various kinds of insulating paint film materials described later and covering the transference electrodes 413 are laminated; and polymer dispersion type liquid crystal 417 which is filled in between the transference electrodes 413 oppositely disposed with the insulating paint films 414 confronting each other and in which droplets 416 of liquid crystal are dispersed in polymer compound 415. The surface tension γ LC of the liquid crystal and the critical surface tension γ p of the insulating paint films 414 then meet any one of the requirements of γ LC −γ p<0 (hereinafter it is called conditional expression ①), −1 dyne/cm<γ LC−γ p <1 dyne/cm (hereinafter it is called conditional expression ②) or −1 dyne/cm<γ LC−γ p<0 (hereinafter it is called conditional expression ③). The peripheries of the element, not shown, are joined together by sealing members produced by curing acid anhydride curing epoxy resin reinforced by glass fiber, for example, so as to form a closed container formed in one piece as a whole.

The value of γ, which indicates steepness of threshold characteristic of the scattering-transmittance characteristic which is a basic electro-optical characteristic of the liquid crystal display element, is controlled in association with adjustment of the relation between the critical surface tension γ p of the insulating paint films 414 covering the transference electrodes 413 on the interior surfaces of the support substrates 411, 412 and contacting with the polymer dispersion type liquid crystal 417 and the surface tension γ LC of the liquid crystal to be formed into droplets 416 of liquid crystal in the polymer dispersion type liquid crystal 417. It is thought that this is caused by the following operation.

The provision of the insulating paint films 414 contacting with the polymer dispersion type liquid crystal 417, and also the interval between the pair of insulating paint films being as narrow as about 13 μm, contribute to cause an interactive force, such as Van der Waals force or polarity-polarity interactive force, to work between the insulating paint films and the liquid crystals. The interactive force further exerts on the droplets 416 of the liquid crystal material in the interior of the polymer dispersion type liquid crystal 417 apart from the surfaces of the insulating paint films 414.

The existence of this interactive force allows the interfacial restrictive force acting on the liquid crystal droplets 416 from the polymer matrix 415 (equivalent of a torque required for the transition of orientation) to vary, which in turn allows the value of γ which indicates steepness of a threshold level in the liquid crystal display element to vary. Then, when the value of γ of the liquid crystal display element vary, the temperature dependency of the interfacial restrictive force acting on the liquid crystal droplets 416 from the polymer compound 415 varies with reference to the interactive force applied from the insulating paint films 1. As a result of this, not only the temperature dependency of the driving voltage, etc. but also the response time become optimal. It seems that under the circumstance under which the liquid crystal material is more prone to got wet by the insulating paint films 414 due to the both being polarized, for example, the interactive force acting on the liquid crystal material from the insulating paint films 414 increases in strength, and under the circumstance, the temperature dependency is also more prone to improvement.

Significance of the 70$^{th}$ to 77$^{th}$ Aspects

As for the relationship between the critical surface tension of the polymer compound and the surface tension of the liquid crystal material, when the critical surface tension γ P of the polymer compound and the surface tension γ LC of the liquid crystal meet the requirement of γ P>γ LC, the interface polymer/liquid crystal becomes stable in energy and then the liquid crystal molecules (director) are oriented at small angles by the polymer compound interfacial tension to produce the bipolar-form orientation shown in FIG. 41(1). The bipolar-form orientation pattern can allow the orientations of the liquid crystal molecules to be changed by less kinetic energy than the radial-form orientation pattern, so that the response to electric field (response time) through the on/off of voltage is improved and also the hysteresis is reduced.

Although the liquid crystal is easily affected electro-optically by variations in temperature, since the γ P>γ LC provides surface energy of the polymer compound larger than the surface energy of the liquid crystal material, the degree of the liquid crystal being electro-optically effected by the variations in temperature is relatively decreased. Thus, the temperature dependency of the voltage optical characteristics can be reduced.

As for the manufacturing method, it is preferable for the control of diameter and dispersion of liquid crystal particles that the mixture of polymer precursor and liquid crystal material is irradiated with ultraviolet in the phase separation method, whereby the polymer precursor is polymerized and phase-separated. The significance is specifically described below.

In the 70$^{th}$ to 77$^{th}$ aspects, various kinds of liquid crystal materials, such as nematic liquid crystal, cholesteric liquid crystal, and smectic liquid crystal, which exhibit a liquid crystal state in around room temperature, can be used as the liquid crystal material. The liquid crystal material may be used singularly or in combination of two or more kinds. Also, the liquid crystal material may be used with containing a two-tone coloring matter therein. For example, polymer·liquid crystal complexes in which two-tone coloring matters having different colors are contained may be laminated to form an optical element capable of full-color display.

The polymer compound used in the embodied forms has light permeability and holds the expression 4 in association with the liquid crystal forming the dispersion phase. The polymer·liquid crystal complexes capable to hold the expression 4 enable the liquid crystal molecules to be oriented at small tilt angles to the wall of matrix, so that the response-to-electric-field of the liquid crystal display element and the temperature dependency of the voltage optical characteristics is reduced. Preferably, the requirement of the expression 4 should be always allowed to hold in a full temperature range (−10° C. to 60° C.) in actual operation of the liquid crystal display element. This formation can provide a good and stable display in a wide temperature range. The significance of the requirement of the expression 4-4 is discussed later.

$$\gamma P > \gamma LC \qquad \text{Expression 4-4}$$

where

γ LC is surface tension of liquid crystal, and

γ P is critical surface tension of polymer compound.

Further, it is preferable that the polymer compound used has a good affinity for the liquid crystal; For example, the polymer compounds having a polar group such as a hydroxyl group, a carboxyl group or an imino group should be preferably used. In addition, in consideration of the manufacturing circumstances, it is desirable that the polymer compound be produced by the polymer precursor being injected in between the electrodes and thereafter polymerized. In this step, it is preferable to use means for allowing polymerizable monomer and polymerizable oligomer to be polymerized to produce the polymer compound, in terms of productivity of good quality of polymer·liquid crystal complex.

Further, in the case of the polymer compound being produced by the polymerization after injection, it is preferable that the polymerizable monomer and polymerizable oligomer are both used and at least one of the monomer and the oligomer has the polar group, more preferably, the polar group should include hydroxyl group, carboxyl group or imino group. This is because, when at least one of the monomer and the oligomer has the polar group including the hydroxyl group, the polymer compound having high hydrophilic nature (affinity) can be produced, and the polymer compound having high hydrophilic nature thus produced can provide better wetting in the interface polymer/liquid crystal to improve the response to electric field and the voltage optical characteristics of the element. To be more specific, energetic stability in the interface polymer/liquid crystal is improved and the liquid crystal molecules can be allowed to exist at smaller angles to a wall surface of the polymer. In addition, the better wetting reduces the tendency of transition of orientation pattern of the liquid crystal molecules (transition from the bipolar form to the radial form) due to variations in temperature, which in turn can allow the temperature dependency of the liquid crystal display element to be reduced.

The polymerizable polymer precursors which may be used include various kinds of polymerizable materials which are polymerized by light (ultraviolet) and heat to produce a transparent polymer compound. In general, the monomer or oligomer having a polymerizable functional group such as acrylate, methacrylate and epoxy is used. To be more specific, the polymerizable monomers which may be used include 2-ethylhexyl acrylate, 2-hydroxyethyl acrylate, monohydroxyethyl acrylate phathalate, neopentyl glycol diacrylate and hexanedioldiacrylate. The oligomers which may be used include urethan acrylate, 1,6 hexanedioldiacrylate, pentaerythlytoldiacrylate monostearate, oligourethane acrylate, polyester acrylate and glycerine diglycidylether.

Examples of the polymerizable polymer precursors having the hydroxyl group are M-5700 (monomer) and M233 (oligomer) available from TOAGOSEI CO., LTD., and an example of the polymerizable polymer precursor having the carboxyl group is M-5400 (monomer) available from TOAGOSEI CO., LTD. Further, examples of the polymerizable polymer precursors having the imino group are M-1200 (oligomer) and M-1600 (oligomer) available from TOAGOSEI CO., LTD. and UF-8001 available from KYOEISHA CO., LTD.

For meeting the requirement of the γ P>γ LC in a wide actual operating temperature range, the polymer material and the liquid crystal material must be combined properly. The polymer compound which is polymerized by use of the polymerizable monomer and/or polymerizable oligomer having the hydroxyl group, carboxyl group and imino group, as described above, combined with the liquid crystal material compatible therewith, e.g. MT5524 available from CHISSO PETROCHEMICAL CORPORATION can realize the liquid crystal display element capable of meeting the requirement of the γ P>γ LC in a wide actual operating temperature range.

The polymer·liquid crystal complex, which is a main component of the polymer dispersion type liquid crystal display element according to the embodied forms, can be produced in any known manner, using the above-listed materials. To be more specific, the known manners which may be used includes a casting process in which a liquid crystal material and a polymer material, after dissolved in a common solvent, are cast; an emulsion process in which the liquid crystal, after emulsified in aqueous solution of water-soluble polymer, is cast; and a phase separation process in which an uniform solution of liquid crystal and polymer forming material is prepared and then is phase-separated by polymerization.

Of the above-described processes, the phase separation process is desirable for the liquid crystal polymer dispersion type liquid crystal display element of the above described embodied forms. More preferable one is a photopolymerization phase separation process (using ultraviolet) using the molymerizable monomer and polymerizable oligomer mentioned above. That is because, in the photopolymerization phase separation process, the liquid crystal is fully dispersed in advance in the polymer precursor having a low viscosity and thereafter the polymer precursor is polymerized to cause the phase separation, so that the particle size of and the condition of dispersion of the liquid crystal droplets can be easily controlled to produce a desirable polymer·liquid crystal complex.

In the case of the photopolymerization phase separation process, a polymerization initiator should preferably be added to the polymer precursor, for smooth polymerization of the polymerizable polymer precursor. The polymerization initiators which may be used include commercially available polymerization initiators, such as Darocure 1173, Darocure 4265 and Irgacure 184 available from CIBA-GEIGY LTD., in addition to Benzyl Methyl Ketal. Two or more kinds of these may be used in combination.

The polymerization of the polymer precursor may be performed in such a manner that the polymer precursor·liquid crystal mixture, which may include the polymerization initiator, is placed in between a pair of substrates and thereafter is irradiated with ultraviolet from the top of the substrates. In this case, the intensity of ultraviolet to be irradiated should be 80 mW/cm$^2$ or more, preferably 150 mW/cm$^2$ or more, and further preferably 200 mW/cm$^2$ or more. The intensity of ultraviolet of 150 mW/cm$^2$ or more allows the optical hysteresis to decrease when the operating temperature of the liquid crystal display element becomes high temperatures, and the intensity of ultraviolet of 200 mW/cm$^2$ or more advantageously allows the orientation transition temperature to decrease significantly.

On the other hand, it is also preferable that the intensity of ultraviolet may be reduced to 30 mW/cm$^2$ or less, to attempt to reduce the driving voltage of the liquid crystal display element. With the intensity of ultraviolet of 30 mW/cm$^2$ or less, the polymer compound is produced so slowly that the particle size of the liquid crystal droplets can be increased. With the liquid crystal droplets having large particle size, the interfacial restrictive force of the polymer compound to the liquid crystal droplets is relatively reduced so that the element capable to be driven through an application of a reduced voltage can be obtained.

Further, the particle size of the liquid crystal droplets of the liquid crystal display element should be set 0.8 μm to 2.5 μm, preferably, 1 μm to 2 μm, depending on what equipment is used and what is the intended use. That is because the liquid crystal droplets of 0.8 μm to 2.5 μm provides the sufficient scattering effect, and the liquid crystal droplets of 1 μm to 2 μm enables the liquid crystal panel to be driven through an application of a low voltage available for the TFT drive.

It is preferable that the cell gap for the polymer·liquid crystal complex to be filled in should be 5 μm or more, preferably 10 μm to 15 μm. This set cell gap can allow both of improved light scattering properties and reduced driving voltage to be achieved by setting the particle size of the liquid crystal droplets properly.

It is to be noted that the most characteristic feature of the polymer dispersion type liquid crystal display element of the above described aspects of the invention is in that the γ P>γ LC holds, and no particular limitation is given to any other factors than the factor of the γ P>γ LC. Thus, the liquid crystal display element of the invention can be produced by any known producing methods plus the requirement of the γ P>γ LC. This enables the polymer dispersion type liquid crystal display element having the features of the embodied forms of the invention to be produced with relative ease.

Incidentally, with the polymer dispersion type liquid crystal in which microscopic liquid crystal droplets are dispersed in a matrix phase of polymer compound, contact areas of the liquid crystals with the polymer compound are significantly large, so that the orientation pattern of the liquid crystal molecules is greatly affected by the interfacial restrictive force (physico-chemical force) of the polymer compound. Accordingly, the polymer dispersion type liquid crystal display element is poorer in response to electric field, as compared with a conventional type liquid crystal display element which is regulated by the substrates only. In addition, the intensity of the interfacial restrictive force is susceptible to temperature, so that, when operating temperature of the element varies, the response to electric field (response time, in particular) and voltage optical characteristics (transmission for an applied voltage) of the liquid crystal molecules vary. Accordingly, the polymer dispersion type liquid crystal display element has a disadvantage of lacking stability in display performance, as compared with conventional type elements such as the TN mode of liquid crystal display element.

There is literature on the interfacial restrictive force of the polymer compound e.g. Sov. Phys. JETP58(6), 1983, Liquid Crystal Dispersions written by P.S.Drzaic, World Scientific 1996, according to which the bipolar-form orientation having two poles is produced under high temperatures of about room temperatures or more, as shown in FIG. 41(1), and the radial-form orientation of liquid crystals being oriented vertically to the interfaces is produced under low temperatures, as shown in FIG. 41(2). FIG. 41 (1) shows the state of liquid crystal molecules being oriented toward two poles along a spherical surface, and FIG. 41(2) shows the state of liquid crystal molecules being oriented with one ends thereof orienting toward the spherical surface and the other ends orienting toward the center of the sphere.

The relationship between the interfacial restrictive force of the polymer compound and the orientation of the liquid crystal molecules is considered below, based on the above literature. It is thought that the liquid crystal molecules in the liquid crystal droplets surrounded by the polymer compound are strongly affected by the physico-chemical force from the polymer compound of matrix and thereby are so oriented that free energy of the interface polymer/liquid crystal can be minimized. As a result, the state of the liquid crystal molecules being oriented in parallel to the interfaces, i.e., the bipolar-form orientation shown in FIG. 41(1), is higher in energetic stability in the polymer/liquid crystal interfacial boundary than the radial-form orientation of the liquid crystal molecules being oriented vertically to the interfaces as shown in FIG. 41(2). From this point, the liquid crystal molecules of the polymer/liquid crystal complex preferably take the bipolar-form orientation, rather than the radial-form orientation which is more susceptible to temperature, while no voltage is applied.

On the other hand, it is desirable for obtaining a satisfactory contrast ratio to allow the liquid crystal molecules to be oriented in parallel to the substrates when no voltage is applied and allow the same to be oriented vertically to the substrates quickly when a voltage larger than a threshold voltage is applied. In the radial-form orientation, however, a part of liquid crystal molecules are inevitably oriented vertically to the substrates when no voltage is applied as well. Therefore, it is hard to obtain a satisfactory contrast ratio. In addition, since the liquid crystal molecules are oriented with higher energy, it is difficult to allow them to be quickly oriented vertically to the substrates. From this point also, the radial-form orientation is not desirable.

Hereupon, in the above described embodied forms, the element is formed by the polymer compound material and the liquid crystal material being selected so suitably that the $\gamma$ P>$\gamma$ LC can hold between the critical surface tension $\gamma$ P of the polymer compound and the surface tension $\gamma$ LC of the liquid crystal material. In this form of the element, the orientation pattern of the liquid crystal molecules during no voltage being applied takes the bipolar form and the liquid crystal molecules are oriented at small tilt angles to the wall surface of the polymer compound. This can provide improved response to electric field and reduced temperature dependency of the voltage optical characteristics.

Further, when the requirement of the $\gamma$ P>$\gamma$ LC is met by using polymer compound having polar group, such as hydroxyl group, carboxyl group or imino group, good wettability (affinity) between the liquid crystal droplets and the polymer compound surrounding them is obtained, so that the liquid crystal molecules are allowed to stably exist in the interface polymer/liquid crystal. This enables the tilt angles of the liquid crystal droplets to the wall surface of the polymer compound to be further reduced, to make it hard to cause the orientation transition between the bipolar form and the radial form. This can provide the result of producing the liquid crystal display element having improved response to electric field and reduced temperature dependency of the voltage optical characteristics.

It is noted that the polymer dispersion type liquid crystal referred to in the fourth inventive group is not limited to the polymer·liquid crystal complex only wherein droplets of the liquid crystal are interspersed in an island form in the polymer compound, but may include not only the one wherein the droplets of the liquid crystal are partially associated in series with neighboring droplets but also the one (polymer network liquid crystal) wherein the droplets of the liquid crystal are held in networks of the polymer compound of a three dimensional network. However, the formation for the droplets of the liquid crystal to be held in the networks of the polymer compound of the three dimensional network form does not take the bipolar-form orientation pattern in general, because the interfacial restrictive force does not act on the droplets of the liquid crystal uniformly. It is known however that even this formation allows the liquid crystal molecules to be oriented vertically under low temperatures, to take the radial-like form orientation, so there may arise the above-described problem of strong temperature dependency in the response to electric field. Accordingly, even in this case, the feature of $\gamma$ P>$\gamma$ LC of the present invention works effectively.

Finally, the principle of the liquid crystal display element of the fourth inventive group is illustrated in FIG. 40. Shown in this figure is the state of incident light 422 being turning transmitted light 424 and scattered light 423 due to different molecular orientations in the liquid crystal droplets.

BRIEF DESCRIPTION OF THE DRAWINGS

First Invent Group

Second Inventive Group

Figure 15:
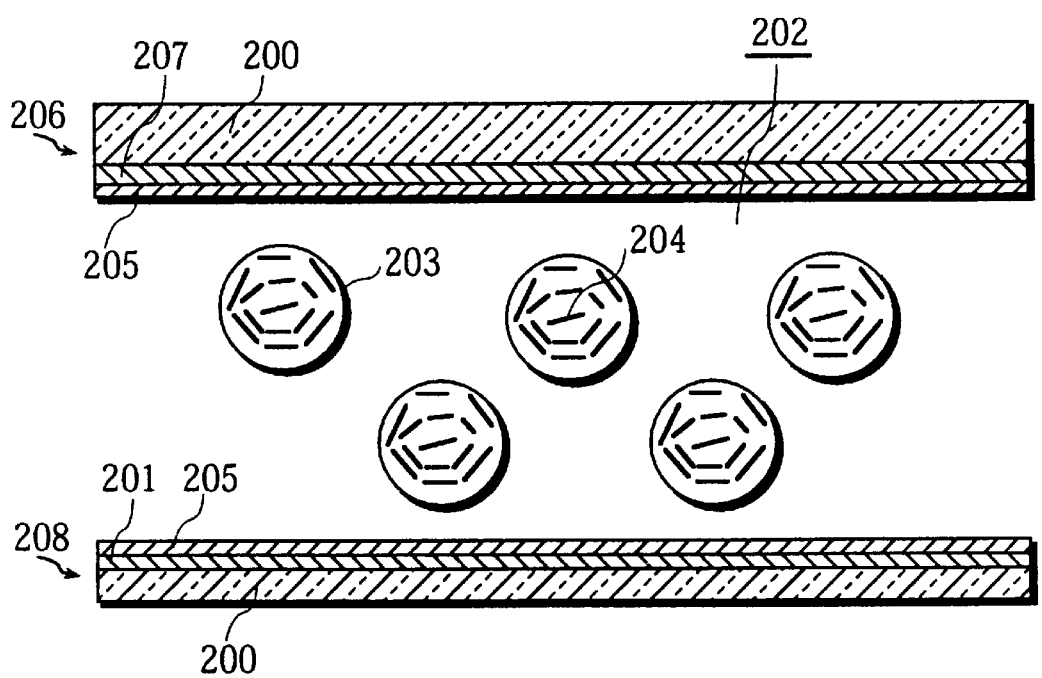
Figure 16:
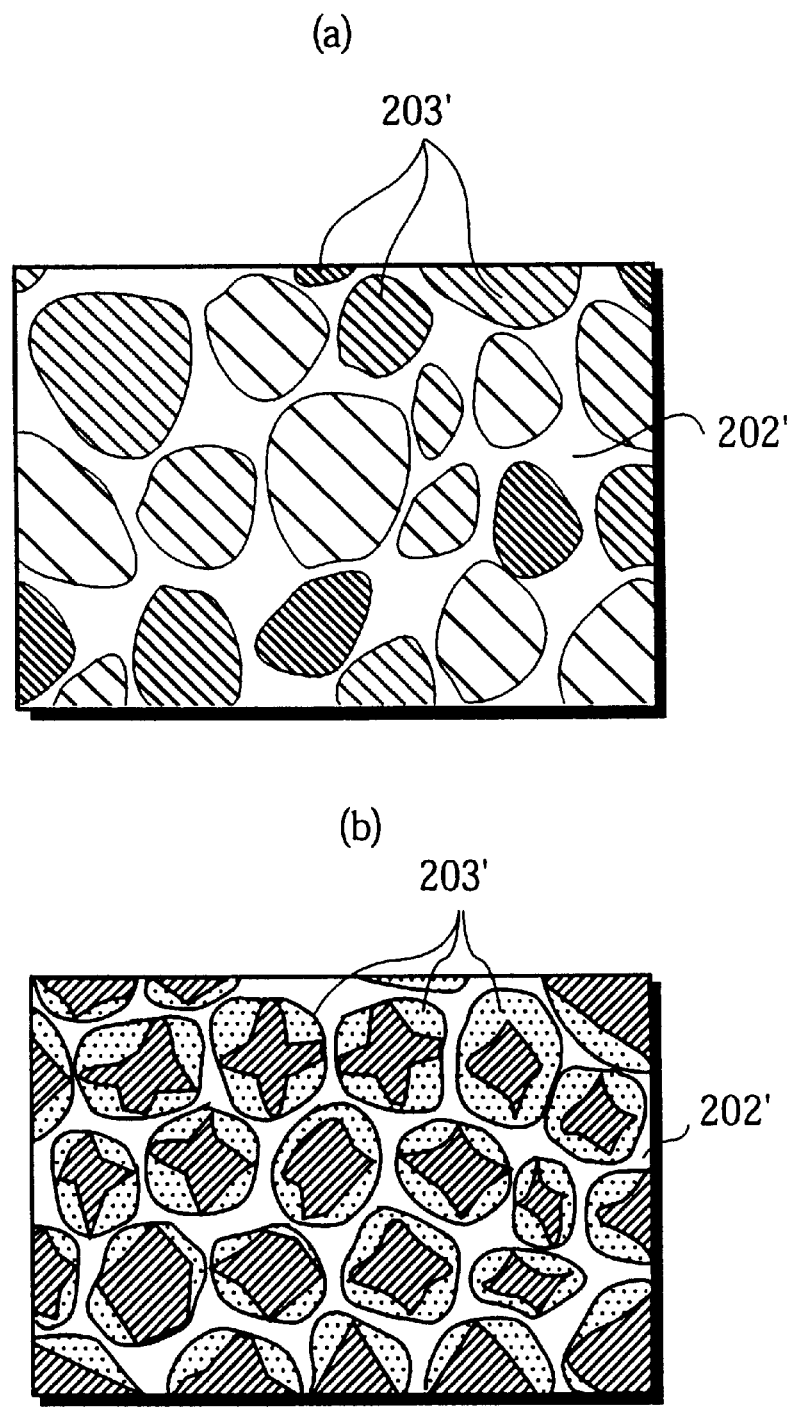
Figure 17:
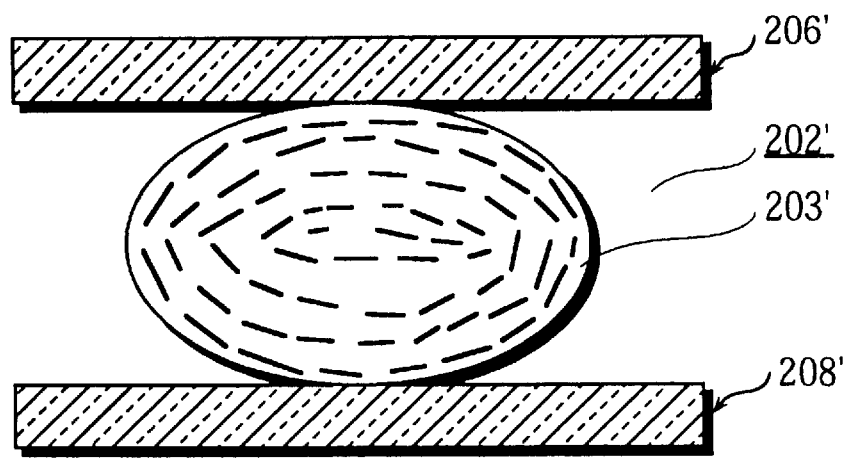
Figure 17:
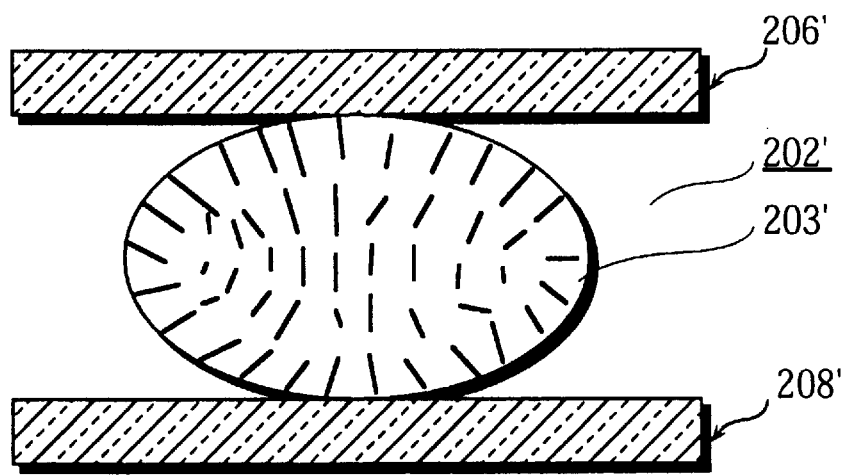
Figure 18:
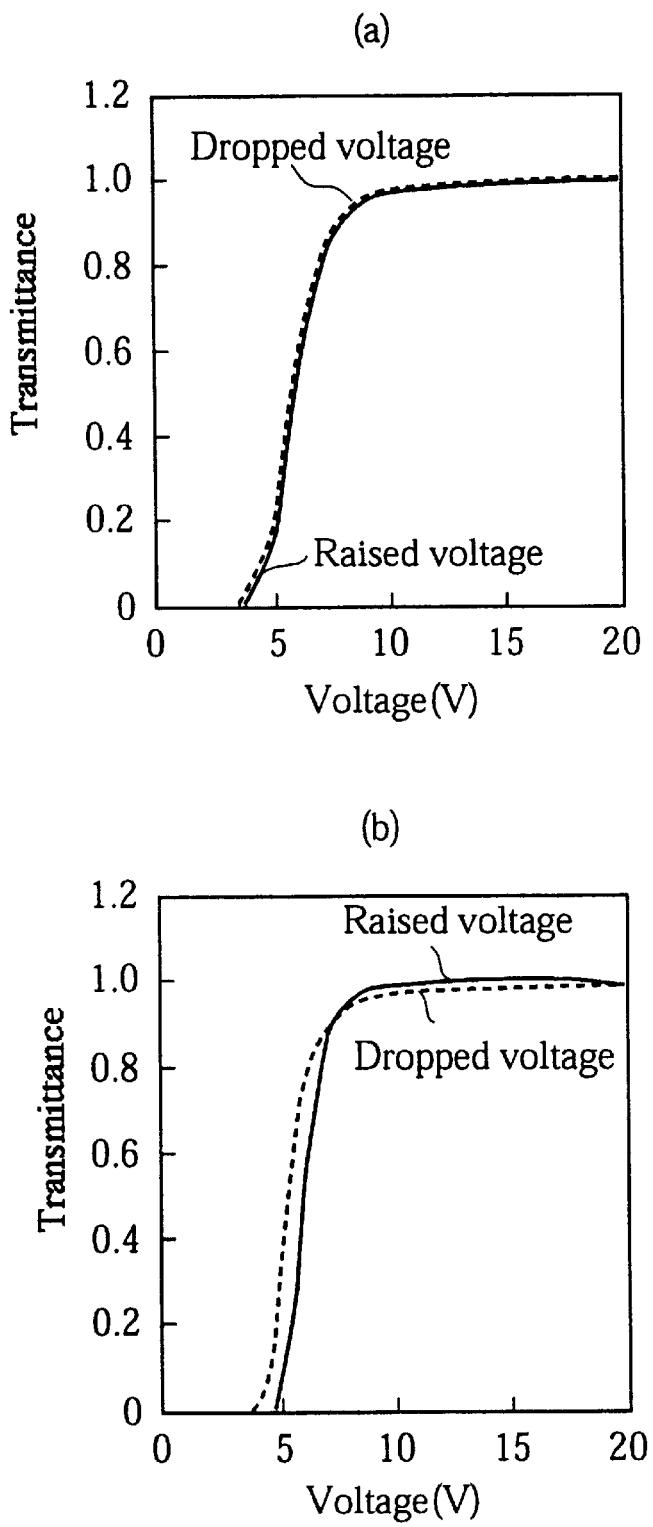
Figure 19:
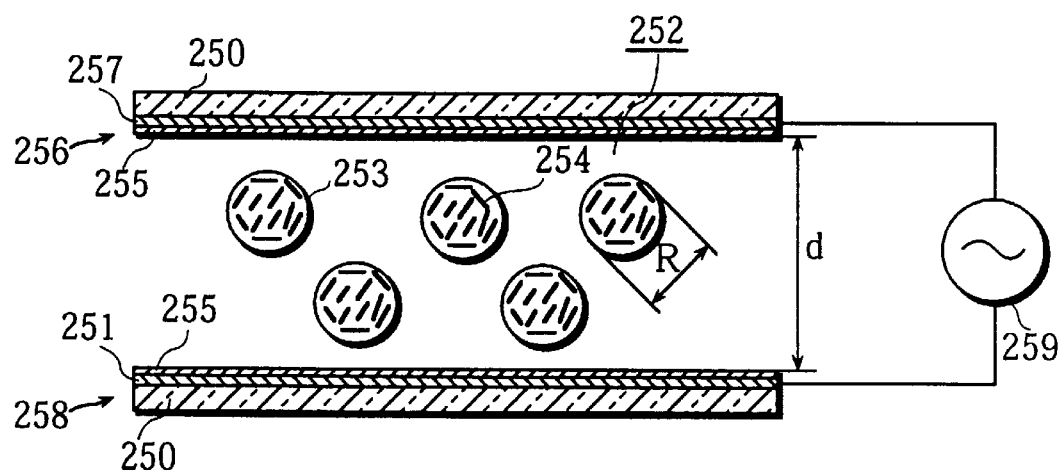
Figure 20:
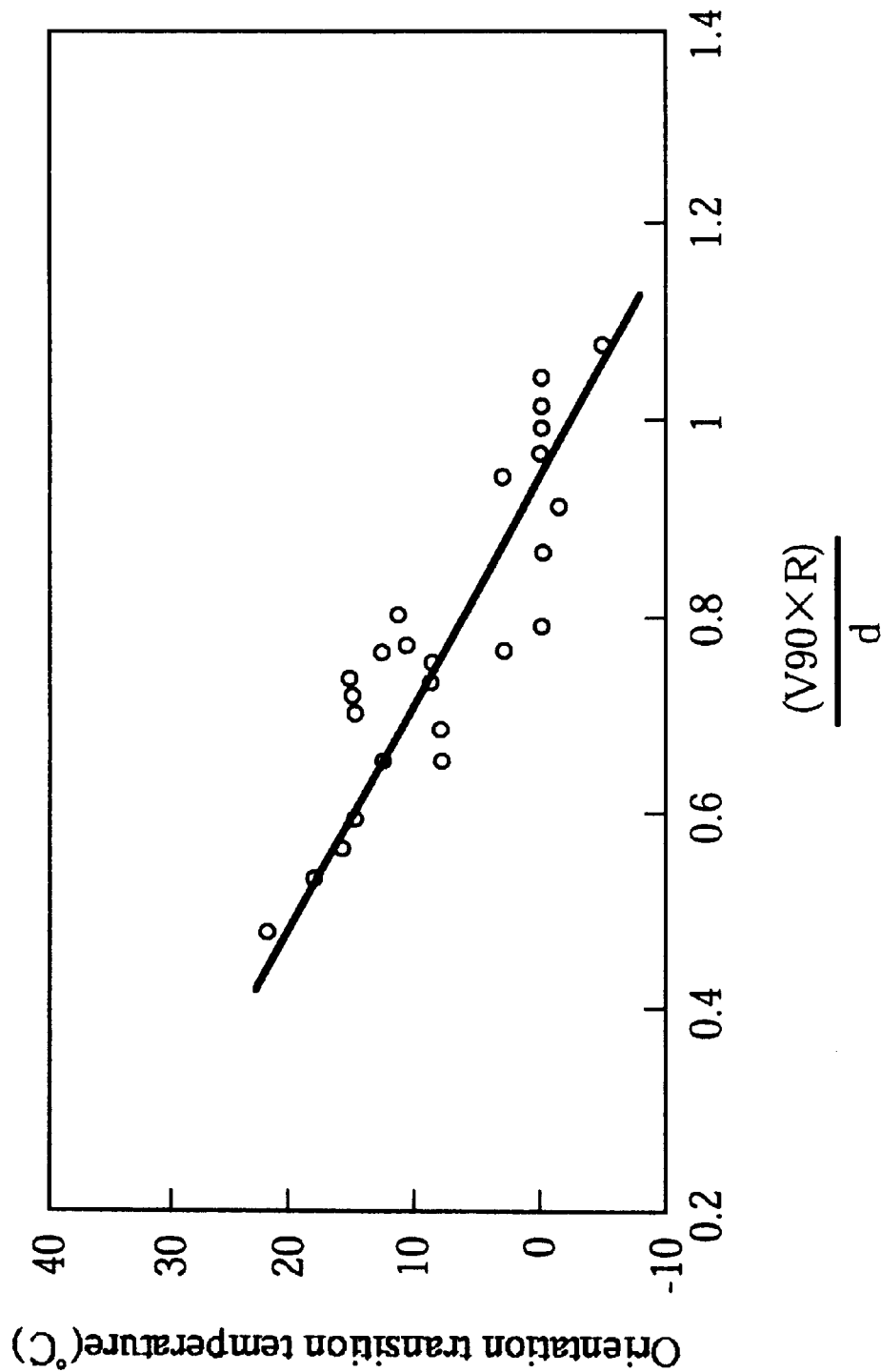
Figure 21:
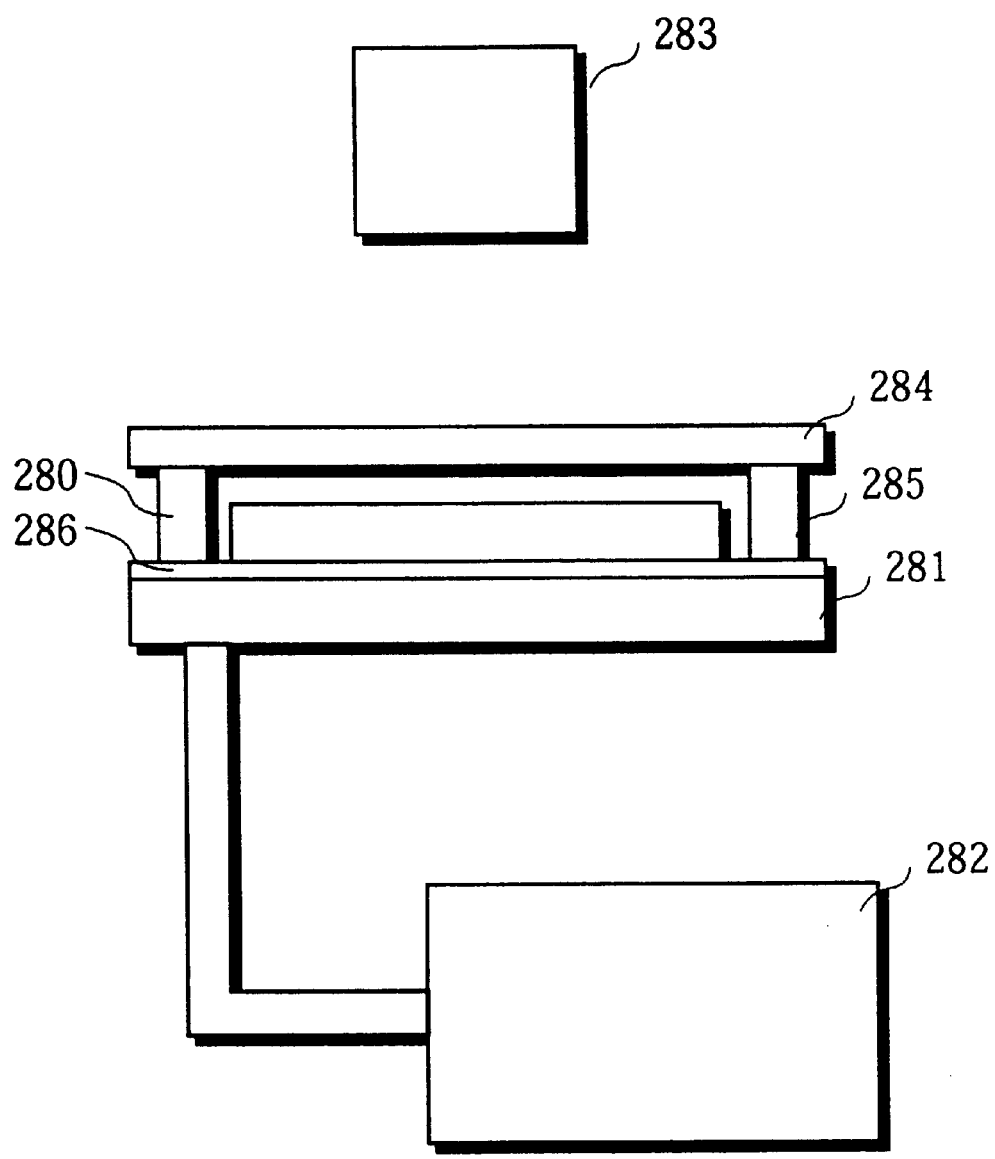

FIG. 15 is a sectional view of a liquid crystal display element of the second inventive group;

FIG. 16 is an illustration of the state of liquid crystal droplets in the liquid crystal display element of the second inventive group as observed with a microscope;

FIG. 17 is an illustration of orientation patterns of a liquid crystal molecule in the liquid crystal display element of the second inventive group;

FIG. 18 is a graph showing the applied voltage-transmittance characteristics of the liquid crystal display element of the second inventive group;

FIG. 19 is a sectional view of the liquid crystal display element of the second inventive group;

FIG. 20 is a graph showing the relationship between the anchoring index and the orientation temperature in the second inventive group;

FIG. 21 is a schematic view showing the structure of a production apparatus of the liquid crystal display element of the second inventive group;

Third Inventive Group

Figure 22:
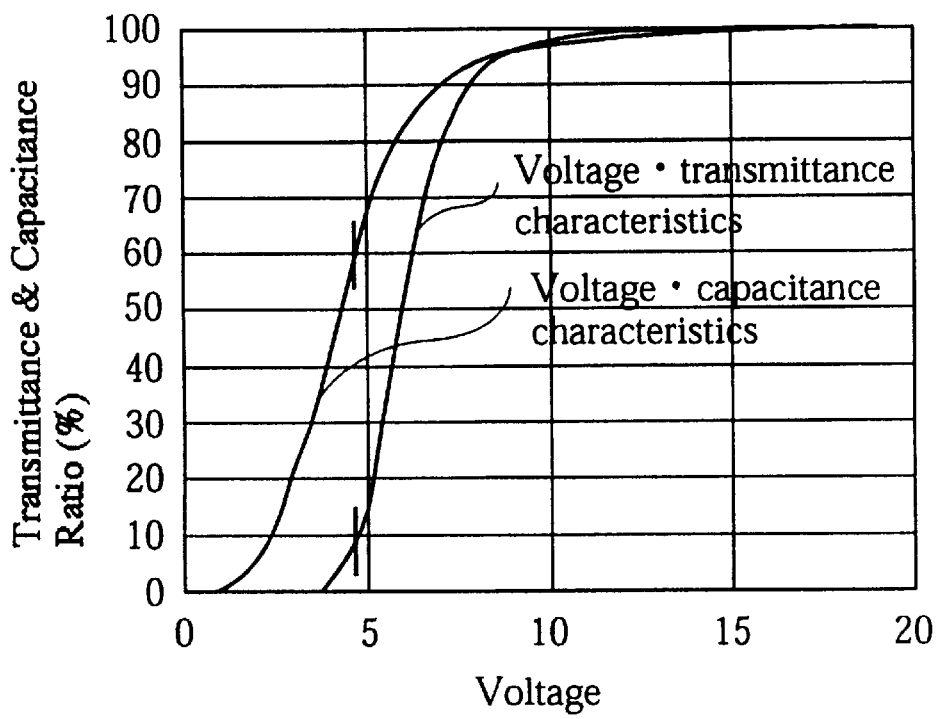
Figure 23:
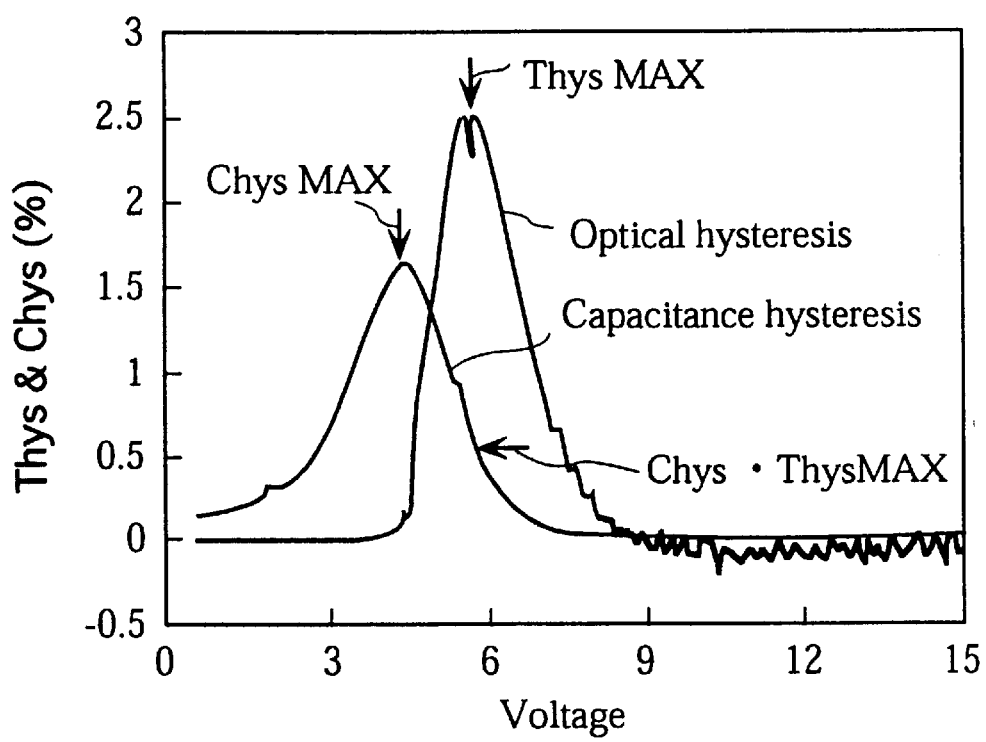
Figure 24:
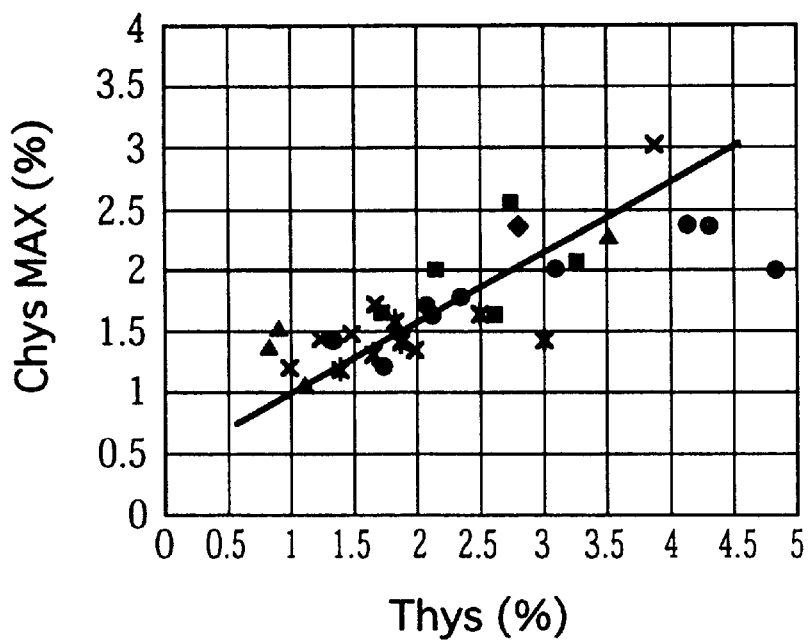
Figure 24:
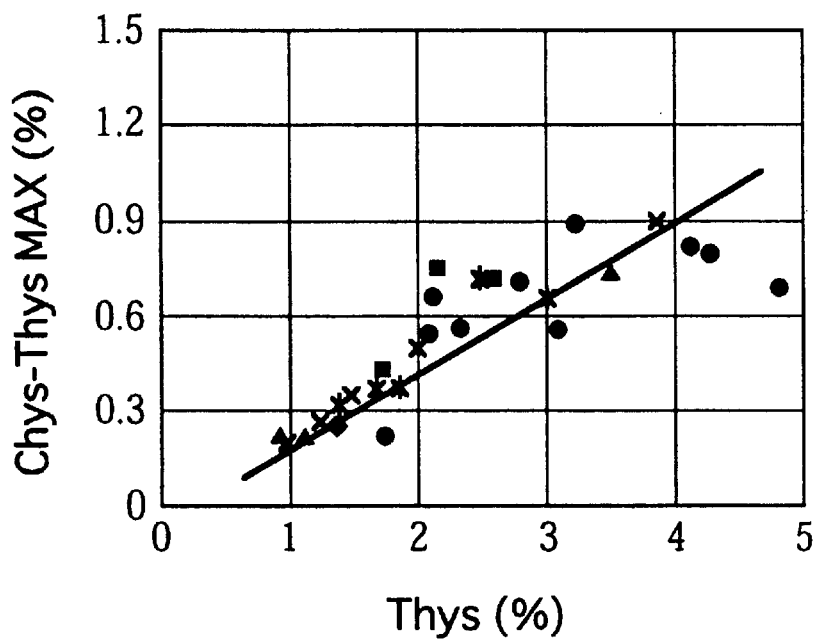
Figure 25:
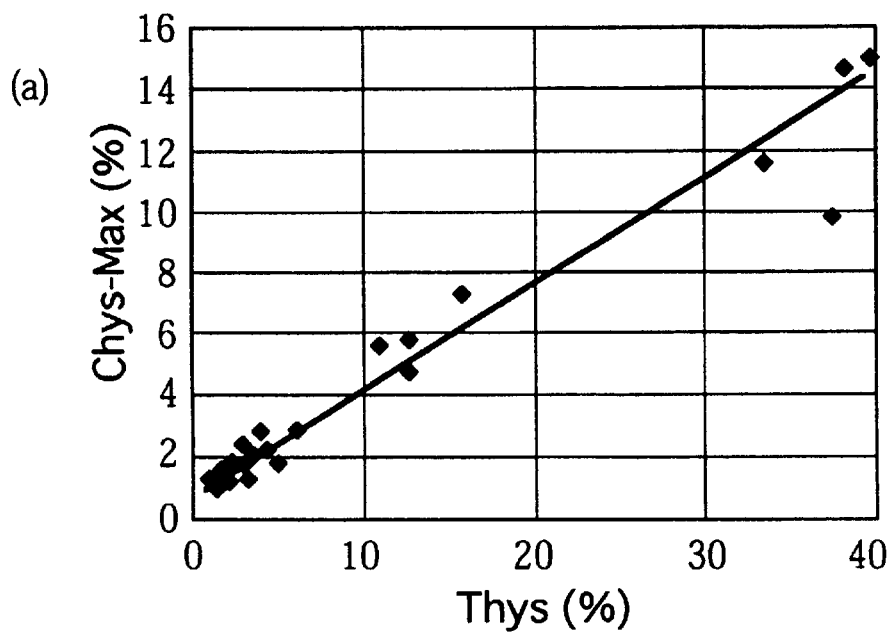
Figure 25:
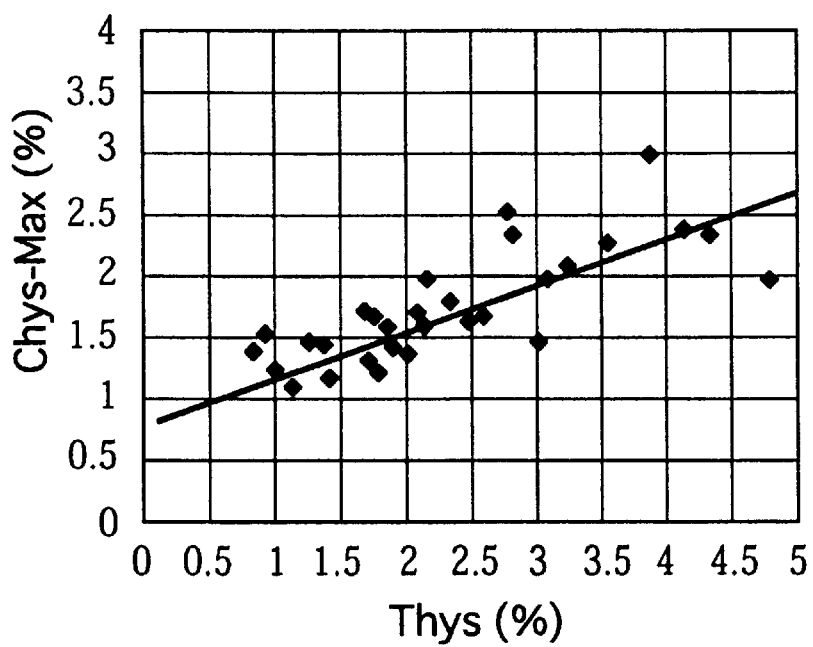
Figure 26:
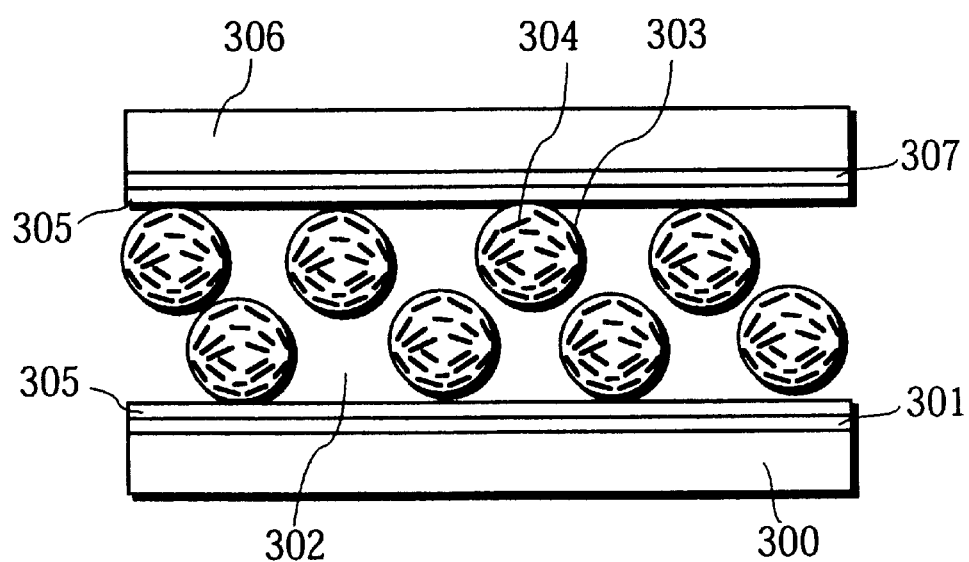
Figure 27:
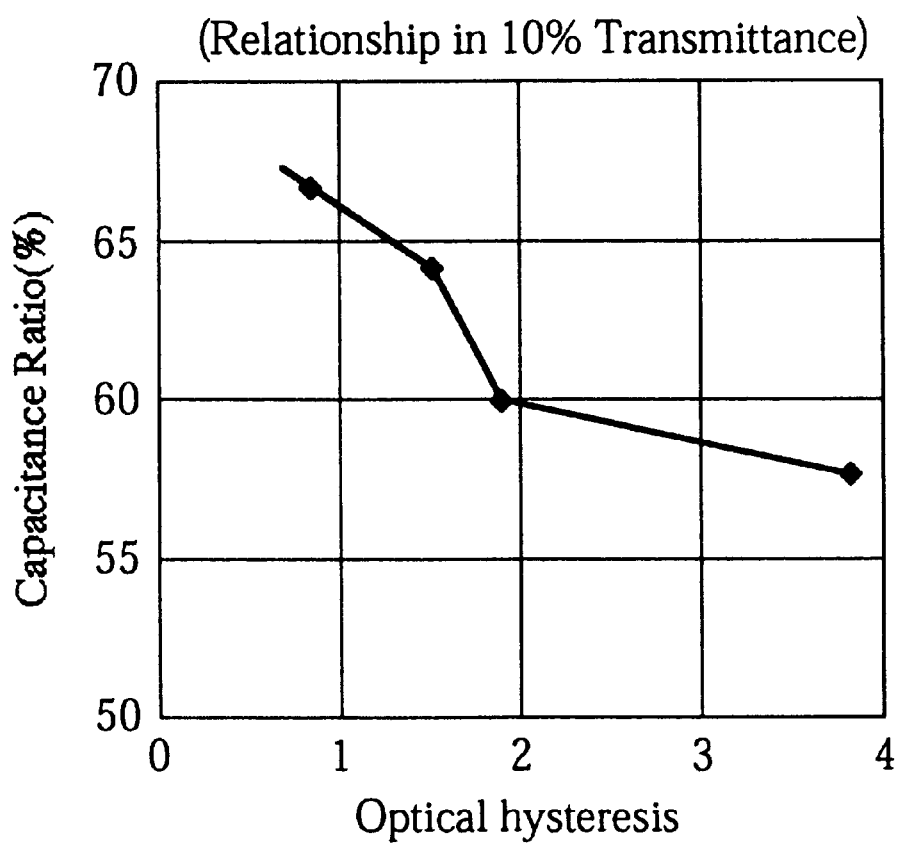

FIG. 22 is a graph showing the voltage-capacitance characteristics and the voltage-transmittance characteristics of the third inventive group;

FIG. 23 is a view showing the capacitance hysteresis and the optical hysteresis of the third inventive group;

FIGS. 24(a) and (b) are graphs showing the relationship between the capacitance hysteresis and the optical hysteresis, in the third inventive group;

FIGS. 25(a) and (b) are additional examples of the relationship between the capacitance hysteresis and the optical hysteresis;

FIG. 26 is a sectional view of the structure of the liquid crystal display element of the third inventive group;

FIG. 27 is a graph showing the relationship between the optical hysteresis and the capacitance ratio %, in the third inventive group;

Fourth Inventive Group

Figure 28:
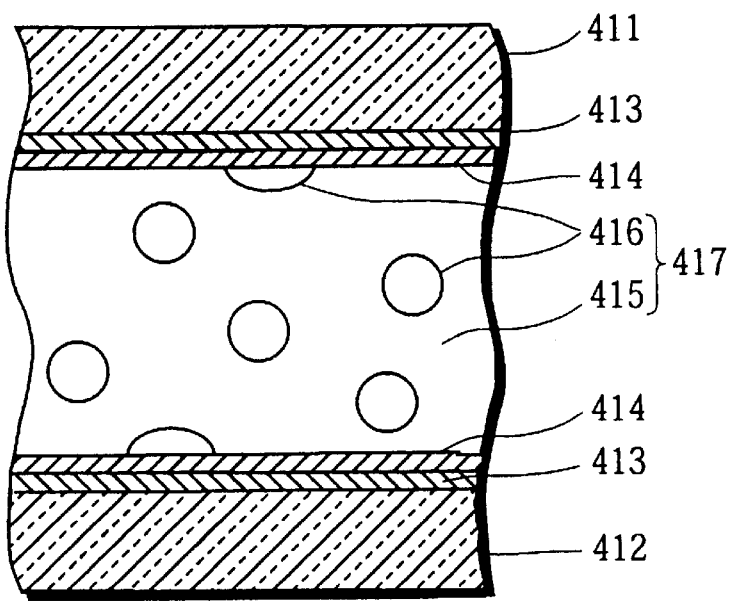
Figure 29:
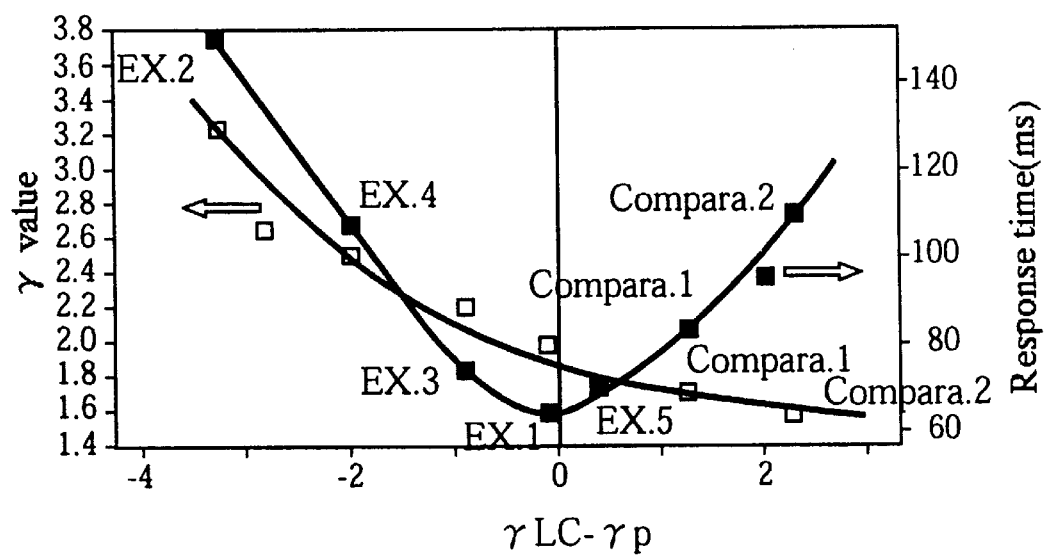
Figure 30:
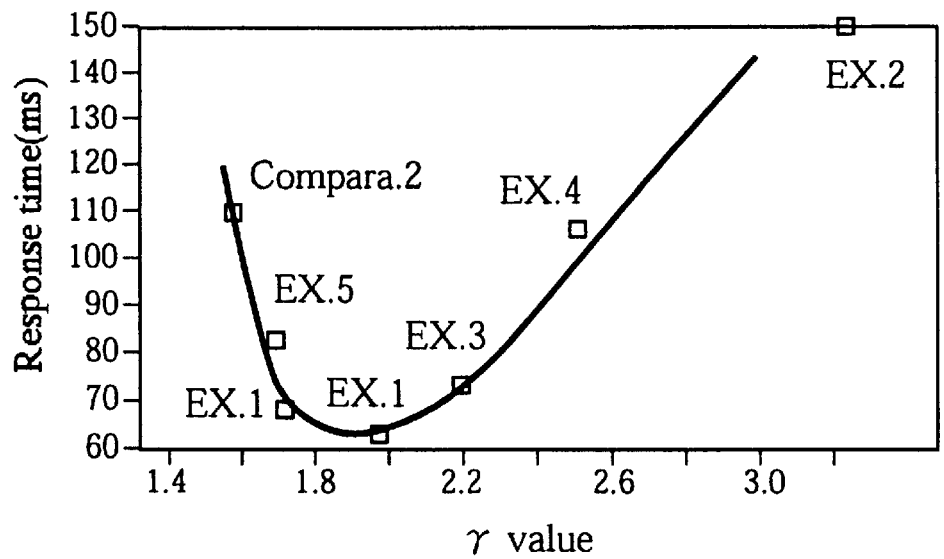
Figure 31:
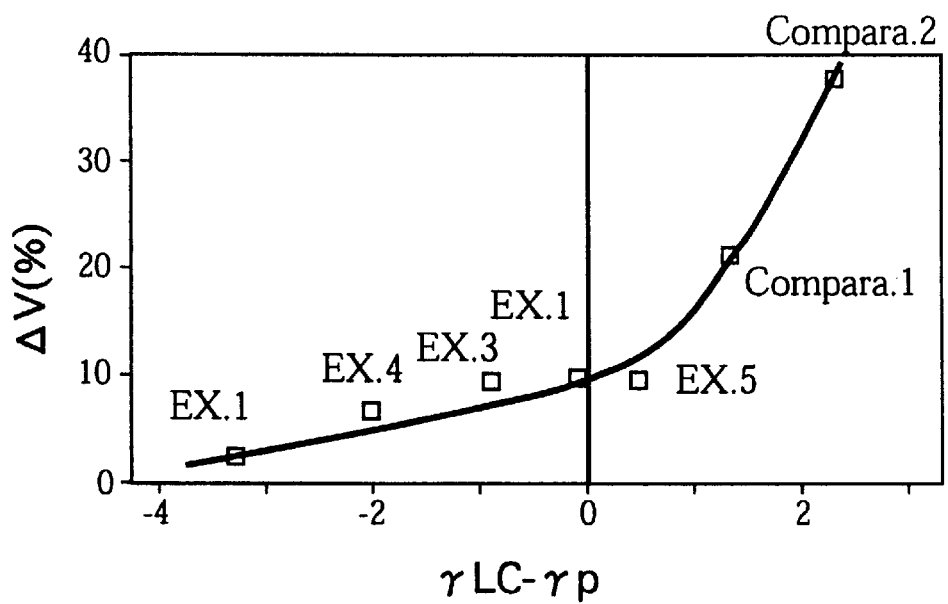
Figure 32:
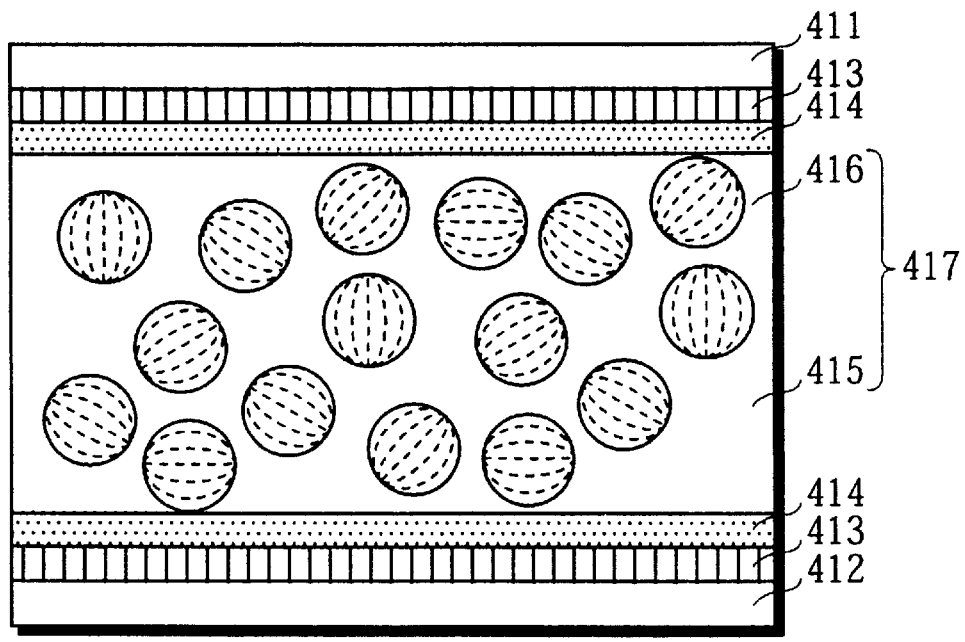
Figure 33:
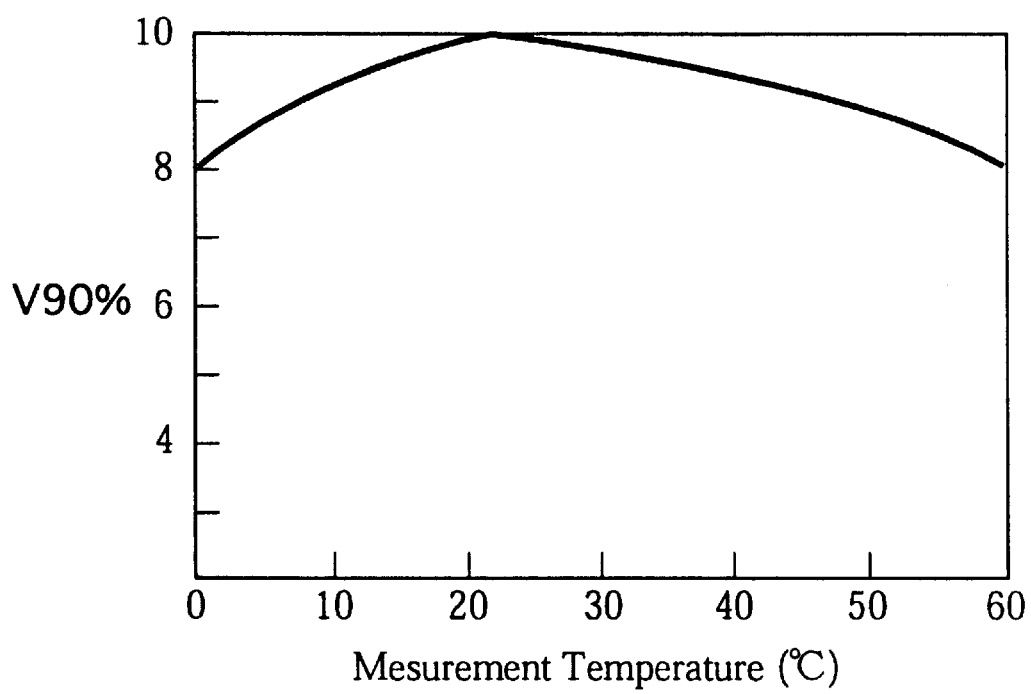
Figure 34:
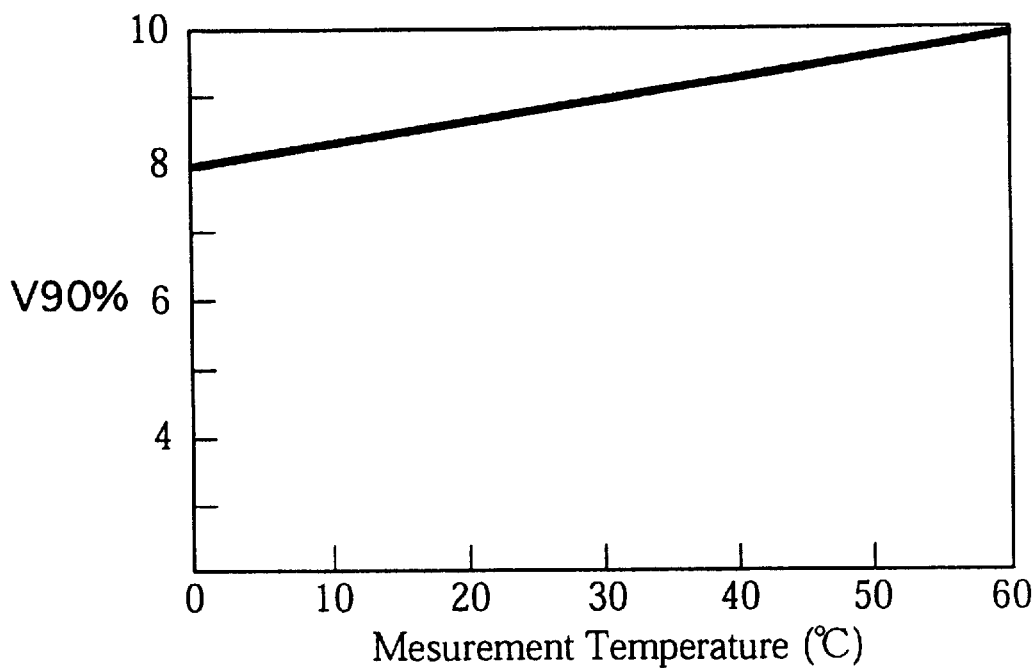
Figure 35:
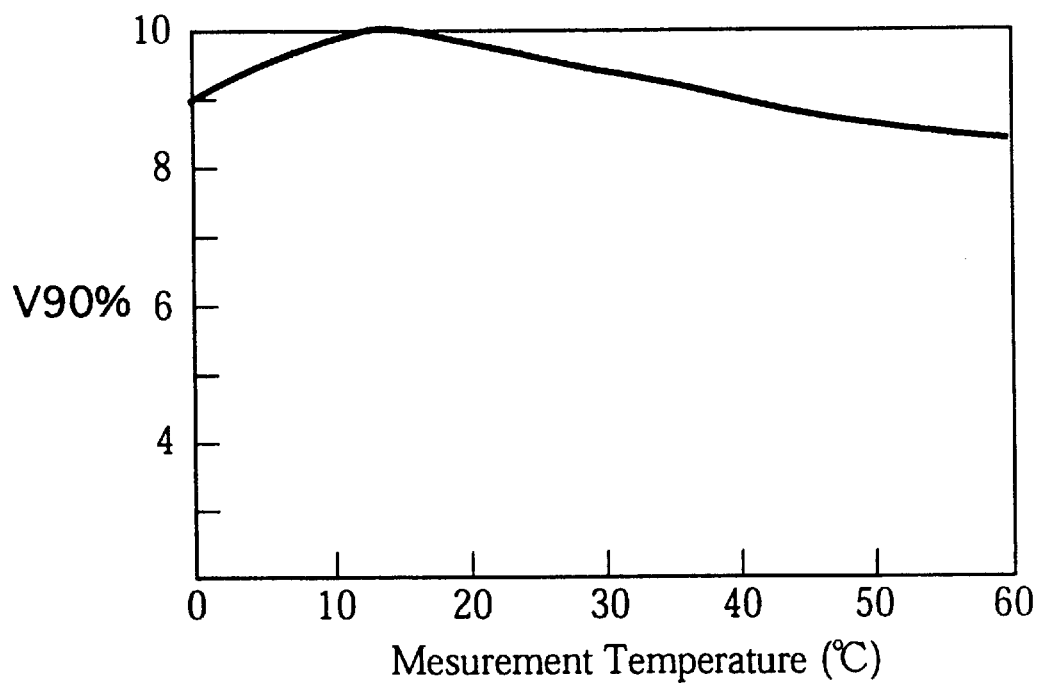
Figure 36:
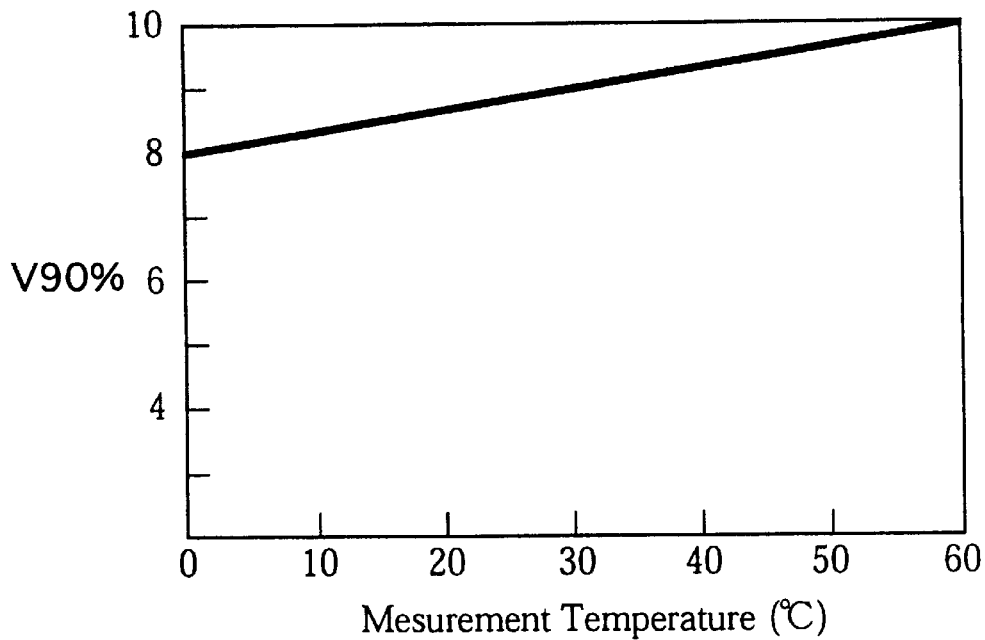
Figure 37:
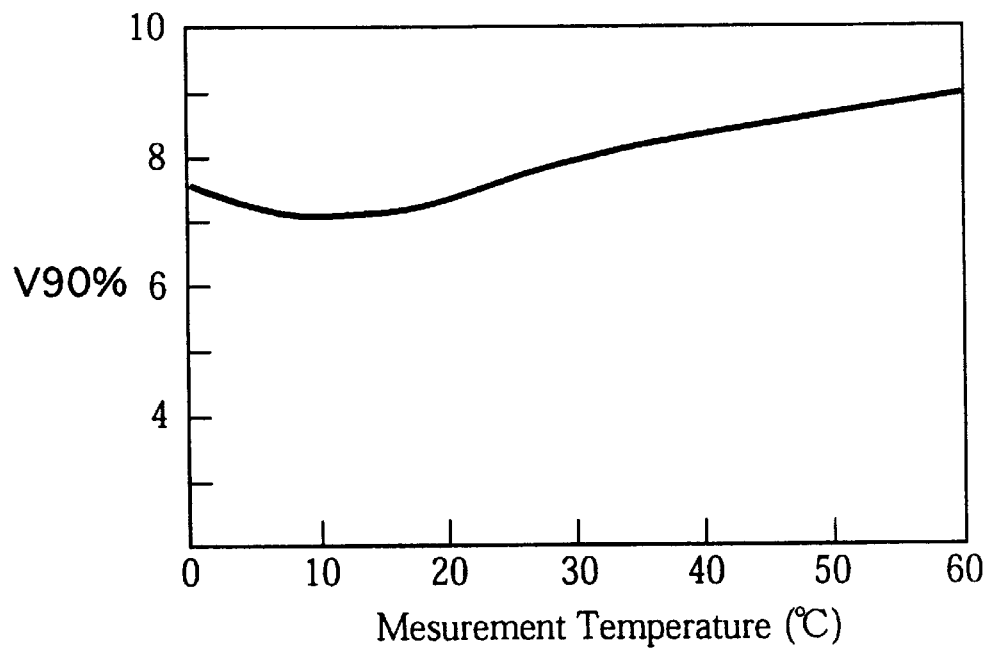
Figure 38:
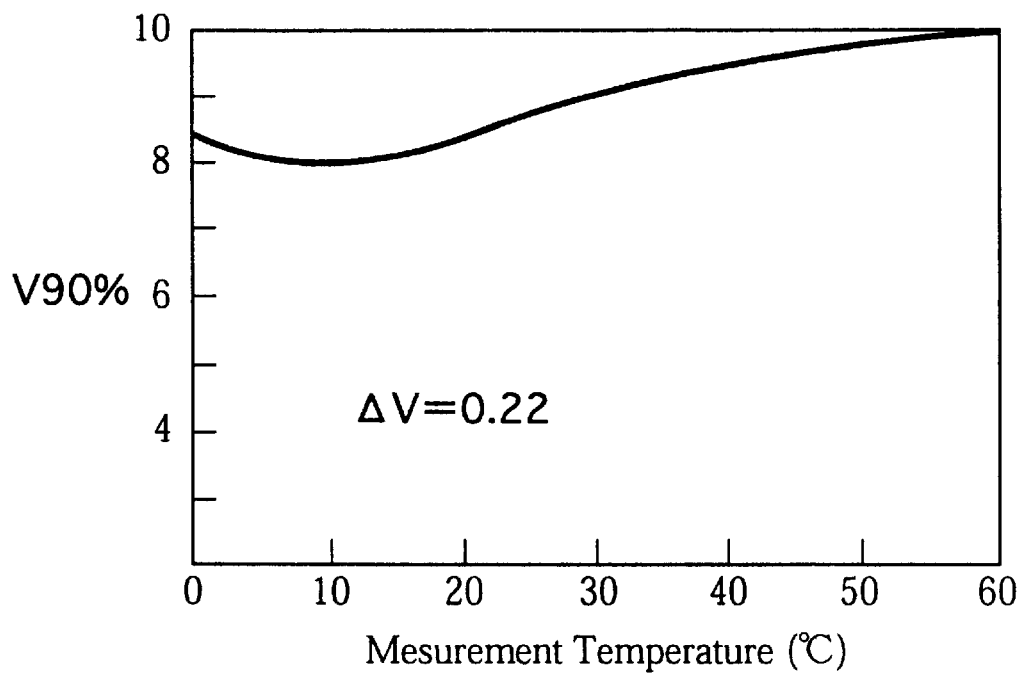
Figure 39:
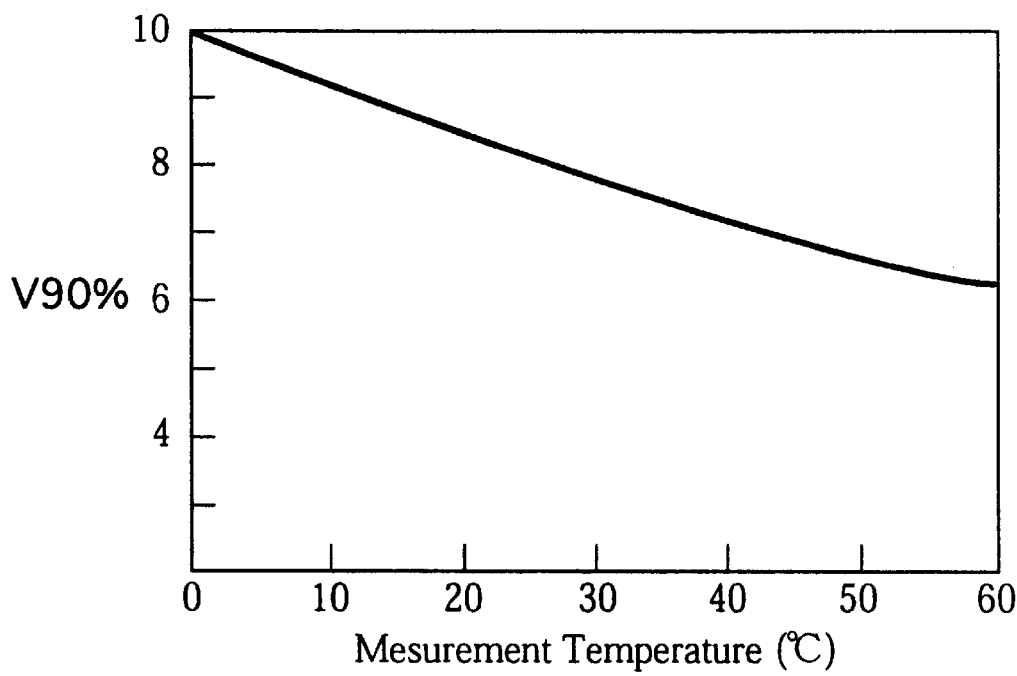
Figure 40:
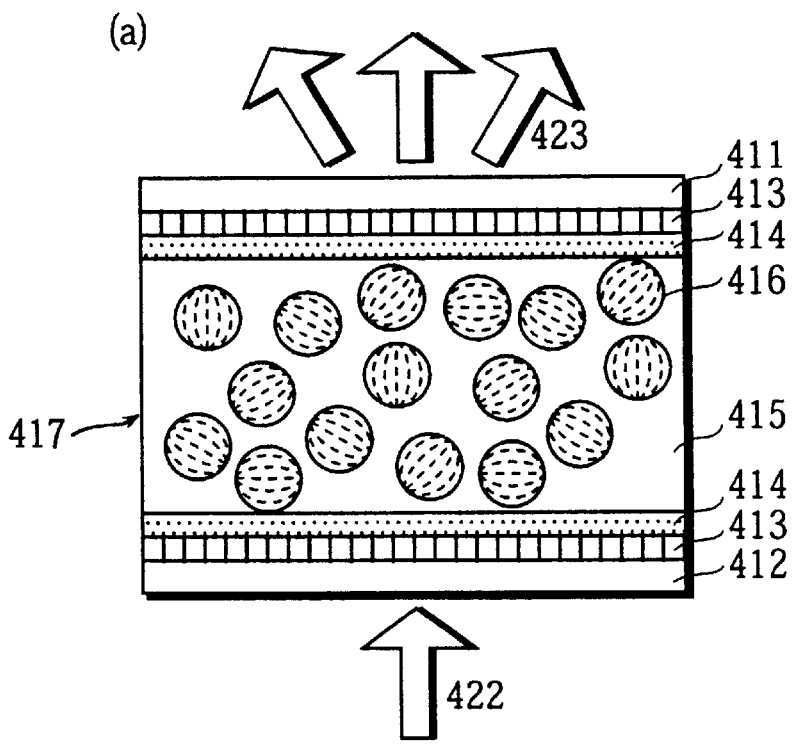
Figure 40:
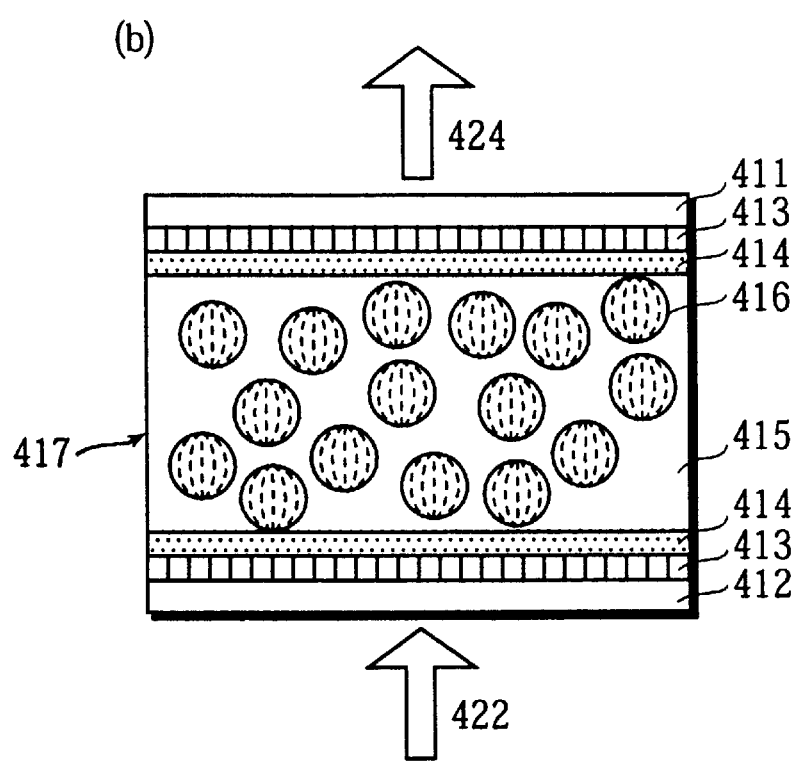
Figure 41:
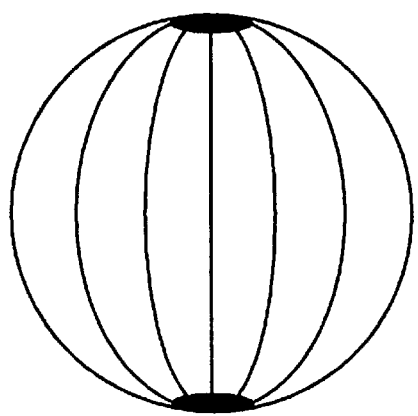
Figure 41:
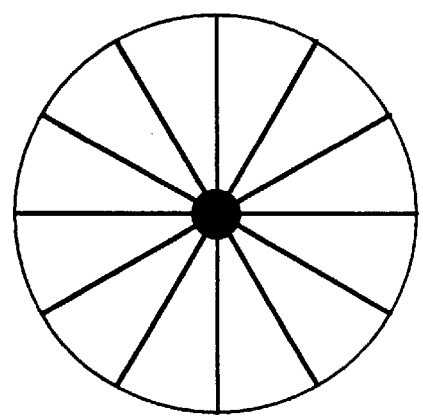

FIG. 28 is a conceptually illustrating sectional view of a main part of a liquid crystal display element of the fourth inventive group or of conventional type;

FIG. 29 is a graph showing the relationship among the subtraction result of γ LC–γ P, the value of γ, and the response time, in the fourth inventive group;

FIG. 30 is a graph showing the relationship between the value of γ, and the response time, in the fourth inventive group;

FIG. 31 is a graph showing the relationship between the subtraction result of γ LC–γ P and Δ V, in the fourth inventive group;

FIG. 32 is a schematic illustration of the structure in section of another embodiment of the polymer dispersion type liquid crystal display element of the fourth inventive group;

FIG. 33 is a graph showing the relationship between the temperature of the liquid crystal display element and the V90%, of Example 2-1 of the fourth inventive group;

FIG. 34 is a graph showing the relationship between the temperature of the liquid crystal display element and the V90%, of Example 2-2 of the fourth inventive group;

FIG. 35 is a graph showing the relationship between the temperature of the liquid crystal display element and the V90%, of Example 2-3 of the fourth inventive group;

FIG. 36 is a graph showing the relationship between the temperature of the liquid crystal display element and the V90%, of Example 2-4 of the fourth inventive group;

FIG. 37 is a graph showing the relationship between the temperature of the liquid crystal display element and the V90%, of Example 2-5 of the fourth inventive group;

FIG. 38 is a graph showing the relationship between the temperature of the liquid crystal display element and the V90%, of Example 2-6 of the fourth inventive group;

FIG. 39 is a graph showing the relationship between the temperature of the liquid crystal display element and the V90%, of Comparative Example 1 comparative to Examples 2-1 to 2-6 of the fourth inventive group;

FIG. 40 is a schematically illustrating sectional view for illustrating the principle of display of the liquid crystal display element using the polymer dispersion type liquid crystal of the fourth inventive group; and FIG. 41 is a schematic view showing the radial-form orientation and the bipolar-form orientation in the first inventive group.

BEST MODE FOR CARRYING OUT THE INVENTION

The detailed description of the above contents of the group of the invention will be given in order below. The best mode of aspects of the present invention will become apparent from the description.

(1) EXAMPLE OF FIRST INVENTION GROUP

Example 1-1

Figure 10:
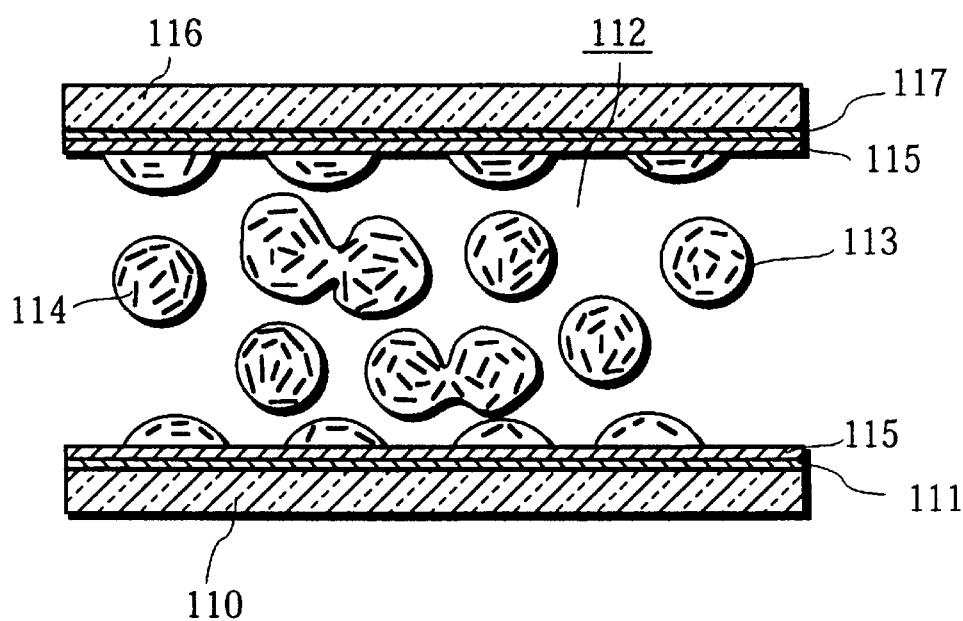
FIG. 10 is a sectional view of a liquid crystal display element of the first inventive group.

FIG. 10 is a sectional view of the liquid crystal display element according to Example 1-1. In practice, an active matrix substrate forming thereon TFT transistors is used in this Example, though not shown here.

Polymer compound 112 and liquid crystal droplets 113 are placed with being dispersed in between glass substrates 110 having pixel electrodes 111, and the liquid crystal droplets 113 are scattered in the polymer compound in the island form. The liquid crystal molecules 114 in the liquid crystal droplets 113 take a bipolar-form orientation pattern with a plurality of oriented poles on walls of the liquid crystal droplets 113. The liquid crystal droplets 113 in the vicinity of the interfaces of the substrates are formed by their great circles contacting with the substrates.

The liquid crystal display element according to Example 1-1 thus formed is characterized by that all the liquid crystal droplets but those at the interfaces of the substrates have substantially the same shape and size, particularly in that variations in particle size of the liquid crystal droplets are within 10%. The liquid crystal display element is produced by the following method. In FIG. 10, some of the liquid crystal droplets 113 have a partly jointed form, which may be of an individually separated form. In addition, the polymer compound may be formed into a network form so that the liquid crystals can be held in between the networks.

Production of the Liquid Crystal Panel (1) 89 wt % of polymerizable monomer (2-ethylhexyl acrylate), 9 wt % of oligomer (Biscoart 828 available from OSAKA ORGANIC CHEMICAL INDUSTRY) and 1 wt % of polymerization initiator (Benzyl Methyl Ketal available from NIPPON KAYAKU CO., LTD.) were mixed, and then 1 wt % of HDDA (KAYARAD HDDA available from NIPPON KAYAKU CO., LTD.) was added to the mixture, for the purpose of controlling the interfacial restrictive force. 80 wt % of liquid crystal material of TL205 (available from Merck Japan Limited) was added to 20 wt % of the thus obtained polymer precursor mixture to form liquid crystal polymer precursor compatible solution.

The thermal phase separation temperature of the above liquid crystal polymer precursor compatible solution was measured with a Mettler, the measurement result being 10° C.

(2) A pixel electrode 111, a source line, a gate line and others were provided for a glass substrate 110 and the counter substrate 116 having a counter electrode 117 through the techniques of vacuum deposition and etching to thereby produce an active matrix substrate. Further, an insulating film material was printed on the substrate by a printing method and then was cured in an oven, to form insulating film 115 thereon. OPTOMER AL8534 (available from JAPAN Synthetic Rubber Co., Ltd.) was used as the above insulating film material. Also, a glass plate 1737 available from CORNING INC. (1.1 mm in thickness) was used as the glass substrate.

(3) After a similar insulating film 115 was formed on the counter substrate 116 having the counter electrode 117, the glass substrate 110 and the counter substrate 116 were laminated to each other through glass spacers at an interval of 13 $\mu$m.

(4) The liquid crystal polymer precursor compatible solution was injected in between the laminated substrates (hereinafter it is simply referred to as "the panel") via a vacuum injection method, to produce a liquid crystal panel 120 (a before-phase-separation one). A polymerization monitoring liquid crystal panel 121 (See FIG. 11) described later was produced in an analogous manner. However, the polymerization monitoring liquid crystal panel 121 was not so formed as to have TFT, though transference electrodes were formed on both of the upper and lower substrates.

Phase Separation Process

Figure 11:
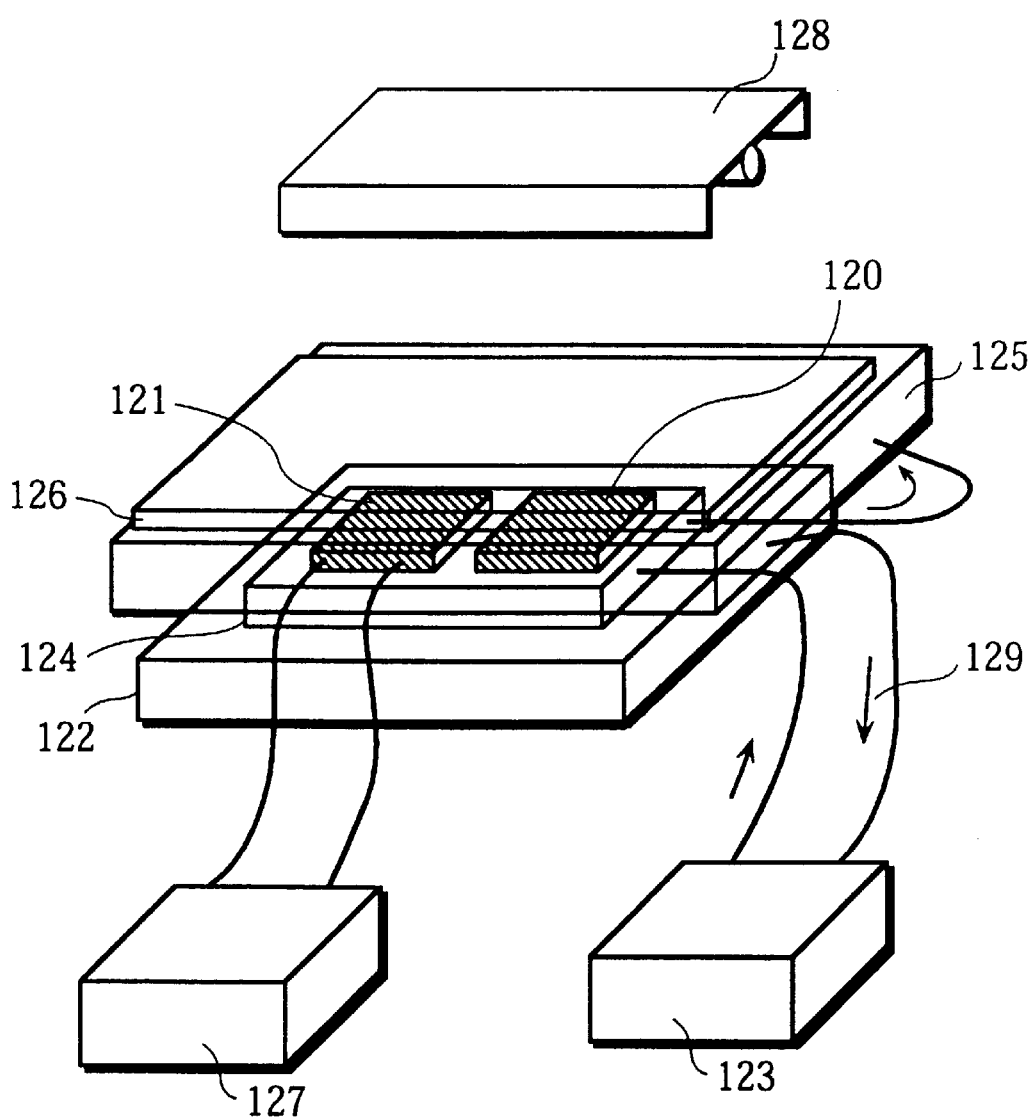
FIG. 11 is a view of an experimental apparatus of the first inventive group.

The phase separation process is described with reference to FIG. 11. First, a liquid bath 125 made of silica glass was located at the upper side of the liquid crystal panels 120, 121 formed as described above, in order to control the surface temperature of the liquid crystal panels. The liquid bath 125 is connected to a circulating high temperature tank 123 so that water of regulated temperature can be circulated therethrough. Further, on the liquid bath 125 was disposed an ultraviolet filter 126 (Color glass filter UV35 available from TOSHIBA GLASS CO., LTD.) capable to filter out light wavelength of 350 nm at its peak to 50% in intensity. Next, a capacity measuring apparatus 127 (LF IMPEDANCE ANALYZER 4192A available from Hewlett-Packard) was connected to the electrodes of the polymerization-monitoring liquid crystal panel 121.

Thereafter, the panel was set at 19° C. in surface temperature by adjusting the temperature of the circulating water and then was irradiated with ultraviolet at the intensity of 200 mW/cm$^2$ for about 30 seconds by use of an ultraviolet irradiating apparatus 128 having an extra-high pressure mercury vapor lamp as a light source (UVA702-IMNSC-BB01 available from USHIO INC.), whereby the polymerizable monomer was polymerized to produce the polymer dispersion type liquid crystal element. The intensity of ultraviolet was measured at a point on the surface of the panel via an illuminance meter (ultraviolet Illuminance meter UV-M02 available from ORC MANUFACTURING CO., LTD.).

Evaluation of Phase Separation Condition

1) Time T1, T2

The variations in the capacitance of the liquid crystal panel 121 were measured in relation to the time after the initiation of irradiation of ultraviolet to determine $T_{10-90}$. which is associated with the time T1, T2. It is noted here that the $T_{10-90}$ is intended to mean the time required for an advance ratio of phase separation to reach 90% from 10%, when the advance ratio of the phase separation at which all the liquid crystals are separated from the liquid crystal polymer precursor compatible solution is set 100%.

Figure 4:
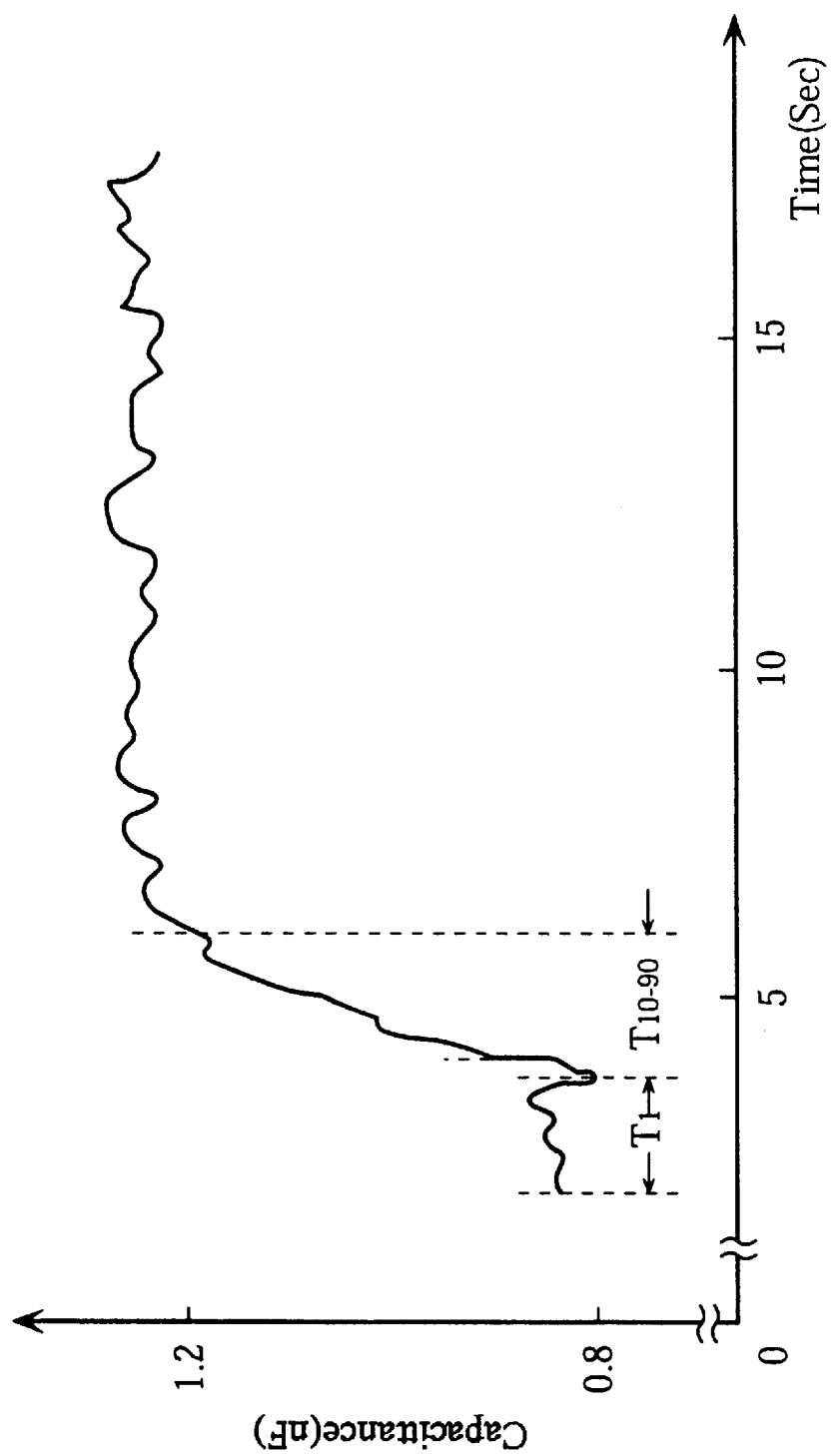
FIG. 4 is a graph showing the capacitance measured in the relation with the ultraviolet irradiation time, in the first inventive group.
Figure 5:
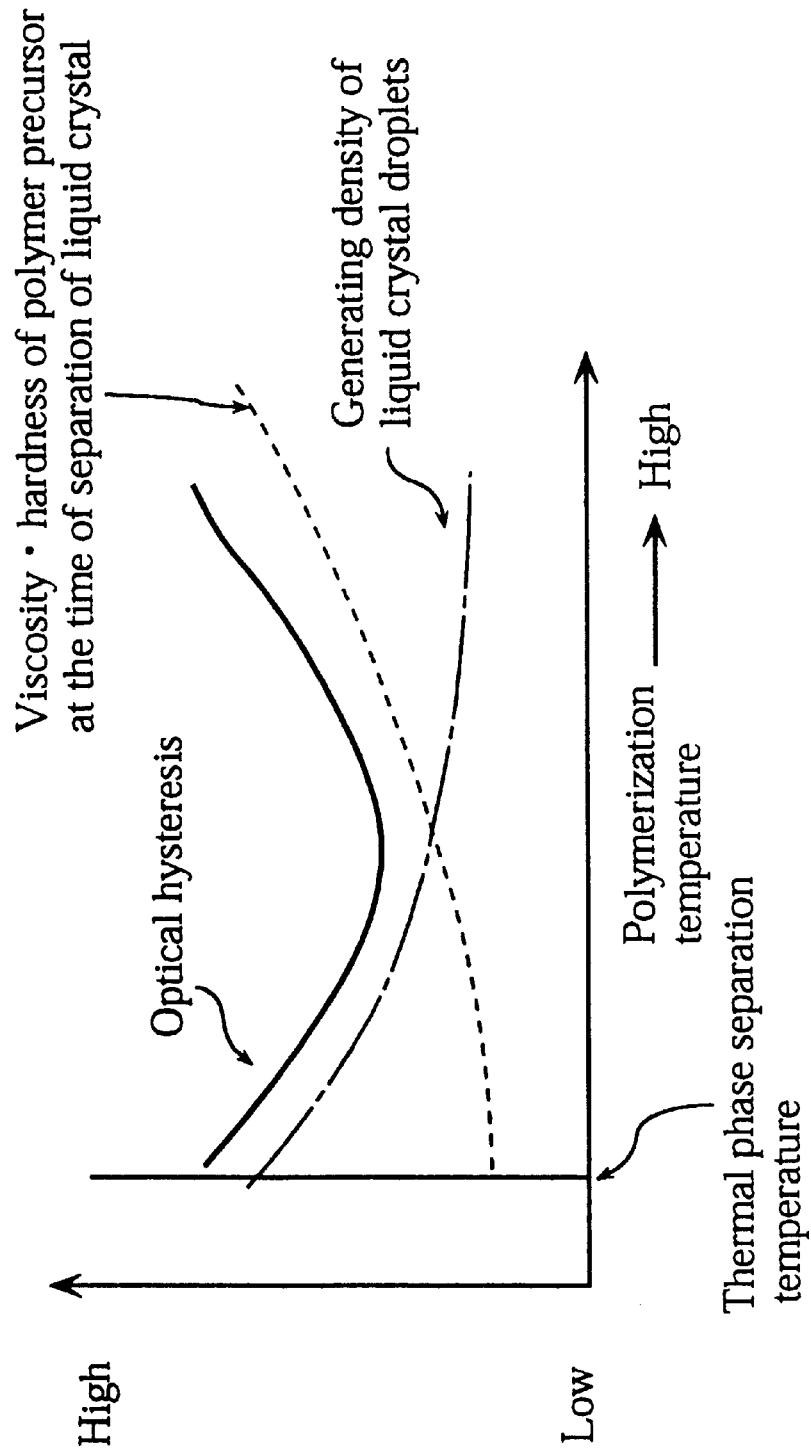
FIG. 5 is a diagrammatic illustration of the relationship between the polymerization temperature and the optical hysteresis and others, in the first inventive group.

The capacitance was measured with the capacitance measuring apparatus 127 under the conditions of 600 Hz in measuring frequency; 0.5V in measuring voltage and +10V in bias voltage. The measurement result is shown in FIG. 4. The time T1 measured on the basis of FIG. 4 was 2.2 seconds and the time $T_{10-90}$ was 2.9 seconds.

2) Properties of Liquid Crystal Droplets

The properties of the liquid crystal droplets were estimated by the following techniques.

Two glass substrates, identical to the above ones, except no TFT elements being formed, were used to produce the polymer dispersion type liquid crystal panel in an analogous manner. After the substrates were peeled off from the liquid crystal panel and the liquid crystal droplets were washed out, the resultant polymer matrix was observed with a microscope and also was measured on the average particle size by use of an image processing apparatus. The result was the average particle size of 1.2 $\mu$m. Also, the variation in particle size was 5%. Thus, it was confirmed that the produced liquid crystal droplets had substantially the same shape and size. It is noted that the terminology of "variations in particle size" used herein are intended to mean "standard deviation in average particle size".

It is thought that the above results have no great effect on the properties of the liquid crystal droplets due to the presence or absence of the TFT elements, so the results are thought to reflect the properties of the liquid crystal droplets in the liquid crystal display element of Example 1-1.

It was observed in the microscopic observation that there were some liquid crystal droplets distorted or some neighboring liquid crystal droplets partly jointed to each other. That is thought to be because the proportion of the liquid crystals in Example 1-1 is as high as 80%.

3) Electro-optical Characteristics

The electro-optical characteristics of the liquid crystal display element were measured in the following steps.

The driving circuit was connected to the liquid crystal panel separately, to drive the TFT. A voltage varying continuously from 0 V at the minimum to 15 V at the maximum was applied across the counter electrode and pixel electrode of the liquid crystal panel, to reverse the direction of voltage sweep, for measurement of the optical hysteresis. The panel transmittance at measurement was measured by use of a liquid crystal evaluating apparatus (LCD5000 available from OTSUKA ELECTRONICS CO., LTD.).

When the optical hysteresis is defined by a percentage of a value obtained by the difference between the intensity of transmitted light at the time of raised voltage and that at the time of dropped voltage during the application of the same voltage being divided by the intensity of transmitted light at the time of application of 15 V, the optical hysteresis (maximum value) was 1%. Also, a good display of almost no residual image resulting from the optical hysteresis was obtained over the full levels of gray scale, even when the gray scale was displayed to flash on and off.

Further, it was additionally confirmed that if variations in the liquid crystal droplets was not more than 10%, the optical hysteresis came to 2% or less and good display was obtained.

The polymerization monitoring liquid crystal panel, used in the above example in order to monitor the degree of polymerization of the liquid crystal panel, serves as a guide for determination of the polymerization conditions for an additional liquid crystal polymer precursor compatible solution. Accordingly, this element is not always indispensable. In addition, the intensity of ultraviolet and the polymerization temperature may be used as a parameter for determination of the polymerization conditions, but the degree of polymerization monitored for the determination can provide more effects on reduction of unevenness in mass production.

The intensity of ultraviolet should preferably be 160 mW/cm$^2$ for allowance in practical performances. That intensity can provide the element having the optical hysteresis of 1% or less with good yields.

Further, the intensity of ultraviolet may be varied by varying the intensity itself of an ultraviolet irradiation lamp or by reducing the intensity of ultraviolet of particular wavelengths by use of a filter. In the case of varying the intensity of the lamp, an extra-high pressure mercury vapor lamp, a high pressure mercury vapor lamp and a metal halide lamp, for example, may be used. The extra-high pressure mercury vapor lamp and the high pressure mercury vapor lamp, peaking at the wavelength of ultraviolet of 365 nm and thus being low in intensity of a visible region, have the advantage of providing reduced deposition of liquid crystals and thus presenting high reliability. On the other hand, the metal halide lamp, in which a lamp intensity exists in the visible region, has a problem of inferior reliability.

In addition, the filter, when used, has desirably the capability of reducing the wavelength of 350 nm or less at its peak to about 50% in intensity, as mentioned above, to allow for an absorbing wavelength which can cause the deposition of liquid crystals and the polymer and a required intensity of ultraviolet for the phase separation.

Also, as long as the required intensity of ultraviolet for the phase separation can be obtained, ultraviolet of a longer wavelength region should preferably be used by filtering out ultraviolet of a shorter wavelength region. This is because the liquid crystals tend to be decomposed by ultraviolet of shorter wavelength regions rather than ultraviolet of long wavelength regions. The inventors confirmed that even when the filter capable of reducing wavelengths of shorter wavelength regions of 360 nm or of 370 nm or less was used, polymerization could be allowed to smoothly progress by increasing the intensity of ultraviolet.

Example 1-2

The liquid crystal display element of Example 1-2 was producted in a similar manner to that in Example 1-1, except that the temperature of the liquid crystal panel (polymerization temperature) and the intensity of utraviolet at the time of irradiation of ultraviolet were changed. In addition, the evaluation was made by use of the same apparatus and in the same manner as in Example 1-1.

The temperature of the liquid of the crystal panel was set at any selected temperature while being measured by use of a thermocouple. In addition, the degree of polymerization of the polymer was changed by allowing the liquid crystal panel to be irradiated with ultraviolet at any selected at any intensity and for any selected time by use of an ultraviolet irradiating apparatus 128. The degree of polymerization was measured with the capacitance monitored by a capacitance measuring apparatus 127.

Figure 6:
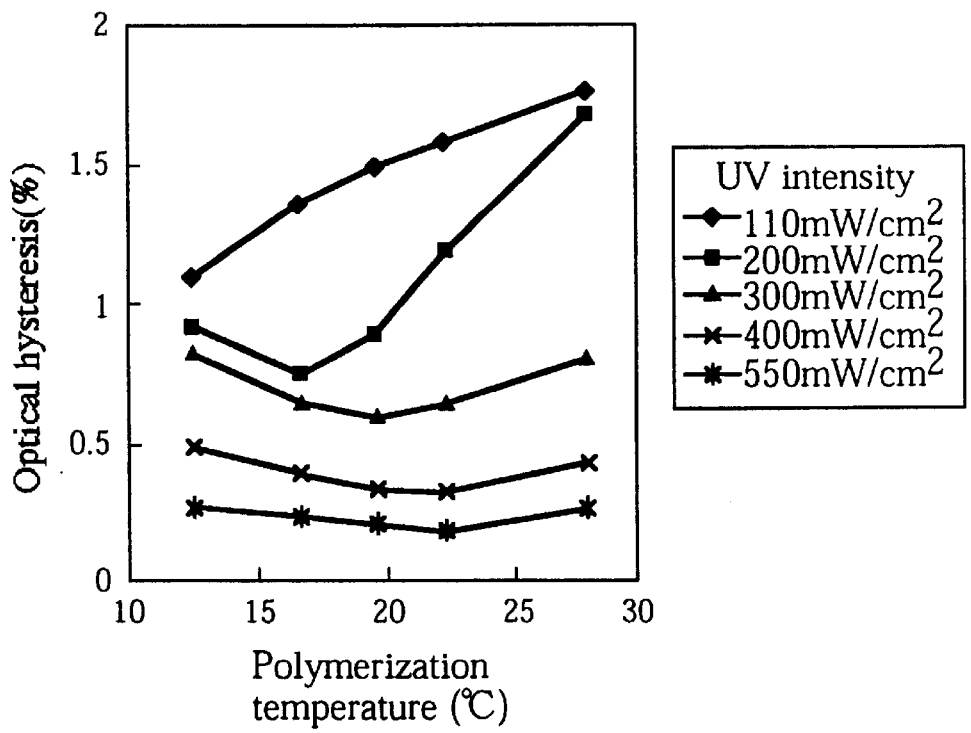
FIG. 6 is a graph showing the relationship between the polymerization temperature and the optical hysteresis, in the first inventive group.
Figure 12:
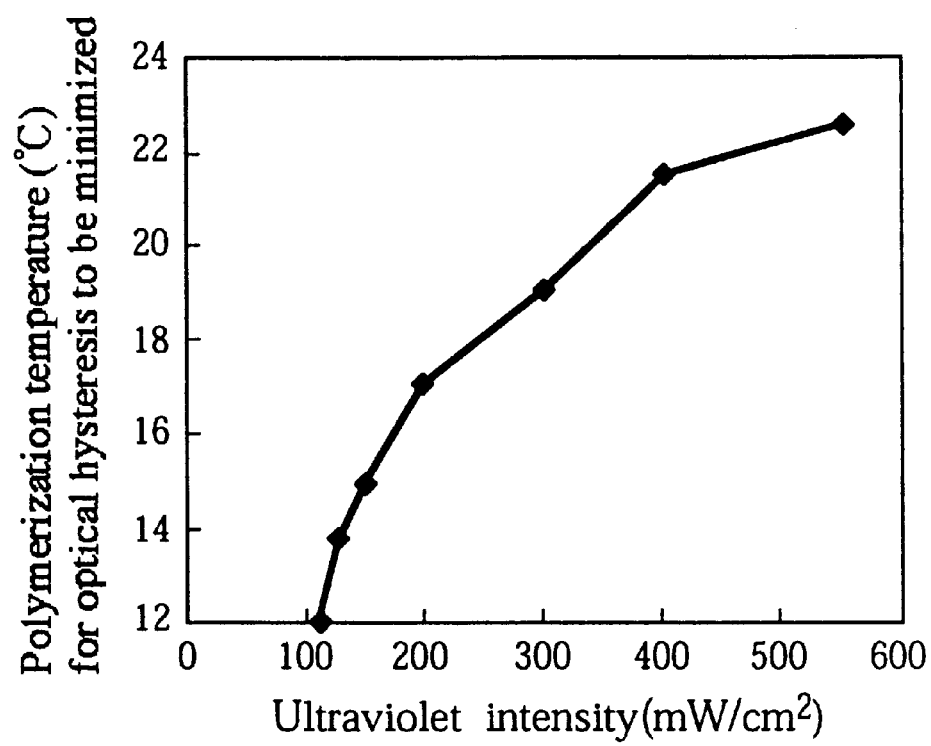
FIG. 12 is a graph showing the relationship between the ultraviolet intensity and the polymerization temperature under which the optical hysteresis is reduced to the minimum.

Shown in FIG. 6 is the relationship between the polymerization temperature and the optical hysteresis. It was confirmed from FIG. 6 that the element of minimized optical hysteresis was produced by changing the polymerization temperature. Shown in FIG. 12 is the relationship between the polymerization temperature exhibiting the minimum value and the intensity of ultraviolet, from which it was confirmed that the liquid crystal display element of reduced optical hysteresis could be produced by regulating the polymerization temperature suitably in association with the intensity of ultraviolet.

In other words, it was demonstrated from Example 1-2 that even when the same liquid crystal polymer precursor compatible solution was used, the polymer dispersion type liquid crystal display element of reduced optical hysteresis can be accomplished by regulating the polymerization temperature and the intensity of ultraviolet adequately.

Example 1-3

The liquid crystal display element of Example 1-3 was produced in a similar manner to that in Example 1-1, except that the polymerization temperature was changed within the range from a thermal phase separation temperature of the liquid crystal polymer precursor compatible solution to a temperature deviating therefrom as high as +20° C. and also the intensity of ultraviolet was changed within the range from 100 mW/cm$^2$ to 550 mW/cm$^2$. In addition, the evaluation was made by use of the same apparatus and in the same manner as in Example 1-1.

In Example 1-3, the rate of polymerization, the degree of polymerization (viscosity, hardness) of polymer around separated liquid crystal nuclei and the generating density of the separated nuclei as described above were controlled by controlling the time T1 from the initiation of irradiation of ultraviolet to the initiation of phase separation of the liquid crystal polymer precursor compatible solution and the time $T_{10\text{-}90}$ from the initiation of separation of the liquid crystal (separated nuclei) to the completion of phase separation.

Figure 9:
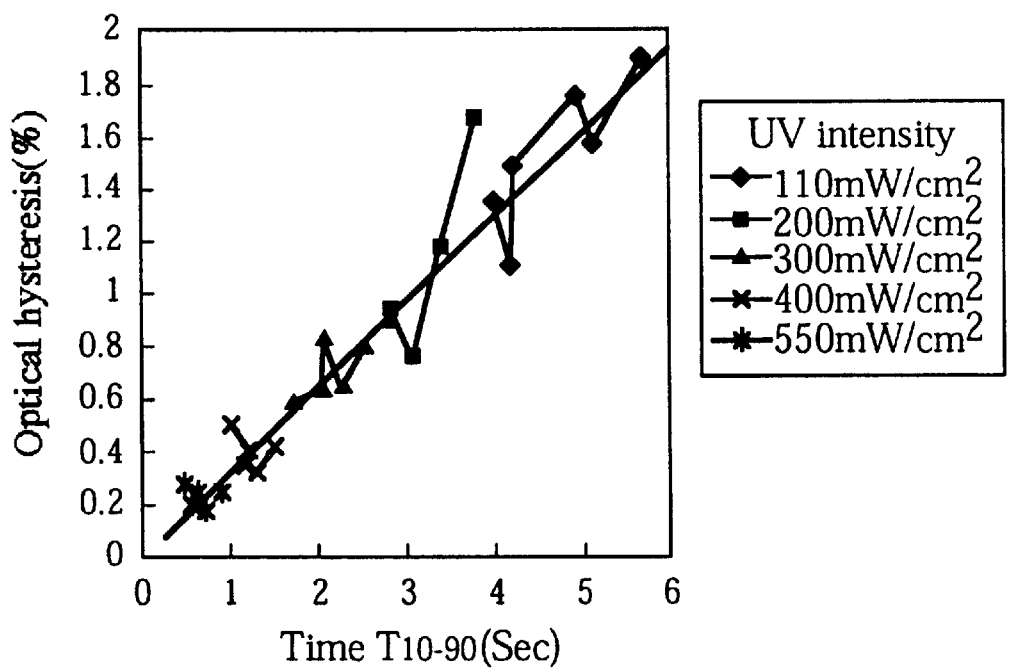
FIG. 9 is a graph showing the relationship between the time T2 and the optical hysteresis, in the first inventive group.
Figure 13:
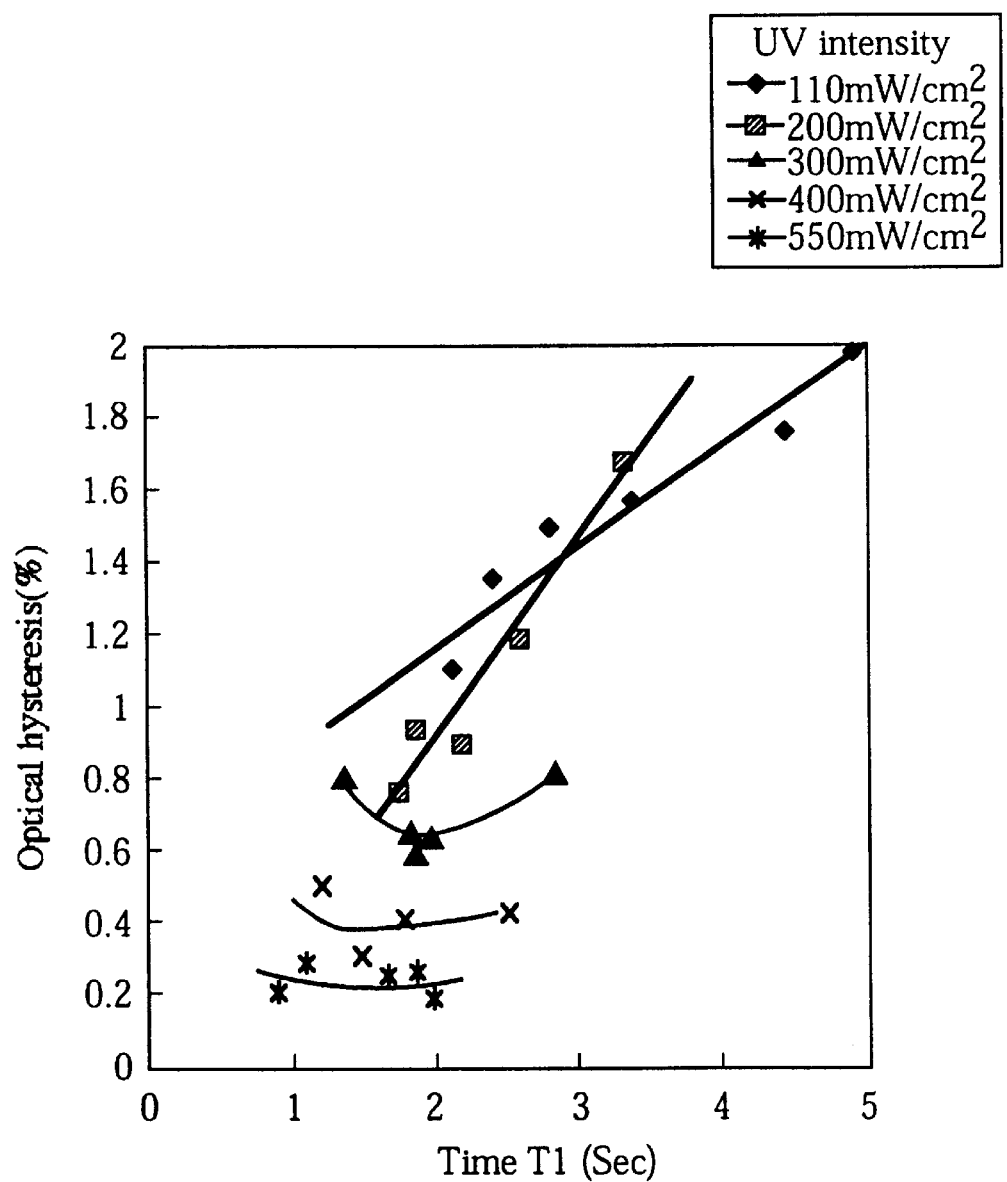
FIG. 13 is a graph showing the relationship between the time T1 and the optical hysteresis, in the first inventive group.

Shown in FIG. 13 is the relationship between the time T1 and the optical hysteresis of the element of Example 1-3, and shown in FIG. 9 is the relationship between the time T2 (or rather $T_{10\text{-}90}$) and the optical hysteresis.

As clearly seen from FIG. 9, the time T2 and the optical hysteresis showed a substantially positive correlation therebetween, irrespective of the polymerization temperature and the intensity of ultraviolet. This clarified that the optical hysteresis could be reduced by controlling the time T2.

On the other hand, it was seen from FIG. 13 that the time T1 was not correlated with the optical hysteresis so much as the time $T_{10\text{-}90}$ was. However, it was confirmed that at the intensity of ultraviolet of 200 mW/cm$^2$ or less, there was a positive correlation between the time T1 and the optical hysteresis, while also, at the intensity of ultraviolet of 300 mW/cm$^2$ or more, a substantially constant optical hysteresis presented, irrespective of the time T1. It was proven from this that at the intensity of ultraviolet of 200 mW/cm$^2$ or less, the optical hysteresis could be reduced by controlling the time T1.

Also, it was proven from FIGS. 9 and 13 that the optical hysteresis of 2% or less requires the time T1 and the time $T_{10\text{-}90}$ to be reduced to 5 seconds or less and 6 seconds or less, respectively, and that the optical hysteresis of 1.5% or less requires the time T1 and the time $T_{10\text{-}90}$ to be reduced to 4 seconds or less and 5 seconds or less, respectively. Further, it was proven that the optical hysteresis of 1% or less requires the time $T_{10\text{-}90}$ to reduced to 3 seconds or less and that the optical hysteresis of 0.5% or less requires the time $T_{10\text{-}90}$ to reduced to 1.5 seconds or less.

Figure 14:
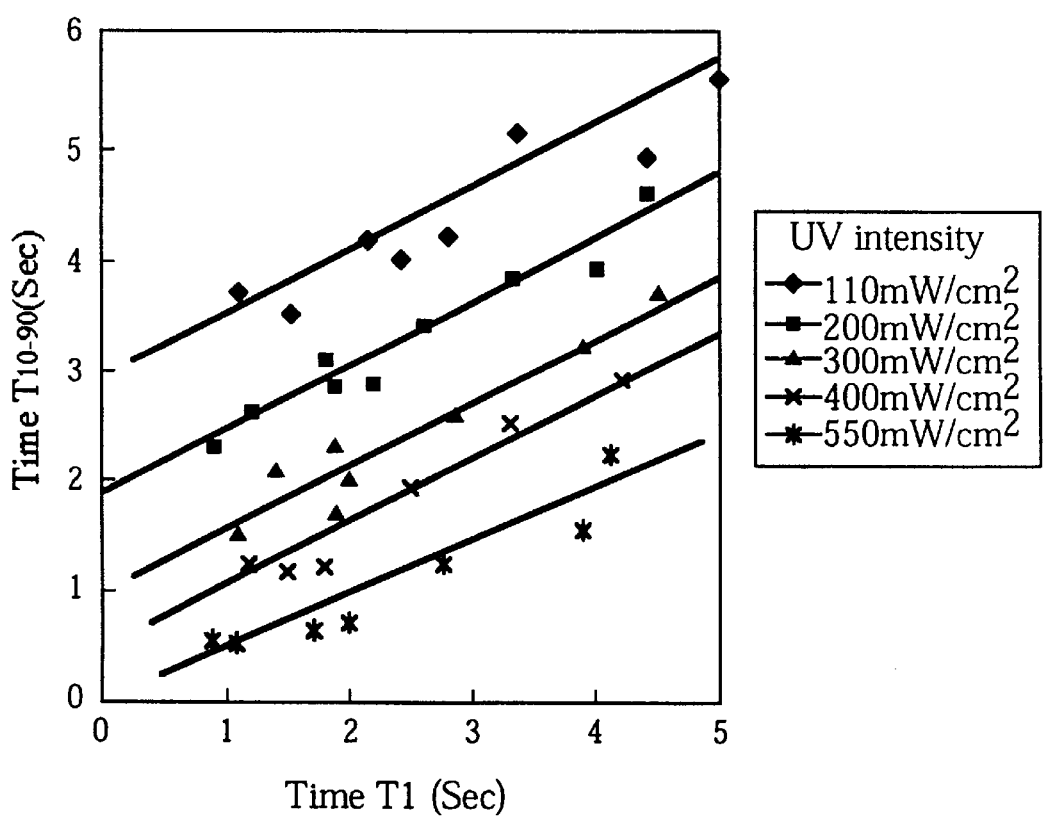
FIG. 14 is a graph showing the relationship between the time T1 and the time T2, in the first inventive group.

Shown in FIG. 14 is the relationship between the time T1 and the time $T_{10\text{-}90}$ presented with reference to the intensity of ultraviolet. As clarified from FIG. 14, the time T1 and the time $T_{10-90}$ were found to be correlated to each other so close that they could be approximated with $T_{10-90}=a \cdot T1+b$ (linear function). Also, it was proven that the number a in the linear function ranged from 0.4 or more to 0.6 or less within the range of 100 mW/cm² to 550 mW/cm² in intensity of ultraviolet. Accordingly, using the linear function equation, the values of the time T1 and the time $T_{10-90}$, can be estimated to enable the polymerization to be controlled further efficiently.

Figure 7:
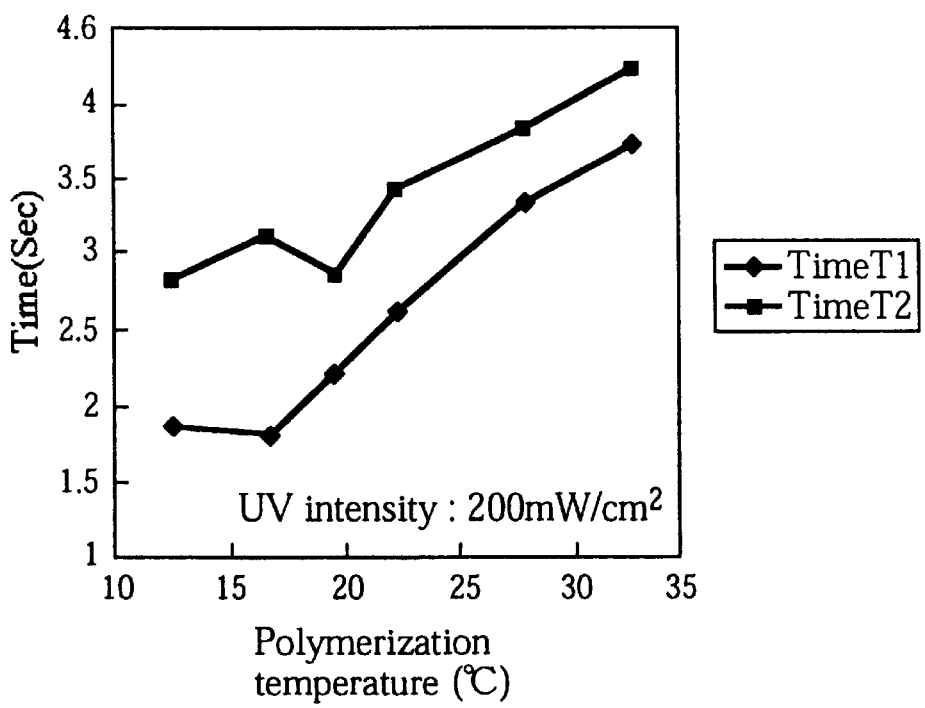
FIG. 7 is a graph showing the relationship between the polymerization temperature and the rate of polymerization, in the first inventive group.

A method of forming the element having a small optical hysteresis by making the use of the above FIGS. 7, 9 and 14 will be described here.

The time $T_{10-90}$ for enabling a desired optical hysteresis is read out from FIG. 9. Then, the time T1 related to the time $T_{10-90}$ is read out with reference to the intensity of ultraviolet from FIG. 14. The resulting time T1 is fitted to the ordinance in FIG. 7 and the polymerization temperature is read out from a line of the time T1 (♦—♦). Thus, the intensity of ultraviolet and the polymerization temperature required for the element of a desired optical hysteresis to be produced can be determined. Using these requirements, the element structure having reduced optical hysteresis characteristics (the structure of polymer dispersion type liquid crystal, or directly, the formation and structure of liquid crystal droplets related with the polymer matrix) can be realized. More specific description on this will be given below, taking the case of the optical hysteresis being brought to 1% as an example. In this example, the thermal phase separation temperature of the liquid crystal polymer precursor compatible solution is assumed to be 10° C.

First, the time $T_{10-90}$ for enabling the optical hysteresis of 1% read out from FIG. 9 is 3 seconds. From FIG. 14, the T1 corresponding to the 3 seconds ($T_{10-90}$) can be read as about 2 seconds for the intensity of ultraviolet of 200 mW/cm², about 3.6 seconds for the intensity of ultraviolet of 300 mW/cm², and about 4.4 seconds for the intensity of ultraviolet of 400 mW/cm². When the polymerization time corresponding to the obtained time T1 is read out in FIG. 7, the result being of 2 sec.→19° C., 3.6 sec.→32° C., and 4.4 sec.→44° C. The results are listed in TABLE 1. It is understood from this that the polymer dispersion type liquid crystal display element having the optical hysteresis of 1% could be realized: by irradiating the ultraviolet of 200 mW/cm² in intensity for about 30 seconds, with the polymerization temperature (liquid crystal panel temperature) set at 19° C. (thermal phase separation temperature+9° C.); by irradiating the ultraviolet of 300 mW/cm² in intensity for about 30 seconds, with the polymerization temperature set at 32° C. (thermal phase separation temperature+22° C.); or by irradiating the ultraviolet of 400 mW/cm² in intensity for about 15 seconds, with the polymerization temperature set at 44° C. (thermal phase separation temperature+34° C.).

TABLE 1-1

| Intensity of Ultraviolet (mW/cm²) | Time T1 (Second) | Time $T_{10-90}$ (Second) | Polymerization Temperature (° C.) | Deviation from Thermal Phase Separation Temperature (° C.) |
| --- | --- | --- | --- | --- |
| 200 | 2.0 | 3.0 | 19 | +9 |
| 300 | 3.6 | 3.0 | 32 | +22 |
| 400 | 4.4 | 3.0 | 44 | +34 |

Attention should be paid to the following for selection of the above-listed conditions. When the polymerization temperature is as high as 17° C. or more in deviation from the thermal phase separation temperature, the liquid crystal droplets have the tendency to be distorted due to scratch defects of the substrates or something. Due to this, it is preferable to avoid selecting a temperature higher than a thermal phase separation temperature by 17° C. or more as the polymerization temperature. Take the above case for instance, the conditions of the intensity of ultraviolet of 200 mW/cm² and the polymerization temperature of 19° C. should preferably be selected, for example.

Example 1-4

The liquid crystal display element of Example 1-4 was produced in a similar manner to that in Example 1-1, except that the polymerization temperature was kept constant at 13° C. and also the intensity of ultraviolet was changed within the range from 20 mW/cm² to 550 mW/cm². In addition, the evaluation was made by use of the same apparatus and in the same manner as in Example 1-1.

Figure 8:
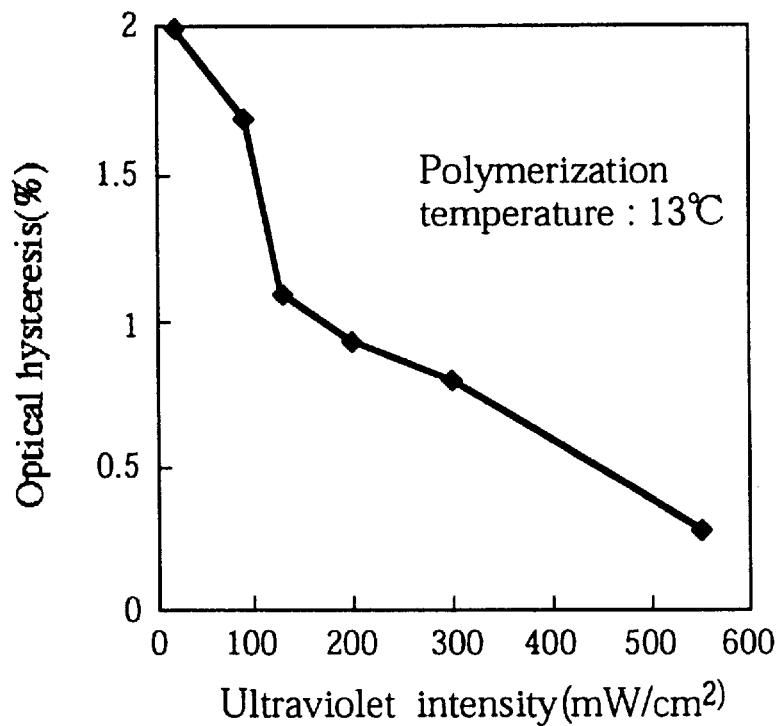
FIG. 8 is a graph showing the relationship between the ultraviolet intensity and the optical hysteresis, in the first inventive group.

The measuring results of the optical hysteresis are shown in FIG. 8. As shown in FIG. 8, with increasing intensity of ultraviolet, the optical hysteresis was reduced significantly. At the intensity of 100 mW/cm², the optical hysteresis came to 1.5%. Also, at the intensity of 200 mW/cm², the optical hysteresis came to 1%, and at the intensity of 300 mW/cm² and 500 mW/cm², the optical hysteresis came to 0.8% and 0.5%, respectively.

When 126 levels of gray scale were displayed to flash on and off by using the liquid crystal display element of the optical hysteresis of 1%, it was confirmed that residual images and things like that could be well reduced to produce a good display enough for applications to OA including data projections.

With the optical hysteresis of 0.5%, a good gray scale display was obtained even at the 256 levels of gray scale display, thus achieving a good image for a full color moving picture as well.

It is then clearly seen from Examples 1-1 and 1-2 that the change of the intensity of ultraviolet is a consequence of the control of the above-described time T1 and $T_{10-90}$.

In addition, there was provided the effect that with increasing intensity of ultraviolet, unevenness of polymerization, resulting from a scratch defect on the substrates or unevenness of irradiation, decreased. This is because, with increasing intensity of ultraviolet, the rate of polymerization increases so that the liquid crystal droplets can be prevented from growing unevenly along the scratch defects.

Example 1-5

Example 1-5 is distinguishable in that the temperature of element of the liquid crystal display element at the time of irradiation of ultraviolet is in the range of from 1° C. or more to 15° C. or less in deviation from a thermal phase separation temperature of the mixed solution and that the time T1 and the time $T_{10-90}$ are controlled by changing a surface temperature of the element. The remaining requirements are the same as those in Example 1-1.

The polymerization temperature was set within the range of from not less than a thermal phase separation temperature of the liquid crystal and polymer to not more than a temperature deviating therefrom as high as +20° C. Also, the intensity of ultraviolet was set in the range of not more than 110 mW/cm², 200 mW/cm², 300 mW/cm², 400 mW/cm², and 550 mW/cm².

Measurements of the optical hysteresis (a maximum value) under the temperature of element of, 30° C. are shown in FIG. 6.

When polymerization temperatures were changed with reference to the respective intensity of ultraviolet, the magnitude of any of the optical hysteresis varied, each presenting the polymerization temperature at which the optical hysteresis exhibited a minimum value. Also, with increasing intensity of ultraviolet, the polymerization temperatures exhibiting the minimum values were shifted toward higher temperatures. Further, with the intensity of ultraviolet of not less than 200 mW/cm$^2$, downward depressed curves were plotted, each showing the existence of the polymerization temperature providing the minimum optical hysteresis (the minimum value). The polymerization temperatures at which the optical hysteresis come to minimum range from about 12° C. to about 23° C., which are higher than the thermal phase separation temperature (10° C.) by 2–13° C.

It was proven from FIGS. 6 and 12 that the element of small optical hysteresis could be produced by proper combination of the intensity of ultraviolet and the polymerization temperature. It is clearly seen from Examples 1-2 and 1-3 that the change of polymerization temperature is a consequence of the control of the above-described time T1 and $T_{10-90}$.

Example 1-6

In this example, the polymerization temperature under which the optical hysteresis comes to an almost minimum value was selected. To be more specific, with the intensity of ultraviolet set at 200 mW/cm$^2$ (irradiated for 30 seconds) and the polymerization temperature set at a temperature (17° C.) higher than the thermal phase separation temperature (10° C.) by 7° C., a liquid crystal display element was produced. The remaining requirements are the same as those of Example 1-1.

The element thus produced had the maximum optical hysteresis of 0.8% under the temperature of element of 30° C.

Further, with the intensity of ultraviolet set at 300 mW/cm$^2$ and the polymerization temperature set at a temperature (19° C.) higher than the thermal phase separation temperature by 9° C., a liquid crystal display element was produced in an analogous manner.

The element thus produced had the optical hysteresis of 0.6% under the temperature of element of 30° C. and was confirmed to provide a good image at the 256 levels of gray scale display.

Further, it was confirmed that with increasing intensity of ultraviolet, the rate of polymerization increased to allow the liquid crystal droplets to be uniform, but, with the intensity of ultraviolet exceeding 400 mW/cm$^2$, the optical hysteresis increased by the order of 20% in use under a low temperature (not more than 5° C.). Due to this, in order to suppress deterioration of the optical hysteresis under low temperatures, the intensity of ultraviolet should be set to be not more than 400 mW/cm$^2$ and also the polymerization temperature should be lower than the thermal phase separation temperature by 5 to 13° C. It should be noted that when the intensity of ultraviolet is strong, there is a possible fear that the liquid crystals may be decomposed and excessively reduced in size to lower the scattering characteristics.

Example 1-7

As a substitute for the composition of the polymer precursor mixture described in Example 1-1, a polymer precursor mixture was produced, with 2-ethylhexyl acrylate (polymerizable monomer) mixed to the mixture in the proportion of 88 wt %, HDDA (KARARAD) mixed in the proportion of 2 wt %, and the oligomer and the polymerization initiator mixed in the same proportions as those in Example 1-1. Then, the resulting polymer precursor mixture and the above-described liquid crystal material TL205 were mixed each other in the proportions of 20 wt % and 80 wt %, respectively, to produce a liquid crystal polymer precursor compatible solution. The compatible solution thus produced was injected in the panel. Thereafter, with the panel temperature (polymerization temperature) set at a temperature higher than the thermal phase separation temperature by 10° C., the panel was irradiated with ultraviolet with the intensity of 300 mW/cm$^2$ for 30 seconds to polymerize the polymer precursor, to thereby produce the polymer dispersion type liquid crystal display element.

The element thus produced was measured in respect of the optical hysteresis, with the temperature of element (operating temperature) varied in the range of 0° C. to 70° C. The measurement was made with the same apparatus and in the same manner as those in Example 1-1. With the element driven via TFT, its gray scale display properties were observed, the results TABLE 1-2.

As to the marks used in TABLE 1-2, ⊙ represents a very good gray scale display; ○ represents a good gray scale display; and Δ represents a slightly inferior gray scale display.

TABLE 1-2

| Temperature ° C. | Optical hysteresis % | Evaluation of Display Performance |
| --- | --- | --- |
| 0 | 2.5 | Δ |
| 5 | 1.3 | ○ |
| 10 | 1.0 | ⊙ |
| 30 | 0.8 | ⊙ |
| 50 | 1.0 | ⊙ |
| 70 | 0.9 | ⊙ |

As clearly seen from TABLE 1-2, the liquid crystal display element exhibited a good display performance in the operating temperature ranging from 5° C. It was proven from the experimental results that the liquid crystal display element capable of delivering a good display performance could be produced even in temperatures of not more than room temperatures by adding an additive capable to allow the interfacial restrictive force (anchoring), like HDDA, and controlling the polymerization temperature and intensity of ultraviolet in the phase separation operation properly.

The additive capable to adjust the interfacial restrictive force is not limited to the HDDA disclosed above, but various kinds of monofunctional monomers and/or multifunctional monomers may be used as the additive. Of those additives, bifunctional monomer is particularly preferable in that the effect of improving the optical hysteresis under low temperatures is enhanced. The monofunctional monomers which may be used include, for example, isostearyl acrylate (Light Acrylate IS-A available from KYOEISHA CO., LTD.). The bifunctional monomers which may be used include, for example, triethylene glycol diacrylate (3EG-A), PEG#200 diacrylate (4EG-A), PEG#400 diacrylate (9EG-A), neopentyl glycol diacrylate (NP-A), 1,6-hexandiol diacrylate (1·6 HX-A; all of the above available from KYOEISHA CHEMICAL CO., LTD.). These may be used singly or in combination of two or more kinds.

(Other Matters)

The insulating films which may be used in the first inventive group are not necessarily limited to those described in the above Examples, but may include either of those of polyimide type and those of polyamic acid type. Again, the insulating films may be substituted for inorganic insulating films ($SiO_2$ and others). The insulating film, when used, provides the effect of enhancing the retention of voltage. Additionally, the insulating film of high surface energy (surface tension) in the interface with the liquid crystals, when used, provides accelerated separation speed of the liquid crystals, to lead to reduction of optical hysteresis.

Also, combination of the liquid crystal precursor compatible solution is not limited to those disclosed in the above Examples, either, but any combination will do, as long as the liquid crystal and the polymer precursor are allowed to be compatible and also are allowed to be phase separated by irradiation of ultraviolet to be copolymerized. For example, PNM201 (available from DAINIPPON INK AND CHEMICALS, INC.) may be used as the liquid crystal polymer precursor compatible solution. When PNM201 is used, both of the polymer dispersion type liquid crystal in the narrow sense in which liquid crystal droplets are held in continuous polymer matrix phase and the polymer network type liquid crystal can be allowed to be prepared by changing the preparation conditions.

Further, in general, the thermal phase separation temperature varies with variations in composition of the liquid crystal polymer precursor compatible solution. Due to this, an absolute value of the polymerization temperature must be varied in response to the thermal phase separation temperature of the liquid crystal polymer precursor compatible solution. It was confirmed by the inventors that by equalizing the relative temperature differences between the polymerization temperature and the thermal phase separation temperature, substantially the same effect could be produced even with the composition of the compatible solution varied. For example, PNM201 has the phase separation temperature of 17° C., so the polymerization temperature is determined with reference to this given temperature. Specifically, the polymerization temperature should preferably be in the range of about 20° C. to about 32° C.

The panel gap is not limited to those disclosed in Examples above, but is simply required to be not less than 5 µm. By letting the panel gap be in the range of from not less than 10 µm to not more than 15 µm, in particular, the driving voltage and the scattering power can be allowed to be compatible.

The particle size of the liquid crystal droplets in the range of from not less than 0.8 µm to not more than 2.5 µm can provide the element having an excellent scattering power. In particular, by letting the particle size of the liquid crystal droplets be in the range of from not less than 1 µm to not more than 2 µm and setting the panel gap adequately, the element capable of being driven by a low voltage can be attained.

Means for controlling the panel temperature may adopt any form as long as it can keep the panel temperature constant and be capable of irradiation of ultraviolet. For example, a Peltier element may be used. Alternatively, a temperature control of only one side of the liquid crystal panel may be adopted.

Also, not less than 10 seconds is enough for the irradiation time of ultraviolet.

The technique of monitoring the degree of polymerization (the degree of progress of polymerization) with a suitable apparatus like the one described in the above Examples provides the effect that the irradiation time can be determined, with the degree of polymerization being observed. The above-said apparatus may alternatively be substituted for any other suitable means to monitor the intensity of transmitted light and reflected light, to determine the degree of polymerization. Further, the means for monitoring the degree of polymerization and the ultraviolet irradiating apparatus can be associated with each other in their on-off mode, to allow the irradiation to stop automatically.

The liquid crystal polymer compatible solution may take different proportions of the liquid crystal to the liquid crystal polymer compatible solution other than 80 wt %, but the proportion of the liquid crystal should preferably be in the range of 70 wt % to 90 wt % in terms of the scattering characteristics. With increasing proportion of liquid crystal, the liquid crystal droplets tend to be distorted, to lead to increase in optical hysteresis. Thus, in the case of increased proportion of liquid crystal, the operation and effect of the present invention of controllably restricting the intensity of ultraviolet and polymerization temperature properly is exhibited further significantly.

(2) EXAMPLES OF SECOND INVENTIVE GROUP

Example 2-1

The liquid crystal display element according to Example 2-1 is characterized in that the bipolar-form orientation pattern is maintained in the temperature range for the liquid crystal display element to be used. For this purpose, the transition temperature for the orientation pattern to be transformed from the bipolar-form orientation pattern to the radial-form orientation pattern is attempted to be reduced by decreasing tilt angles of the liquid crystal molecules at their interfaces with polymer.

FIG. 15 is a sectional view of a liquid crystal display element according to Example 2-1. In practice, an active matrix substrate forming thereon TFT (Thin Film Transistor) is used in this Example, though not shown here.

As shown in the same figure, a liquid crystal layer comprising polymer compound 202 and liquid crystal droplets 203 is arranged between an active matrix substrate 208 and a counter substrate 206 which are disposed facing each other. The active matrix substrate 208 includes a glass substrate 200 on which a pixel electrode 201 and an insulating film 205 are formed. On the other hand, the counter substrate 206 includes a glass substrate 200 on which a counter electrode 207 and an insulating film 205 are formed. The liquid crystal droplets 203 in the liquid crystal layer are dispersed and scattered in the island form in the polymer compound 202. The liquid crystal droplets 203 take the bipolar-form orientation pattern in which the liquid crystal molecules 204 each have variously oriented poles in the vicinity of their interface with the polymer compound 202. Though the liquid crystal droplets 203 shown in FIG. 15 are individually separated from each other, some neighboring liquid crystal droplets may partially contact with each other to be associated in series. In addition, the formation in which polymer compound 202 are formed in the network form and the liquid crystals are held in between the networks of the polymer compound may be adopted.

The above-described liquid crystal display element was produced in the following manner.

(1) Following materials, i.e., (a) 89% of polymerizable monomer (2 ethylhexyl acrylate);

(b) 9% of oligomer (Biscourt 828 available from OSAKA ORGANIC CHEMICAL INDUSTRY);

(c) 1% of polymerization initiator (Benzyl Methyl Ketal available from NIPPON KAYAKU CO., LTD.) were mixed, and then (d) 1% of 1,6-hexandiol diacrylate of KS-HDDA (KAYARAD HDDA available from NIPPON KAYAKU CO., LTD.) for controlling the interfacial restrictive force was added to the mixture, to prepare a mixed solution.

Then, 80% of liquid crystal material TL205 (available from Merck Japan Limited) was added to 20% of the thus prepared mixed solution, to prepare liquid crystal polymer precursor compatible solution.

(2) A pixel electrode 201, a source line, a gate line, TFT elements and others were formed on the glass substrate 200 through the techniques of vacuum deposition and etching. Further, an alignment layer material of OPTOMER AL8534 (available from JAPAN Synthetic Rubber Co., Ltd.) was applied on the pixel electrode 201 by a printing method and then was cured in an oven, to form an insulating film 205 thereon, thus producing an active matrix substrate 208.

(3) As in the case of the above (2), the counter electrode 207 and the insulating film 205 were formed on the glass substrate 200, to produce the counter substrate 206.

(4) The active matrix substrate 208 and the counter substrate 206 were laminated to each other through glass spacers, not shown, at an interval of 13 $\mu$m.

(5) The liquid crystal polymer precursor compatible solution described in the above (1) was injected in a space between the active matrix substrate 208 and the counter substrate 206 via a vacuum injection method, to produce a liquid crystal panel.

(6) With the temperature of the liquid crystal panel kept at 13° C. (3° C. higher than the thermal phase separation temperature), the liquid crystal panel was irradiated with ultraviolet of the intensity of 160 mW/cm$^2$ to polymerize the polymerizable monomers in the liquid crystal polymer precursor compatible solution, to thereby produce the polymer dispersion type liquid crystal display element. The intensity of ultraviolet above was confirmed by measuring with an illuminance meter.

It is difficult to make direct measurements of the tilt angles of the liquid crystal molecules 204 at the interface of the liquid crystal droplets 203 of the thus produced liquid crystal display element with the polymer compound 202, but it is possible to determine the tilt angles by the following manner. The mixed solution, which comprises the polymerizable monomer, the oligomer, the polymerization initiator and the interfacial restrictive force controlling agent as described in the above (1), was applied on the glass substrate, which was then covered with another glass substrate. The resulting liquid crystal panel was irradiated with ultraviolet under the same condition as in the above (6), to be cured into a thin layer form. Then, the liquid crystal material described in the above (1) was dripped on the thin layer and contact angles of the liquid crystal material dripped were measured to determine the tilt angles, the measurement results being 5°.

Also, it is possible to determine the particle size of the liquid crystal droplets 203 by the following manner. First, a pseudo-liquid crystal display element was produced with the same composition and under the same conditions as in the above-described liquid crystal display element, but with only difference in that the above-described counter substrate 206 and active matrix substrate 208 were substituted for a pair of single glass substrates. Then, the glass substrates were peeled off from the element, and the liquid crystal droplets were washed out. The remaining part in which the liquid crystal droplets had existed was observed under the microscope, to determine a mean value of the particle size by use of an image processor, the result being 1.2 $\mu$m.

From this, the liquid crystal display element using the substrates forming thereon the above-described TFT elements is presumed to also have the same mean particle size of 1.2 $\mu$m. It is noted that due to the proportion of the liquid crystals of the liquid crystal display element of this Example being as high as 80%, the liquid crystal droplets 203 are not necessarily spherical in shape completely separated from each other, but some are of somewhat distorted spherical by some neighboring liquid crystal droplets 203 being partially jointed together to form a continuum structure.

Figure 1:
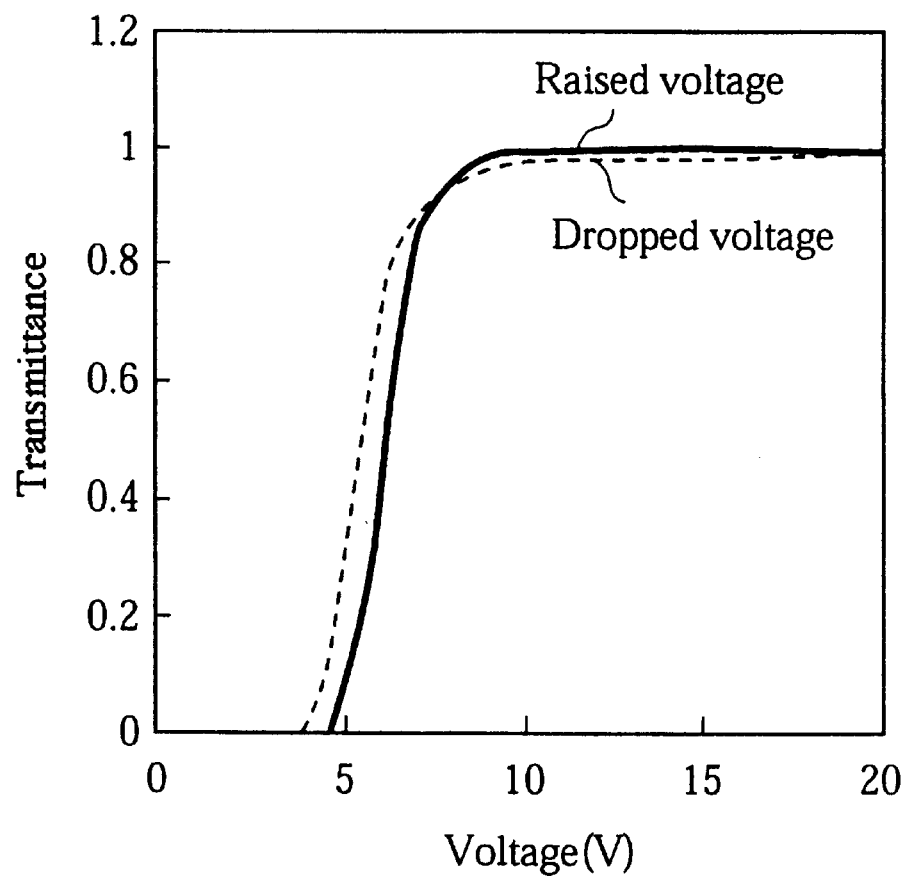
FIG. 1 is a graph for illustrating the optical hysteresis, in the first inventive group.
Figure 2:
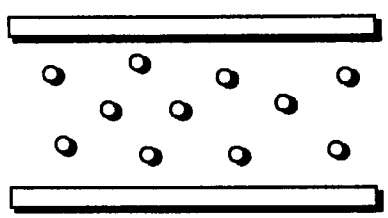
FIGS. 2(*a*) and (*b*) are diagrammatic illustrations of the rate of polymerization and the state of the liquid crystal droplets being formed, in the first inventive group.
Figure 2:
Figure 2:
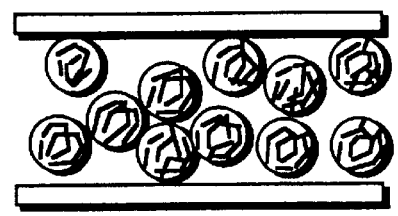
Figure 2:
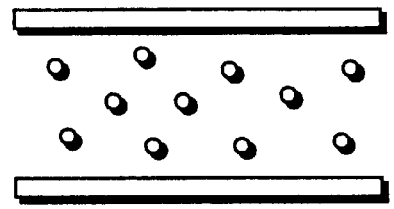
Figure 2:
Figure 2:
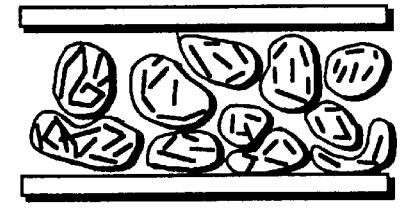
Figure 3:
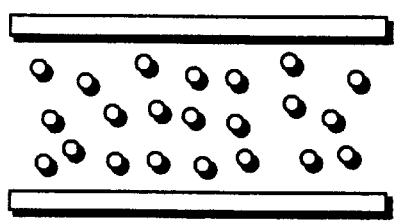
FIGS. 3(*a*) and (*b*) are diagrammatic illustrations of generating density of the liquid crystal droplets and the state of the liquid crystal droplets being formed, in the first inventive group.
Figure 3:
Figure 3:
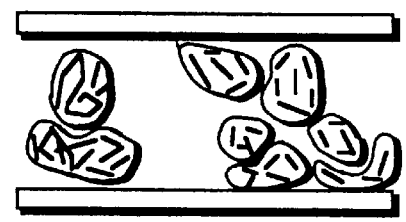
Figure 3:
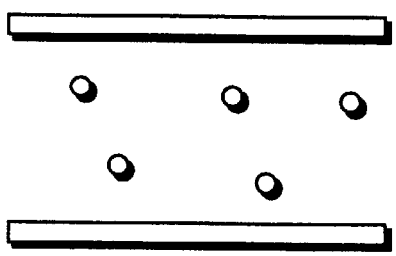
Figure 3:
Figure 3:
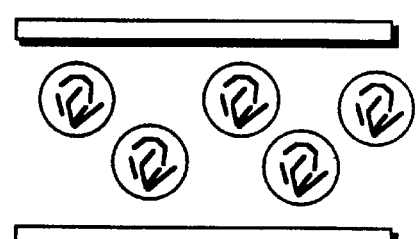

Next, the orientation patterns of the liquid crystals responsive to ambient temperatures were observed. When there exist a plurality of liquid crystal droplets 203 orienting in the vertical direction to the glass substrate 200, transmitted light is scattered to make it impossible to make the direct measurements in this observation. However, it is possible to make the confirmations by the following manner. Specifically, adequate models of liquid crystal droplets 203', each having a size enough to be observed under the microscope, are formed from the same composition, and the experiments are made for the models, for the observation purpose. To be more specific, with the panel gap set at 10 $\mu$m, the liquid crystal droplets 203' having the diameter of 12 $\mu$m are formed and observed. In this case, the liquid crystal droplets 203' formed take the formation of their being somewhat compressed in a direction vertical to substrates 206'·208', as shown in FIG. 3.

When the observation of the liquid crystal droplets 203' was made under ambient temperature of 30° C. with a polarization microscope having a polarizing plate disposed on a cross nicole, the liquid crystal droplets 203' shown in FIG. 16(a) were observed, i.e., they looked colored with a substantially even distribution of color ranging from white to black. It is thought that this is because, as shown in FIG. 17(a), the liquid crystal molecules 204' are oriented in a direction generally parallel to the interface with the polymer compound 202', in other words, many of them are oriented in a direction parallel to the substrates 206', 208', and also the liquid crystal droplets 203' are each oriented randomly in a plane parallel to the substrates 206', 208', thereby producing a delivery of color responsive to angles formed by the directions and a polarization axis of the polarizing plate.

It is presumed, therefore, that the liquid crystal droplets having a particle size of 1–2 $\mu$m, as the liquid crystal display element of this example, presents a bipolar-form orientation pattern having nearly two poles of orientation singular point. The then two poles are presumably oriented randomly with respect to a three dimensional direction, because the liquid crystal droplets 203 are not so compressed as the above-described liquid crystal droplets 203'.

On the other hand, when the observation of the same liquid crystal droplets was made likewise under ambient temperature of 0° C., the liquid crystal droplets shown in FIG. 16(b) were observed, i.e., they looked dark as a whole and also cross-like, black parts were observed with respect to the direction of axis of polarization of the polarizing plate. It can be seen from this that the liquid crystal molecules in the vicinity of the interface with the polymer compound are oriented in a direction generally vertical to the said interface and many of them are oriented in a direction vertical to the substrates, as shown in FIG. 17(b). It is presumed, therefore, that the liquid crystal droplets having a particle size of 1–2

μm, as the liquid crystal display element of this example, presents a radial-form orientation pattern having a pole at a center of each liquid crystal droplet.

Further, similar observations were made under differently varied temperatures, the result showing that the liquid crystal molecular orientation took the bipolar-form under temperatures of about 5° C. or more and took the radial-form under temperatures of 5° C. or less.

Next, the liquid crystal display element of this Example was measured in respect of the electro-optical characteristics (applied voltage-transmittance characteristics) under ambient temperatures of 10° C. and 0° C. Specifically, a given driving circuit was connected with the liquid crystal display element to apply a voltage, varying continuously from 0 V to 20 V and from 20 V to 0 V, across the pixel electrode 201 and the counter electrode 207 through the TFT elements, for making measurements of the liquid crystal display element in respect of the transmittance (intensity of transmitted light). The transmittance was measured with the liquid crystal evaluating apparatus (LCD5000 available from OTSUKA ELECTRONICS CO., LTD.). The measurement results under ambient temperature of 10° C. are shown in FIG. 18(*a*) and the measurement results under ambient temperature of 0° C. are shown in FIG. 18(*b*). In these figures, the solid line represents transmittance at the time of raised voltage and a broken line represents transmittance at the time of dropped voltage.

When the optical hysteresis is defined as a percentage of a value obtained by a maximum difference between the transmittance at the time of raised voltage and that at the time of dropped voltage during the application of the same voltage being divided by the transmittance at the time of application of 20 V, the optical hysteresis was as follows. In the case of the ambient temperature of 10° C. (in the case of the bipolar-form orientation pattern), the transmittance was as low as 1.5%. On the other hand, in the case of the ambient temperature of 0° C. (in the case of the radial-form orientation pattern), the transmittance was as significantly high as 20%. It is generally said in this respect that the optical hysteresis of not more than 2.0% can produce a good display image.

Further, when the optical hysteresis was measured under different ambient temperatures, good display characteristics were presented in the range of 10° C. to 85° C. It is therefore presumed that the orientation pattern in this temperature range is presumed to be of bipolar-form.

Gray scale was displayed to flash on and off at different levels by different voltages being applied on and off. Under the ambient temperature of 10° C., a good display with reduced residual image was obtained, because of small optical hysteresis over the full levels of gray scale. On the other hand, under the ambient temperature of 0° C., the residual image remained outstandingly, so that, even when the flashing was stopped, the original gray scale was not reproduced. Hence, under the ambient temperature of 0° C., it is difficult for the liquid crystal display element to be practically used.

As discussed above, the liquid crystal display element of very small optical hysteresis can be produced by allowing the liquid crystal droplets to take the bipolar-form orientation pattern in the temperature range in which the liquid crystal display element is used.

Shown in this example is an example of the liquid crystal display element in which some neighboring liquid crystal droplets partially associated with each other in series exist in the polymer matrix. Alternatively, the formation in which liquid crystal droplets are individually separated from each other or the formation in which the polymer matrix is formed in the network form and the liquid crystals are held in between the networks of the polymer compound may be adopted to obtain the similar electro-optical characteristics.

Also, for the insulating film 205, either of the alignment layer material of polyimide type and that of polyamic acid type may be used. Further, inorganic insulating film may be used. Further, the insulating films arranged are advantageous in that retention of voltage is enhanced, but are not necessarily indispensable.

In addition, monofunctional monomers and multifunctional monomers can produce substantially the same effects as HDDA used as the additive. Particularly, bifunctional monomers, when used, allow the hysteresis to significantly reduce under low temperatures. The monofunctional monomers which may be used include, for example, isostearyl acrylate (Light Acrylate IS-A available from KYOEISHA CO., LTD.). The bifunctional monomers which may be used include, for example, triethylene glycol diacrylate (3EG-A), PEG#200 diacrylate (4EG-A), PEG#400 diacrylate (9EG-A), neopentyl glycol diacrylate (NP-A), 1,6-hexandiol diacrylate (1·6HX-A; all of them are available from KYOEISHA CHEMICAL CO., LTD.) or urethane acrylate (e.g. M-1100, M-1200, M-1210, M1310, or M-1600 all available from TOAGOSEI CO., LTD.) expressed by the aforesaid chemical formula 1. The trifunctional acrylates which may be used include, for example, trimethylpropane triacrylate (TMP-A) and pentaerythritol triacrylate (PE-3A, all of them are available from KYOEISHA CHEMICAL CO., LTD.). These materials may be used singly or in combination of two or more kinds to reduce the hysteresis under low temperatures.

Also, combination of polymerizable monomer and liquid crystal material is not limited to those disclosed above, but any combination will do, as long as the polymerizable monomer in the liquid crystal polymer precursor compatible solution is allowed to be copolymerized by irradiation of ultraviolet. In the case of the liquid crystal droplets then having the particle size in the range of from not less than 0.8 μm to not more than 2.5 μm, the liquid crystal display element having excellent scattering power can be produced. The particle size in the range of from not less than 1 μm to not more than 2 μm, in particular, can provide the result that the interval between the substrates is reduced so that the liquid crystal display element can be driven by a low voltage enough to drive the TFT elements easily.

The panel gap is not limited to 13 μm as disclosed above, but is simply required to be not less than 5 μm. By letting the panel gap be in the range of from not less than 10 μm to not more than 15 μm, in particular, the driving voltage and the scattering power can be allowed to be compatible.

In addition, the intensity of ultraviolet need not be limited to 160 $mW/cm^2$, but the intensity of ultraviolet of not less than 160 $mW/cm^2$ has the effect of allowing the optical hysteresis to be reduced under high temperatures.

Further, the smaller the tilt angles, the better. The tilt angle set at 5° produces, in particular, the great effect of maintaining the bipolar-form orientation pattern, though need not be limited thereto. The tilt angles of not more than 10° can produce the similar effect (stable bipolar-form orientation pattern).

Shown herein is an example of the liquid crystal display element which is so formed as to allow the transition from the bipolar-form orientation pattern to the radial-form orientation pattern to be generated under ambient temperature of about 5° C., so as to be usable in the temperature range of 10 to 85° C. A liquid crystal display element usable in a temperature range e.g. in the range of 0 to 85° C. can also be produced easily. In this case, in the process of the phase separation and polymerization caused by irradiation of ultraviolet to produce the liquid crystal display element, the temperature of the liquid crystal panel at the time of irradiation of ultraviolet and the intensity of ultraviolet may be controlled and also the concentration of added monomer may be regulated to maintain the bipolar-form orientation pattern under the ambient temperature of 0° C. as well.

It is noted that the temperature range for a good display to be presented depends on intended purposes of the liquid crystal display element. When the liquid crystal display element is used to a projection display, for example, it is commonly required that a lower limit temperature be not more than 10° C. at maximum and an upper limit temperature be higher than a temperature lower than a clearing point transition temperature of the liquid crystal by 5° C. When the liquid crystal display element is used to a direct-view display or a reflection display, the lower limit temperature is desirably not more than 0° C.

In more detail, letting the clear point transition temperature of the liquid crystal display element be Tni, as long as surface temperature of the liquid crystal display element falls in the range of from not less than 10° C. to not more than Tni−5° C., the liquid crystal display element presents fully practicable performances even in a display with an intense back light such as the projection display. Also, when the lower limit temperature of the liquid crystal display element is not more than 0° C., for example, the liquid crystal display element may also be used for a reflection display or a direct view display used to a portable terminal exposed to outside air temperature. Needless to say, the lower the lower limit of the operating temperature, the more useful the practicable performances.

Further, the element of little change in color can be obtained by letting the upper limit be 5° C. or less from the cleaning point transition temperature of the liquid crystal.

Example 2-2

The liquid crystal display element according to Example 2-2 is characterized in that the transition temperature, under which the orientation pattern is transformed from the bipolar-form to the radial-form, is reduced by letting the anchoring index under the ambient temperature of 30° C. be not less than 0.7, whereby the optical hysteresis under low temperatures is attempted to be reduced.

FIG. 19 is a sectional view of the liquid crystal display element according to Example 2-2. The liquid crystal display element of this Example is the same in mechanical constitution as the above Example 2-1, so that components of like function are given like reference numerals, and a description thereof will be omitted.

According to the liquid crystal element of this Example, the anchoring index of (V90×R)/d is set at 1.1, where V90 is an applied voltage required for the transmittance to become 90% in the temperature of element of 30° C.; d is an interval between the counter substrate 256 and the active matrix substrate 258; and R is an average particle size of liquid crystal droplets or an average interval of a three dimensional network form of matrix comprising polymer compound. In more detail, the voltage V90 is an applied voltage required for the transmittance to become 90% when the alternating voltage of 30 Hz is applied across the pixel electrode 251 and the counter electrode 257 through the driving circuit 259. At this time, the liquid crystal molecular orientation in the liquid crystal droplets 253 takes the bipolar-form orientation pattern in which the liquid crystal molecules 254 have a plurality of oriented electrodes in the vicinity of their interfaces with the polymer compound 252, and the liquid crystal molecules 254 around the center part of each liquid crystal droplet 253 are uniformly oriented along the direction of an electric line of force.

The liquid crystal display element was produced in the same producing method, except that when the liquid crystal polymer precursor compatible solution was prepared, (a) 1% of polymerization initiator (Benzyl Methyl Ketal available from NIPPON KAYAKU CO., LTD.) and (b) 2% of KS-HDDA of 1,6-hexandiol diacrylate (KAYARAD HDDA available from NIPPON KAYAKU CO., LTD.) for controlling the interfacial restrictive force were mixed.

The liquid crystal display element thus produced was measured in respect of the particle size of the liquid crystal droplets 253; the transition temperature for the orientation pattern to be transformed from the bipolar-form to the radial-form; and the electro-optical characteristics (applied voltage-transmittance characteristic) in the same manner as in Example 2-1, the results being that the average particle size R was 1.0 µm; the transition temperature was −5° C.; and the optical hysteresis under the ambient temperature of 10° C. was as small as 1.2%. Thus, the liquid crystal display element having a good display capability was obtained.

Also, the anchoring index (V90×R)/d was 1.1, as aforesaid, when determined with reference to the average particle size R; the applied voltage V90 required for the transmittance resulting from the applied voltage-transmittance characteristics to become 90%; and the interval d between the substrates 256, 258.

As a substitute for KS-HDDA of 1,6-hexandiol diacrylate for controlling the interfacial restrictive force, 2% of fluoro-polymerizable-monomer (Light Acrylate FA108 available from KYOEISHA CHEMICAL CO., LTD.) was added to produce a similar liquid crystal display element. The liquid crystal display element thus produced was measured in respect of the anchoring index under 30° C., the anchoring index being 0.6. In addition, the transition temperature was as high as 20° C. and the optical hysteresis under the ambient temperature of 10° C. was as too large as 40% to be practicable.

Further, various kinds of liquid crystal display elements were produced with variations in kinds of additives and concentration of the additives, and were measured in respect of the electro-optical characteristics and others to determine the relationship between the anchoring index and the orientation transition temperature. The results are shown in TABLE 2-1 and FIG. 20.

TABLE 2-1

Relationship between Anchoring Index and Orientation Transition Temperature

| No. | Orientation transition temperature (° C.) | V90 | d | Average particle size R of Liquid crystal droplets (µm) | Anchoring Index |
|---|---|---|---|---|---|
| 1 | 27 | 3.23 | 12.4 | 1.38 | 0.36 |
| 2 | 27 | 3.93 | 12.7 | 1.33 | 0.41 |
| 3 | 22 | 4.46 | 12.1 | 1.28 | 0.47 |
| 4 | 25 | 4.54 | 12.6 | 1.39 | 0.50 |
| 5 | 28 | 4.90 | 12.7 | 1.36 | 0.52 |
| 6 | 18 | 5.54 | 12.5 | 1.20 | 0.53 |
| 7 | 16 | 5.56 | 12.7 | 1.28 | 0.56 |
| 8 | 15 | 6.04 | 12.6 | 1.23 | 0.59 |
| 9 | 18 | 5.56 | 12.4 | 1.41 | 0.63 |

TABLE 2-1-continued

Relationship between Anchoring Index and Orientation Transition Temperature

| No. | Orientation transition temperature (° C.) | V90 | d | Average particle size R of Liquid crystal droplets (μm) | Anchoring Index |
|---|---|---|---|---|---|
| 10 | 8 | 7.21 | 12.6 | 1.14 | 0.65 |
| 11 | 13 | 6.72 | 12.5 | 1.21 | 0.65 |
| 12 | 15 | 6.83 | 12.6 | 1.29 | 0.70 |
| 13 | 9 | 7.43 | 12.6 | 1.24 | 0.73 |
| 14 | 9 | 7.53 | 12.6 | 1.25 | 0.75 |
| 15 | 3 | 7.70 | 12.6 | 1.24 | 0.76 |
| 16 | 13 | 8.74 | 12.4 | 1.08 | 0.76 |
| 17 | 11 | 8.92 | 12.6 | 1.09 | 0.77 |
| 18 | 0 | 10.67 | 12.5 | 1.01 | 0.86 |
| 19 | −1 | 8.08 | 12.3 | 1.39 | 0.91 |
| 20 | 3 | 11.06 | 12.5 | 1.06 | 0.94 |
| 21 | 0 | 10.76 | 12.6 | 1.12 | 0.96 |
| 22 | −5 | 12.91 | 12.5 | 1.04 | 1.07 |

Shown by TABLE 2-1 and FIG. 20 is the correlation between the anchoring index and the orientation transition temperature. With the anchoring index set to be more than 0.7, the orientation transition temperature was brought to 10° C. or less, and the optical hysteresis under the ambient temperature of 10° C. was as so low as about 2% or less, so that the liquid crystal display element having a good display capability was produced.

It is noted that the additives for controlling the interfacial restrictive force are not limited to those disclosed above, but various kinds of additives capable to allow surface energy of monomer to increase may be used. Further, two or more kinds of additives may be used in combination. In this case, the surface energy of monomers comes to be the arithmetic mean of the influences of the additives, so that the control of the surface energy or the adjustment of the orientation transition temperature is further facilitated. In addition, the concentration of the additives is not limited to those disclosed above, but since even a small amount of additive generally provides a great effect, a not more than 5% of additives can provide a sufficient effect.

Other forming materials and production conditions or requirements may be varied, as described in Example 2-1.

Example 2-3

The liquid crystal display element according to Example 2-3 is characterized in that the liquid crystal display element is produced with the temperature of the liquid crystal panel at the time of irradiation of ultraviolet kept higher than the thermal separation temperature of the liquid crystal polymer precursor compatible solution by 3–15° C., whereby the transition temperature under which the orientation pattern is transformed from the bipolar-form to the radial-form is lowered, for making attempts to reduce the optical hysteresis under low temperatures.

The mechanical constitution of the liquid crystal display element of this Example 2-3 is similar to that of the above Example 2-1.

The liquid crystal display element is produced in the following manner.

FIG. 21 is a schematic view showing the structure of a production apparatus of the liquid crystal display element.

In the production apparatus, as shown in FIG. 21, a liquid crystal panel 280 filled with the liquid crystal polymer precursor compatible solution is mounted on a base 281 connected to a circulating thermostatic chamber 282, through a reflecting plate 286, so that the surface temperature of the liquid crystal panel 280 is controllably set at a desired temperature. An ultraviolet irradiating apparatus 283 is located over the base 281 so that the liquid crystal panel 280 can be irradiated with ultraviolet through an ultraviolet filter 284 peaking at an absorption wavelength of 350 nm and supported by a support member 285. The reflecting plate 286 is made of aluminum, for example, so that the ultraviolet irradiated by the ultraviolet irradiating apparatus 283 can work effectively.

The liquid crystal panel 280, filled with liquid crystal polymer precursor compatible solution similar to that of Example 2-1, was irradiated with ultraviolet of intensity of 120 mW/cm$^2$ for 30 seconds by use of the production apparatus, to produce the liquid crystal display element. Prior to the irradiation of ultraviolet, a thermal phase separation temperature of the liquid crystal polymer precursor compatible solution was measured with the mettler, the result being 10° C. Accordingly, the irradiation of ultraviolet was made, with the temperature of the liquid crystal panel 280 kept at 18° C. higher than the thermal phase separation temperature by 8° C.

The liquid crystal display element thus produced was measured in respect of the average particle size of the liquid crystal droplets 253; the transition temperature for the orientation pattern to be transformed from the bipolar-form to the radial-form; and the electro-optical characteristics (applied voltage-transmittance characteristic) in the same manner as in Example 2-1, the results being that the transition temperature was as low as 7° C.; and the optical hysteresis under the ambient temperature of 10° C. was as so small as 1.0%. Thus, the liquid crystal display element having a good display capability was obtained.

On the other hand, when the liquid crystal panel 280 was irradiated with ultraviolet under the same conditions, except that the temperature of liquid crystal panel 280 was kept at 12° C. higher than the thermal phase separation temperature by 2° C., to produce a liquid crystal display element, the transition temperature was 18° C. and the optical hysteresis under the ambient temperature of 10° C. was as so large as 15%. Thus, the liquid crystal display element thus produced failed to have a good display capability.

Further, with the liquid crystal panel 280 varied in temperature, the measurements of the transition temperature and the anchoring index were made, the results being as shown in TABLE 2-2. From the same TABLE it is seen that setting the temperature of the liquid crystal panel 280 at a temperature higher than the thermal phase separation temperature by 3–15° C. enables the transition temperature for the orientation pattern to be transformed from the bipolar-form to the radial-form to be reduced and in turn enables the optical hysteresis under low temperatures to be reduced. In addition, setting a 7–12° C. higher temperature can provide similar effects and also enables the liquid crystal droplets to be prevented from increasing in particle size.

TABLE 2-2

Relationship between Polymerization Temperature and Anchoring Index

| No. | Polymerization Temperature (° C.) | ΔT (° C.) | Anchoring Index | Average particle size R of Liquid crystal droplets (μm) | Orientation transition temperature (° C.) | Evaluation |
|---|---|---|---|---|---|---|
| 1 | 12 | 2 | 0.05 | 0.98 | 18 | X |
| 2 | 13 | 3 | 0.6 | 0.99 | 15 | Δ |
| 3 | 16 | 6 | 0.63 | 1.02 | 12 | Δ |
| 4 | 18 | 8 | 0.85 | 1.36 | 7 | ○ |
| 5 | 23 | 13 | 0.97 | 1.49 | 0 | ⊙ |
| 6 | 25 | 15 | 1.0 | 1.70 | −2 | ⊙ |

ΔT = Thermal phase separation temperature (10° C. in common)-Panel temperature at the time of UV irradiation, and Anchoring index = V90 · R/d The intensity of ultraviolet need not be limited to 120 mW/cm$^2$, but a not less than 100 mW/cm$^2$ intensity of ultraviolet can provide similar effects and can contribute to production of uniform elements with little unevenness in particle size caused by scratch defects of the glass substrate and things like that.

Though the time for irradiation of ultraviolet is preferably 30 seconds or less, a longer than 30 seconds irradiation is also acceptable. However, a more than 5 minutes irradiation causes decomposition of liquid crystals to present a challenge for reliability of a retention of voltage and others, so that a shorter than 5 minutes irradiation is desirable.

Absorption wavelength of the ultraviolet filter 284 is not limited to 350 nm. Any suitable absorption wavelength, e.g. 360 nm or 370 nm, may be selected so that the polymer is polymerized properly without causing decomposition of the liquid crystals, allowing for absorption wavelengths of the liquid crystals and polymer.

The interval between the ultraviolet filter and the liquid crystal panel should preferably be set at 1mm or more in order to prevent temperature rise of the liquid crystal panel. On the other hand, in order to prevent ultraviolet from running into the liquid crystal panel from around the ultraviolet filter to hinder the progress of uniform polymerization, the interval should preferably be within 2 cm at maximum. More preferably, the interval should be in the range of 3 mm or more to 1 cm or less to produce the liquid crystal display element capable to surely suppress temperature rise and uniform in the degree of polymerization. Of course, the ultraviolet filter is required to have a larger size than the liquid crystal panel. To be more specific, the ultraviolet filter of for example 1.2 times or more as large as the liquid crystal panel can easily prevent the ultraviolet running into the panel around the filter, though depending on the interval between the filter and the liquid crystal panel.

The reflecting plate made of aluminum is taken as an example, but the reflecting plate may be made of anything of high reflectivity such as aluminum foil and the like.

The circulating thermostatic chamber, which is used for controlling the temperature of the liquid crystal panel, may be structured such that the entirety of the apparatus can be arranged in it. Also, a Peltier element and the like may be used. In addition, the liquid crystal panel may be provided at its each side with a control plate guided from the circulating thermostatic chamber, to make the temperature control from the both sides of the panel. Further, the liquid crystal panel may be provided at a surface thereof with a temperature sensor such as a thermocouple which is in turn connected with a feedback system, the circulating thermostatic chamber or the like, to automate the temperature control. This can facilitate the temperature control of the liquid crystal panel with more accuracy.

Other forming materials and production conditions or requirements may be varied, as described in Example 2-1.

(3) EXAMPLES OF THIRD INVENTIVE GROUP

Described below is the specific content of the invention of the third inventive group. First, a summery of the polymer dispersion type liquid crystal display element directed to the third inventive group is outlined with reference to FIG. 26. Polymer compound 302 and liquid crystal droplets 303 are placed with being dispersed in between glass substrates 300 having transference electrodes 301, and the liquid crystal droplets 303 are scattered in the polymer compound 302 in the island form. The liquid crystal molecules 304 in the liquid crystal droplets 303 take a bipolar-form orientation pattern with two poles in the vicinity of walls of the liquid crystal droplets 303. In FIG. 26, the liquid crystal droplets 303 are illustrated to be individually separated from each other, but some neighboring liquid crystal droplets may be in the form of being jointed to each other with partially contacting with each other. In addition, a polymer network type liquid crystal may be adopted in which the polymer compound 302 is formed into a network form so that the liquid crystal droplets can be held in between the networks.

Description on Examples will be given below.

Example 3-1

Example 3-1 is directed to a polymer dispersion type liquid crystal display element which is structured so that capacitance ratio of the capacitance-voltage characteristics can be 60% or more with a voltage required for the transmittance of the voltage-transmittance characteristics to be 10% or more. This element was produced in the following steps and conditions.

It is noted that the capacitance ratio indicates a value defined by the following expression.

Capacitance ratio %=(capacitance for the case of any selected voltage being applied to the element/a maximum value of the capacitance for the voltage applied to the element)×100

Expression 3-3

Production Conditions (1) 90 wt % of polymerizable monomer (2-ethylhexyl acrylate), 9 wt % of oligomer (Biscoart 828 available from OSAKA ORGANIC CHEMICAL INDUSTRY) and 1wt % of polymerization initiator (Benzyl Methyl Ketal available from NIPPON KAYAKU CO., LTD.) were mixed to produce the polymer precursor mixture. 80 wt % of liquid crystal material of TL205 (available from Merck Japan Limited) was added to 20 wt % of the thus produced mixture to prepare liquid crystal polymer precursor compatible solution.

(2) An alignment layer material was printed on the glass substrate 300 having the transference electrode 301by the printing method and then was cured in an oven to form an insulating film 305.

(3) After a similar insulating film was formed on a glass substrate 306 having a transference electrode 307,the glass substrates 300, 306 were laminated to each other through glass spacers at an interval of 13 μm. OPTOMER AL8534 (available from JAPAN Synthetic Rubber Co., Ltd.) was used as the above alignment layer material. Also, a glass plate 1737 available from CORNING INC. (1.1 mm in thickness) was used as the glass substrate.

(4) The compatible solution was injected in between the laminated substrates (hereinafter it is referred to as "the panel") via a vacuum injection method, to produce a liquid crystal panel.

(5) After a 350 nm filtering filter was laminated on the liquid crystal panel, the temperature of liquid crystal panel (polymerization temperature) was set at 13° C. Then, the panel was irradiated with ultraviolet of intensity of 120 mW/cm$^2$ for 30 seconds to allow the polymerizable monomer to be polymerized, to thereby produce the polymer dispersion type liquid crystal display element of Example 3-1. The intensity of ultraviolet was a value measured at a point on the surface of the panel via an ultraviolet illuminance meter (UV-M02 available from OAK MANUFACTURING CO., LTD.).

Evaluation of the Element

The driving circuit was connected to the element separately, for making measurements of the optical hysteresis and the capacitance hysteresis. The measurements were made under conditions of the applied voltage of 30V at maximum and the frequency of 300 Hz. The temperature range was in the range of 0° C. to 60° C. The measurements were made in the same measuring apparatus and method as those in Example 1-1.

Shown in FIG. 22 is the measurement results under 30° C. As seen from FIG. 22, the voltage to provide a 10% transmittance (a percentage for maximum transmittance quantity) was 4.47V and the capacitance ratio at that voltage was 60%. The optical hysteresis in the process of raised voltage and in the process of dropped voltage at that voltage, when measured, was as small as 1.9%. Further, from the check on the presence and absence of the residual image resulting from the hysteresis via the flash-on-and-off display, it was confirmed that there presented little residual image.

For further detailed measurements on the relationship between the optical hysteresis (%) and the capacitance ratio, similar elements were produced, with an additive having an anchoring strength adjusting capability added to the compatible solution of Example 3-1 or with varied intensity of ultraviolet. These elements were measured in respect of the capacitance ratio and the optical hysteresis in a similar manner to the above.

Shown in TABLE 3-3 are the production conditions as well as the measurement results. The measurement results are plotted in FIG. 27, plotting the optical hysteresis against the capacitance ratio under the transmittance of 10%. It is seen from FIG. 27 that a not more than 2% optical hysteresis requires that the capacitance ratio under the transmittance of 10% be set 60% or more, and a not more than 1% optical hysteresis requires that the capacitance ratio under the transmittance of 10% be set 65% or more.

TABLE 3-3

| No. | Composition of Liquid crystal polymer precursor compatible solution | UV Intensity mW/cm$^2$ | Capacitance ratio (%) | Optical hysteresis |
|---|---|---|---|---|
| 1 | 8.2 wt % of FM108 added (N.B.) | 120 | 64.5 | 1.5 |
| 2 | Example 3-1 | 120 | 60.0 | 1.9 |
| 3 | 2% wt % of HDDA added (N.B.) | 120 | 57.5 | 3.8 |
| 4 | 2 wt % of FM108 added (N.B.) | 250 | 67.0 | 0.8 |

N.B.) Added to the compatible solution of Example 3-1;
HDDA: KARARAD - available from NIPPON KAYAKU CO., LTD.;

TABLE 3-3-continued

| No. | Composition of Liquid crystal polymer precursor compatible solution | UV Intensity mW/cm$^2$ | Capacitance ratio (%) | Optical hysteresis |
|---|---|---|---|---|

FM108: Light Acrylate FM108 - available from KYOEISHA CHEMICAL CO., LTD.;
No. 2 is Example 3-1

Example 3-2

Produced in the Example 3-2 was the polymer dispersion type liquid crystal display element of which capacitance hysteresis Chys under the element driving temperature of 30° C. was not more than 1.5% at maximum. The fact that the produced liquid crystal display element had the above characteristic was confirmed by use of the technique described in Example 3-1. The production was conditioned on the temperature of liquid crystal panel (polymerization temperature) in the phase separation operation being set at 13° C. and on the panel being irradiated with ultraviolet of 120 mW/cm$^2$ for 30 seconds for the phase separation. Other conditions are the same as those of Example 3-1.

Example 3-3

Produced in the Example 3-3 was the polymer dispersion type liquid crystal display element of which capacitance hysteresis Chys in the applied voltage required for the optical hysteresis to become a maximum value under the element driving temperature of 30° C. was not more than 0.2%. The fact that the liquid crystal display element of this Example 3-3 also had the above characteristic was confirmed by the same manner as the above.

The production was conditioned on the temperature of liquid crystal panel (polymerization temperature) in the phase separation operation being set at 17° C. and on the panel being irradiated with ultraviolet of 200 mW/cm$^2$ for 30 seconds for the phase separation. Other conditions are the same as those of Example 3-1.

(Other Matters)

Insulating film forming materials are not necessarily limited to those described in the above Examples, but may include either of those of polyimide type and those of polyamic acid type. Again, inorganic materials including SiO$_2$ may be used. Further, an additive may be used to change the anchoring strength in the above Examples. The additives which may be used include bifunctional monomers such as HDDA (KAYARAD HDDA available from NIPPON KAYAKU CO., LTD.), and some wt % of additives may be added to allow the interface anchoring to increase. On the other hand, some wt % of fluoro-polymerizable-monomer (Light Acrylate FA108 available from KYOEISHA CHEMICAL CO., LTD.) may be used to allow the interface anchoring strength to decrease.

Also, combination of the liquid crystal·polymer composition is not limited to those disclosed in Examples above. Any general combination will do, as long as it can allow the liquid crystal and the polymer to be mixed and also be copolymerized by irradiation of ultraviolet. In this case, the average particle size of the liquid crystal droplets in the range of from not less than 0.8 μm to not more than 2.5 μm can provide the element having an excellent scattering power. In particular, those in the range of from not less than 1 μm to not more than 2 μm can allow the liquid crystal panel to be driven with a low voltage enough to drive the TFT by combining with the panel gap.

The panel gap is not limited to that disclosed in the Examples above, but is simply required to be not less than 5 μm. By letting the panel gap be in the range of from not less than 10 μm to not more than 15 μm, in particular, the driving voltage and the scattering power can be allowed to be compatible.

prepare insulating paint film materials of Example 1 (properly speaking, Example 4-1-1, though abbreviated like this) to the same 5 and of Comparative Example 1 (which is also abbreviated as in the case of the Examples) to the same 2, as shown in TABLE 4-1.

TABLE 4-1

| | Insulating paint film material | | Liquid crystal material | | Threshold characteristics | Response time |
|---|---|---|---|---|---|---|
| | Methylen diamine materials | γ P(20° C.) dyne/cm | Material | γ LC(20° C.) dyne/cm | γ value (20° C.) | (20° C.) ms |
| Compara Ex. 1 | Trimethylene diamine | 27.9 | A | 29.2 | 1.70 | 82.8 |
| Ex. 1 | Hexamethylene diamine | 29.3 | A | 29.2 | 1.98 | 63.2 |
| Ex. 2 | Decamethylene diamine | 32.5 | A | 29.2 | 3.23 | 149.9 |
| Compara Ex. 2 | Hexamethylene diamine | 29.3 | B | 31.6 | 1.58 | 109.9 |
| Ex. 3 | Decamethylene diamine | 32.5 | D | 31.6 | 2.19 | 73.2 |
| Ex. 4 | Hexamethylene diamine | 29.3 | C | 27.3 | 2.51 | 107.3 |
| Ex. 5 | Hexamethylene diamine | 29.3 | D | 29.8 | 1.72 | 68.2 |

The intensity of ultraviolet need not be limited to those disclosed above, but a not less than 100 mW/cm$^2$ intensity of ultraviolet can contribute to production of uniform elements without making scratch defects of the glass substrate and the like prominent. In particular, a not less than 150 mW/cm$^2$ intensity of ultraviolet is effective for reduction in optical hysteresis under high temperatures.

As a substitute for the glass substrates with transference electrodes are used for the upper and lower substrates of the liquid crystal panel in the above Examples, the TFT type liquid crystal display panel in which a number of active matrix elements are formed on the glass substrates may, of course, be used to provide similar effects.

(4) EXAMPLES OF FOURTH INVENTIVE GROUP

Example 4-1

This Example is an example directed to the 65$^{th}$ to 69$^{th}$ aspects of the fourth inventive group.

Poly-L-sodium glutamate, which is an example of polyamino acid derivatives, was first used as a starting material, and carboxyl parts were modified with diamine, whereby various kinds of insulating paint film materials different in surface tension were synthetically prepared in accordance with the following order. First, an 1% aqueous solution, by weight, of Poly-L-sodium glutamate was prepared and then was neutralized with a 10% aqueous solution, by weight, of hydrochloric acid. Thereafter, poly-L-glutamic acid was released therefrom. Then, a 5% solution, by weight, of chloroform containing any one kind of prepared-in-advance methylenediamine materials, including trimethylenediamine, hexamethylenediamine and decamethylenediamine, was added with fully stirred, and the resulting mixed solution was allowed to stand. Then the mixed solution was separated into three layers. The intermediate layer was dispensed out of these separated layers and was dissolved with adding N,N-dimethyl formamide, to The support substrate 411 and 412 forming on an inner surface thereof the transference electrode 413 was prepared, and each of the insulating paint film materials of the Examples and the Comparative Examples was applied on the transference electrode 413 of the support substrate 411 and 412 through the adoption of a spinner coating and then was dried under temperature of 150° C. for 1 hour, to form the insulating paint film 414. The spinner was then conditioned on 500 rpm-10 sec./1500 rpm-30 sec, in either case of which the produced film was about 100 nm in thickness.

Next, the insulating paint films 414 made of the respective insulating paint film materials shown in the Examples and Comparative Examples were measured in respect of the critical surface tension γ p by the Disman plotting method, using a wettability testing agent (available from NAKARAI TESK CO., LTD.). The measurement results on the critical surface tension γ p obtained under the temperature of 20° C. are noted in TABLE 4-1.

Further, four kinds of liquid crystals A–D, which were so prepared as to be different in surface tension γ LC from each other, were prepared and were added to compositions each comprising lauryl acrylate as a matrix form polymer compound forming monomer (available from KYOEISHA CHEMICAL CO., LTD.), M6100 as oligomer (available from TOAGOSEI CO., LTD.) and Irgacure 651 as a photo polymerization initiator (available from CIBA-GEIGY LTD.) with fully stirred, to prepare polymerizable compositions which develop into polymer dispersion type liquid crystals 417. The surface tension γ LC of each of the liquid crystals A–D under the temperature of 20° C. is as shown in TABLE 4-1.

It is proven from combination of the critical surface tensions γ p of the insulating paint films 414 shown in Examples and Comparative Examples and the surface tensions γ LC of the liquid crystals A–D that: the insulating paint film 414 of Comparative Example 1 combined with the liquid crystal A and the insulating paint film 414 of Comparative Example 2 combined with the liquid crystal B (in the following FIGS. they are abbreviated to Compara. 1, Compara. 2) do not meet any one of the conditional expressions ①–③; the insulating paint film 414 of Example 1 combined with the liquid crystal material A and the insulating paint film 414 of Example 3 combined with the liquid crystal B (in the following FIGS. they are abbreviated to Ex. 1, Ex. 3) meet any one of the following conditional expressions ①–③; and the insulating paint film 414 of Example 2 combined with the liquid crystal A and the insulating paint film 414 of Example 4 combined with the liquid crystal C (in the following FIGS. they are abbreviated to Ex. 2, Ex. 4) meet the conditional expression ①, while the insulating paint film 1 of Example 5 combined with the liquid crystal D (in the following FIGS. it is abbreviated to Ex. 5) meets the conditional expression (②) only.

It is noted that meeting the above conditional expression ① means meeting the requirement of $\gamma$ LC–$\gamma$ p<0 (Expression 4-1). Also, it is noted that meeting the conditional expression ② means meeting the requirements of both $\gamma$ LC–$\gamma$ p<0 (Expression 4-1) and –1·dyne/cm<$\gamma$LC–$\gamma$ p (Expression 4-2) or meeting the requirement of 0<$\gamma$ LC–$\gamma$ p<1·dyne/cm (Expression 4-3). Further, it is noted that meeting the conditional expression ③ means meeting the requirements of both $\gamma$ LC–$\gamma$ p<0 (Expression 4-1) and 0<$\gamma$ LC–$\gamma$ p>1·dyne/cm (Expression 4-3). (The above definitions are also applied to the following.).

Further, the prepared polymerizable compositions were fully stirred and thereafter were injected in empty cells (not shown) separately arranged in the inside of a closed container comprising a pair of opposing substrates 411. Then, the resulting cells were irradiated with ultraviolet of 365 nm (about 25 mW/cm$^2$) for 100 seconds under the temperature of 20° C. The polymerizable compositions in the respective empty cells were then polymerized by the irradiation of ultraviolet to grow into the polymer dispersion type liquid crystals 417, resulting in completion of the liquid crystal display elements each having a main structure shown in FIG. 28.

The liquid crystal display elements formed in accordance with the above-described steps were each measured in respect of the $\gamma$ value showing steepness of the threshold and the response time, the measurement results being as shown in TABLE 4-1 and FIGS. 29 and 30. FIG. 29 is a graph showing the relationship among the subtraction results of $\gamma$ LC–$\gamma$ p, the $\gamma$ value and the response time, and FIG. 30 is a graph showing the relationship between the $\gamma$ value and the response time.

Specifically, the measurement results shows that Comparative Example 1 presented the $\gamma$ value, showing steepness of the threshold, of 1.70 and the response time of 82.8 ms; Example 1 presented the $\gamma$ value of 1.98 and the response time of 63.2 ms; Example 2 presented the $\gamma$ value of 3.23 and the response time of 149.9 ms; Comparative Example 4 presented the $\gamma$ value of 1.58 and the response time of 109.9 ms; Example 3 presented the $\gamma$ value of 2.19 and the response time of 73.2 ms; Example 4 presented the $\gamma$ value of 2.51 and the response time of 107.3 ms; and Example 5 presented the $\gamma$ value of 1.72 and the response time of 68.2 ms. Then, the measurement results show that Comparative Example 2 did not present improved response time, nor did Examples 2 and 4 present improved response time due to the $\gamma$ value increasing so excessively. In contrast to this, Examples 1 and 3 meeting all of the above conditional expressions ①–③ and Example 5 meeting the conditional expression ② presented considerably improved response time as a consequence of optimization of the $\gamma$ value.

Further, it is particularly noted from the measurement results that good response time was provided in Example 1 presenting the $\gamma$ value, showing steepness of the threshold, of 1.98 and Example 3 presenting the $\gamma$ value of 2.19. In Examples 2 and 4 meeting the conditional expression ①, apparently the response time was not improved so much, but temperature dependency was improved as discussed later. Also, the measurement results at that time showed that Comparative Example 1 presented improved response time due to the optimization of the $\gamma$ value, but presented no improvement of temperature dependency, as discussed later.

Next, the liquid crystal display elements of Examples were measured in respect of temperature dependencies including driving voltage, the result being as shown in TABLE 4-2 and FIG. 31. FIG. 31 is a graph showing a relationship between the subtraction result of $\gamma$ LC–$\gamma$ p and $\Delta$ V which is indexing value for expressing the temperature dependency. The indexing value of $\Delta$ V was determined by:

$$\Delta V(\%) = \{(V\,MAX - V\,MIN)/V30\} \times 100, \quad \text{(Expression 4-6)}$$

where V30 is the driving voltage of the liquid crystal display element under the temperature of 30° C., and V MAX and V MIN are the highest driving voltage and the lowest driving voltage of the driving voltages under the temperatures of 20° C., 30° C. and 40° C., respectively. This evaluation shows that the smaller the $\Delta$ V, the better the temperature dependency.

TABLE 4-2

|  | 20° C. V90 | 30° C. V90 | 40° C. V90 | $\Delta$V (%) |
|---|---|---|---|---|
| Compara. 1 | 10.45 | 9.85 | 8.32 | 21.62 |
| Ex. 1 | 11.45 | 12.71 | 11.98 | 9.91 |
| Ex. 2 | 19.99 | 20.27 | 20.51 | 2.56 |
| Compara. 2 | 10.20 | 8.75 | 6.87 | 38.05 |
| Ex. 3 | 13.55 | 14.42 | 13.03 | 9.63 |
| Ex. 4 | 18.05 | 18.77 | 19.34 | 6.87 |
| Ex. 5 | 12.22 | 13.50 | 13.00 | 9.48 |

The results showed that Comparative Example 1 presented the $\Delta$ V of 21.62% and Comparative Example 2 presented the $\Delta$ V of 38.05%, so both of them failed to provide good temperature dependency. On the other hand, Examples 1 and 3, both meeting all of the conditional expressions ①–③, presented the $\Delta$ V of 9.91% and 9.63%, respectively; Examples 2 and 4, both meeting the conditional expression ①, presented 2.56% and 6.87%; and Example 5, meeting the conditional expression ②, presented 9.48%, from which it is seen that all Examples ensured good temperature dependency. Further, it is also seen from the result that Examples 2 and 4 comprising an insulating paint film made of an insulating paint film material capable of meeting the above conditional expression ① provided considerably improved temperature dependency. The measurements on the response time and the temperature dependency were made by use of LCR-5000 available from OTSUKA ELECTRONICS CO., LTD..

Incidentally, the insulating paint film materials which may be used include poly-L-sodium glutamate, which is an example of polyamino acid derivatives, used in the Examples, though need not be limited thereto, of course. Specifically, the insulating paint film materials which may be used include polyamino acid itself or other polyamino acid derivatives including polyaspartic acid polyhistidine, polyarginine, polylysine and polyalanine; proteins including particularly myoglobin, haemoglobin, globulin, chymotrypsin and albumin which are polymer compounds with amino acid residue bonded thereto through peptide; and polyimide base materials.

On the other hand, the oligomers and the monomers for forming the polymer compound of matrixform are simply required to be polymerized by light or heat in the presence of polymerization initiators. The oligomers which may be used include polyurethane acrylate, polyester acrylate and epoxy acrylate.

The monomers which may be used include not only commercially available acrylic base monomers, such as 2-ethylhexyl acrylate, 2-hydroxyethyl acrylate, neopentyl glycol diacrylate, hexanedioldiacrylate, diethylene glycol diacrylate, tripropylene glycol diacrylate, polyethylene glycol diacrylate and trimethylolpropane triacrylate but also commercially available ones other than the acrylic base monomers. In addition, the polymerization initiator used is not limited to Irgacure 651 but may be selectively combined with Darocure 1173, Darocure 4265 and Irgacure 184 available from CIBA-GEIGY LTD.

Furthermore, the insulating film need not be limited to the paint film, as long as it can provide insulation. For example, a film attached to the electrode by other suitable means, such as a deposited film, may be used.

Similarly, the counter substrate, the electrode and the insulating paint film need not be precisely identical in size, shape and material to their counterparts, of course.

Example 4-2

This Example is an example directed to the $60^{th}$ aspect to the $77^{th}$ aspect of the fourth inventive group.

FIG. 32 is a schematic illustration of the structure in section of the polymer dispersion type liquid crystal element of this Example, which is not essentially different from FIG. 28 concerning Example 4-1. In the FIG., 411 denotes a counter substrate, on which a transference electrode 413 and an insulating paint film 414 are formed. 412 denotes a glass substrate, on which TFT (not shown), the transference electrode 413 and the insulating film 414 are formed. Injected in a space between the counter substrate 411 and the glass substrate 412 is the polymer liquid crystal material complex 417, which has a structure of the droplets 416 of liquid crystal being dispersed in the polymer compound 415.

In FIG. 32, droplets 416 of the liquid crystal are independently interspersed in an island form in the polymer compound 415, but are not so limited but is susceptible to various forms. For example, the liquid crystal droplets interspersed may be partially associated in series with neighboring droplets. Alternatively, the polymer compound 415 may be formed into a network form, in the networks of which the liquid crystal droplets are held with interspersed.

The above-described polymer dispersion type liquid crystal element was produced in the following manner.

(1) 60% of polymerizable monomer (2-ethylhexyl acrylate), 39% of polymerizable oligomer having imino group (Urethane acrylate; M-1600 available from TOAGOSEI CO., LTD.) and 1% of Benzyl Methyl Ketal as polymerization initiator (available from NIPPON KAYAKU CO., LTD.) were mixed, to form the polymer precursor solution. Then, 80% of liquid crystal material having a 30 dyne/cm surface tension γ LC (MT5524 available from CHISSO PETROCHEMICAL CORPORATION) as measured by a hanging drop method (24° C.) was added to 20% of the thus obtained polymer precursor solution, to produce liquid crystal polymer precursor-compatible solution.

(2) On the other hand, the transference electrode 413, a source line, a gate line and others were provided for the glass substrate 412 of the 1737 substrate (1.1 mm in thickness) available from CORNING INC. through the techniques of vacuum deposition and etching to thereby produce an active matrix substrate. Further, OPTOMER AL8534 (available from JAPAN Synthetic Rubber Co., Ltd.) was printed on the substrate and then was cured in an oven, to form insulating paint film 414 thereon.

(3) After the insulating film 414 was formed on the counter substrate 411 having the transference electrode 413 in a similar manner, the glass substrate 412 and the counter substrate 411 were laminated to each other through glass spacers at an interval of 13 μm.

(4) The polymer precursor-liquid crystal mixture was injected in between the laminated substrates and thereafter was irradiated with ultraviolet of 365 nm in wavelength and 95 mW/cm² in intensity to allow the polymerizable polymer precursor (monomer and oligomer) to be polymerized. By doing this, the polymer dispersion type liquid crystal display element arranging therein polymer-liquid crystal complex in which the liquid crystal droplets are dispersed in the polymer compound was completed.

Next, a power source was connected to the polymer dispersion type liquid crystal element thus produced, and a voltage was applied across the counter electrode and the pixel electrode through the drive of TFT to make measurements on the temperature dependency of the voltage-optical characteristics. To be more specific, letting V90% be an applied voltage required for the panel transmittance to become 90%, values on the V90% were measured under temperatures −10° C., 0° C., 10° C., 20° C., 30° C., 40° C., 50° C. and 60° C. The panel transmittance was measured by use of a liquid crystal evaluating apparatus (LCD5000 available from OTSUKA ELECTRONICS CO., LTD.).

Then, the temperature dependency index Δ V in Expression 4-7 shown below was defined to make evaluations on the panel transmittance characteristics in their relation with the temperatures through the uses of the measured values on the V90%. In Expression 4-7, Vmax represents a maximum value of V90% under temperature in the range of from 0° C. to 60° C.; Vmin represents a minimum value of V90% under temperature in the range of from −10° C. to 60° C.; and $^{30}$V90% represents the value of V90% under the temperature of 30° C.

$$\Delta\ V = (V\text{max} - V\text{min})/{}^{30}V90\% \qquad \text{Expression 4-7}$$

On the other hand, the measurements on the critical surface tension γ P of the polymer compound forming the polymer-liquid crystal complex of the polymer dispersion type liquid crystal display element thus produced were made, to determine a holding relationship between the critical surface tension γ P and the surface tension γ LC.

The measurements of the critical surface tension γ P of the polymer compound were made in the following manner. First, the counter substrate 411 was peeled off from the polymer dispersion type liquid crystal element, and then the polymer compound was washed with isopropyl alcohol to eliminate the liquid crystals from its surface and dried by blowing nitrogen against it. Thereafter, five different kinds of wettability indexing standard solutions (available from NAKARAI TESK CO., LTD.) Nos. 31, 34, 37, 42 and 46 were dropped on the washed surface of the polymer compound to measure the contact angles θ. Then, laying off cos θ as abscissa and a surface tension γ of the wettability indexing standard solution as ordinate, γ to take cos θ=1 is determined and the γ is defined as the critical surface tension γ P (Disman plotting method). The measurements on the critical surface tension γ P of the polymer compound and the surface tension γ LC of the liquid crystal were made with an automatic measuring apparatus available from KYOWA KAIMEN CHEMICAL CO., LTD.

(Result)

The measurement result on the V90% is shown in FIG. 33, and the measurements on the temperature dependency index Δ V, the surface tension of the liquid crystal and the critical surface tension γ P of the polymer compound are shown in TABLE 4-3 given below. It is to be noted that the characteristic feature of the liquid crystal display element of this Example is in that the liquid crystal having the 30 dyne/cm surface tension and the polymerizable oligomer (urethane acrylate) having imino group having 32 dyne/cm critical surface tension γ P are used in combination.

Example 2-1

As evident from the results shown in TABLE 4-3 given below and FIG. 33, according to the liquid crystal display element of Example 2-1 (properly speaking, Example 4-2-1, though abbreviated like this), the γ P>γ LC held between the critical surface tension γ P of the polymer compound and the surface tension γ LC of the liquid crystal. In addition, it was found that a V90%-Temperature curve peaked at the vicinity of 22° C. and the temperature dependency index was as small as 0.21.

TABLE 4-3

| | Critical surface tension of polymer compound γ P (dyne/cm) | Surface tension of liquid crystal γ LC (dyne/cm) | Temperature dependency index ΔV |
|---|---|---|---|
| Compara. 2-1 | 32 | 30 | 0.21 |
| Ex. 2-2 | 31 | 30 | 0.25 |
| Ex. 2-3 | 31 | 30 | 0.22 |
| Compara. 2-4 | 33 | 30 | 0.22 |
| Ex. 2-5 | 32 | 30 | 0.25 |
| Ex. 2-6 | 32 | 30 | 0.22 |
| Compara. 1 | 25 | 30 | 0.50 |

Example 2-2

Except that M-1200 (Urethane acrylate) (available from TOAGOSEI CO., LTD.) was used as the polymerizable oligomer having imino group, the polymer dispersion type liquid crystal display element was produced in a similar manner to in the above said Example 2-1, and the same measurements as those in the Example 2-1 were made. The measurement results are shown in FIG. 34 and TABLE 4-3 given above.

(Result)

As seen from TABLE 4-3 above, the critical surface tension γ P of the polymer compound was 31 dyne/cm and the γ P>γ LC held in this Example 2-2 also. Also, according to the liquid crystal display element of this Example 2-2, the V90% increased as temperature rose, but the temperature dependency index was as small as 0.25, making little difference over that of the above Example 1, as seen from the results shown in TABLE 4-3 and FIG. 34.

The characteristic feature of the liquid crystal display element according to this Example 2-2 is in that M-1200 available from TOAGOSEI CO., LTD. was used. The difference between M-1200 and the M-1600 used in the above Example 1 is in that M-1200 has a different chemical structure expressed by chemical formula 1 in R, R' and polyol and has a higher molecular weight.

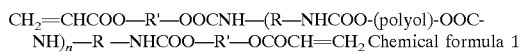

CH$_2$=CHCOO—R'—OOCNH—(R—NHCOO-(polyol)-OOC-NH)$_n$—R —NHCOO—R'—OCOCH=CH$_2$ Chemical formula 1 where n=an integer.

Example 2-3

Except that the polymerizable oligomer having hydroxyl group (Urethane acrylate; M-233 available from TOAG-OSEI CO., LTD.) was used, all were the same as those in Example 2-1 above. The same measurements as in Example 2-1 above were made. The results are shown in FIG. 35 and TABLE 4-3 given above.

(Result)

As seen from TABLE 4-3 above, the critical surface tension γ P of the polymer compound was 31 dyne/cm and the γ P>γ LC held in this Example 2-3 also. Also, as seen from the results shown in TABLE 4-3 and FIG. 35, the V90%-temperature curve peaked around 15° C. On the other hand, the temperature dependency index was as small as 0.22, making little difference over that of the above Example 1. The characteristic feature of the liquid crystal display element according to this Example 2-3 is in the use of the polymerizable oligomer having hydroxyl group.

Example 2-4

Except that the polymerizable oligomer having imino group (Urethane acrylate; UF-8001 available from Kyoeisha Kagaku Kogyo K.K.) was used, all were the same as those in Example 1 above. The dispersion type liquid crystal display element was produced and the same measurements were made as in Example 2-1. The measurement results are shown in FIG. 36 and TABLE 4-3 given above.

(Result)

As seen from TABLE 4-3 above, the critical surface tension γ P of the polymer compound was 33 dyne/cm and the γ P>γ LC held in this Example 2-4 also. Also, as seen from the results shown in TABLE 4-3 and FIG. 36, the V90%-temperature curve of Example 2-4 shows a rising higher pattern that as temperature rose, the V90% increases, as in the case with the above Example 2-2, but the temperature dependency index was 0.22 of smaller than that of the above Example 2.

Example 2-5

Except that the polymerizable monomer having hydroxyl group (Monofunctional acrylate; M-5700 available from TOAGOSEI CO., LTD.) was used and the polymerizable oligomer having hydroxyl group (Polyester acrylate); M-6100 available from TOAGOSEI CO., LTD.) was used as the polymerizable oligomer, the polymer dispersion type liquid crystal display element was produced in the same manner as in Example 2-1, and the same measurements were made as in Example 2-1. The results are shown in FIG. 37 and TABLE 4-3 given above.

(Result)

As seen from TABLE 4-3 above, the critical surface tension γ P of the polymer compound was 32 dyne/cm and the γ P>γ LC held in this Example 2-5 also. Also, as seen from the results shown in TABLE 4-3 and FIG. 37, the V90%-temperature curve of this Example 2-5 showed a gently curving pattern having a minimum value at the vicinity of 30° C., while on the other hand, the temperature dependency index was as relatively small as 0.25.

Example 2-5

Except that the polymerizable monomer having carboxyl group (Monofunctional acrylate; M-5400 available from TOAGOSEI CO., LTD.) was used and the M-6100 available from TOAGOSEI CO., LTD. was used as the polymerizable oligomer as in the case of Example 2-5, all were the same as those in Example 2-1 above. The same measurements as those in Example 1 were made. The measurement results are shown in FIG. 38 and TABLE 4-3 given above.

(Result)

As seen from TABLE 4-3 above, the critical surface tension γ P of the polymer compound was 32 dyne/cm and the γ P>γ LC held in this Example 2-6 also. Also, as seen from the results shown in TABLE 4-3 and FIG. 37, the V90%-temperature curve of Example 2-6 showed a similar pattern to that of the above Example 2-5, but the temperature dependency index was 0.22 of smaller than that of Example 2-5.

Comparative Example 2-1

Except that the oligomer having no polar group (1,6 hexanedioldiacrylate; Biscourt #230 available from OSAKA ORGANIC CHEMICAL INDUSTRY) was used, the polymer dispersion type liquid crystal display element was produced in a similar manner to in the abovesaid Example 2-1, and the same measurements as those in the Example 2-1 were made. The measurement results are shown in TABLE 4-3 above and FIG. 39.

(Result)

The characteristic feature of the liquid crystal display element of Comparative Example 2-1 is in that the polymer compound has no polar group. As seen from TABLE 4-3 above, the critical surface tension γ P of the polymer compound was 25 dyne/cm and the γ P>γ LC did not hold in this Comparative Example 2-1.

Also, according to this Comparative Example 2-1, V90% decreased as temperature rose, as shown in FIG. 39, and the temperature dependency index was as so large as 0.50. This means that since the liquid crystal display element according to Comparative Example 2-1 is high in temperature dependency, the stable display cannot be presented when temperature varies.

It can be confirmed from comparison between the results of Example 2-1 through Example 2-6 and the results of Comparative Example 2-1 that when the γ P>γ LC holds between the critical surface tension γ P of the polymer compound and the surface tension γ LC of the liquid crystal, the liquid crystal display element low in temperature dependency is presented. It should be noted that when the γ P>γ LC does not hold between the critical surface tension γ P and the surface tension γ LC of the liquid crystal the temperature dependency of light transmission of the liquid crystal display element increases, which is thought to be because the interface polymer/liquid crystal becomes so unstable in energy that the phase transition may be caused between the bipolar form and the radial form. From this point of view, it is desirable that the relation of γ P>γ LC always hold in the operating temperature range of the liquid crystal display element.

(Other Matters)

Acrylate base polymerizable materials or methacrylate base polymerizable materials are generally used in view of their having a similar refractive index to an ordinary index of the liquid crystal to provide a high transmittance and their rapid polymerization reaction, though need not be limited thereto. Epoxy base glycelinediglycidyl ether may be used, for example.

The insulating film used may also be selected from either of a polyimide type one and a polyamic acid type one without being limited to those disclosed above. Also, an inorganic insulating film may be used. The insulating film used provides the effect of enhancing the retention of voltage.

Example 4-3

Example 4-3 is an example directed to the 65$^{th}$ to 77$^{th}$ aspects of the fourth inventive group.

After insulating paint films (critical surface tension γ P=32.5 dyne/cm) made of poly-L-glutamic acid modified with decamethylene diamine were respectively formed on a pair of upper and lower support substrates each having an electrode, the upper and lower support substrates were bonded together through spacers at an interval of 13 μm, with the insulating films confronting each other, to complete an empty cell. Then, 0.80 g of liquid crystal material having a 30 dyne/cm surface tension as the liquid crystal material, 0.60 g of 2 ethylhexyl acrylate (available from NAKARAI TESK CO., LTD.) as the polymer forming monomer, 0.39 g of M1600 (available from TOAGOSEI CO., LTD.) as the oligomer material, and 0.01 g of Benzyl Dimethyl Ketal (available from NIPPON KAYAKU CO., LTD.) were prepared and fully stirred and then were injected into the empty cell. After completion of the injection, the resultant cell was irradiated with ultraviolet of 365 nm (95MW/cm$^2$) under the temperature of 20° C. for 100 seconds, to complete the liquid crystal display element composed of polymer dispersion type liquid crystal in which liquid crystals are dispersed in the polymer matrix.

The critical surface tension of the polymer matrix was measured by the following technique.

The two opposing substrates were peeled off from the liquid crystal display element, and then the polymer matrix was washed with isopropyl alcohol to eliminate the liquid crystals from its surface and dried by blowing nitrogen against it. Thereafter, the critical surface tension was determined in the Disman plotting method through the use of a wettability indexing testing agent (available from NAKA-RAI TESK CO., LTD.). The critical surface tension of the polymer matrix thus determined was 32 dyne/cm.

Next, the liquid crystal display element thus produced was measured in respect of temperature dependency of the driving voltage with the liquid crystal evaluation apparatus of LCD5000 available from OTSUKA ELECTRONICS CO., LTD.

The temperature dependency was evaluated with the value of Δ V calculated by Expression 6 as the index.

This index indicates that the smaller the Δ V, the better the temperature dependency.

The liquid crystal display element produced this time presented the driving voltages of 9.8 V under 20° C.; 9.8 V under 30° C.; and 9.7V under 40° C., and it follows that Δ V is 1.02%. This shows that the liquid crystal display element with improved temperature dependency was achieved.

$$\Delta\ V=((V\mathrm{max}-V\mathrm{min})/^{30}V90\%)\times 100 \qquad \text{Expression 4-6}$$

CAPABILITIES OF EXPLOITATION IN INDUSTRY

As described above, according to the present invention, a liquid crystal display element, in which a polymer dispersion type liquid crystal, in which liquid crystal droplets are dispersed and held in a continuous phase of matrix comprising polymer compound or are dispersed and held in networks of a three dimensional network form of matrix comprising polymer compound, is sandwiched between a pair of substrates each having an electrode at the inside thereof, wherein the liquid crystal droplets are formed to be substantially identical in shape and size, with minimized variations in particle diameter, so that the liquid crystal droplets can be stably kept in the bipolar orientation pattern within a wide temperature range, to minimize hysteresis of transmittance of light to a voltage applied across the electrodes.

Similar effects can be produced by tilt angles of liquid crystal molecules in the vicinity of interface between the liquid crystal droplets and the polymer compound being minimized or by anchoring strength being increased, by adding an interfacial restrictive force controlling material to a liquid crystal polymer precursor compatible solution or raising a temperature under which polymerization of polymers and phase separation between the polymer and the liquid crystal are performed by irradiation of ultraviolet.

Further, similar effects can be produced by the capacitance hysteresis being minimized or by the ratio of capacitance for the voltage to provide a not less than 10% transmittance of a voltage-transmittance characteristic being controlled to be not less than 60%.

Also, an improved response to electric field can be provided within a wide operation temperature range by allowing surface tension of liquid crystal material to be smaller than critical surface tension of an insulating film or surface tension of the polymer compound.

Accordingly, the liquid crystal display element according to the invention is available for forming displays, such as television sets and personal computers, capable of displaying moving pictures and the like within a wide operation temperature range, so that significance in industry of the present invention is great.

What is claimed is:

1. A polymer dispersion type liquid crystal display element in which a polymer dispersion type liquid crystal is sandwiched between a pair of substrates each having an electrode at the inside thereof, wherein said polymer dispersion type liquid crystal is such that liquid crystal droplets are dispersed and held in a continuous phase of matrix comprising polymer compound or are dispersed and held in networks of a three dimensional network form of matrix comprising polymer compound, wherein liquid crystal molecules in said liquid crystal droplets present a bipolar-form orientation pattern having at least two poles in the vicinity of interfaces between said liquid crystal droplets and said polymer compound, while no voltage is applied to said electrodes, and wherein, where a clear point transition temperature of said liquid crystal is let be Tni, said bipolar-form orientation pattern is maintained at least when an operating temperature of said element falls in the range of from 5° C. to (Tni−5)° C.

2. A polymer dispersion type liquid crystal display element as set forth in claim 1, wherein tilt angles of said liquid crystal molecules, in the vicinity of interfaces between said liquid crystal droplets and said polymer compound, to said interfaces are not more than 10 degrees, while no voltage is applied to said electrodes.

3. A polymer dispersion type liquid crystal display element as set forth in claim 1, wherein said bipolar-form orientation pattern is maintained under an operating temperature of said element falling in the range of from 0° C. to (Tni−5)° C.

4. A polymer dispersion type liquid crystal display element as set forth in claim 3, wherein tilt angles of said liquid crystal molecules, in the vicinity of interfaces between said liquid crystal droplets and said polymer compound, to said interfaces are not more than 10 degrees, while no voltage is applied to said electrodes.

5. A polymer dispersion type liquid crystal display element as set forth in claim 1, wherein said bipolar-form orientation pattern is maintained under an operating temperature of said element falling in the range of from −5° C. to (Tni−5)° C.

6. A polymer dispersion type liquid crystal display element as set forth in claim 5, wherein tilt angles of said liquid crystal molecules, in the vicinity of interfaces between said liquid crystal droplets and said polymer compound, to said interfaces are not more than 10 degrees, while no voltage is applied to said electrodes.

7. A polymer dispersion type liquid crystal display element as set forth in claim 1, wherein said liquid crystal droplets located in all areas except an area in the vicinity of interfaces between said substrates and said polymer dispersion type liquid crystal are substantially identical to each other in shape and size.

8. A polymer dispersion type liquid crystal display element as set forth in claim 7, wherein variations in size of said liquid crystal droplets are within 10%.

9. A polymer dispersion type liquid crystal display element as set forth in claim 1, wherein said liquid crystal droplets located in all areas except an area in the vicinity of interfaces between said substrates and said polymer dispersion type liquid crystal are substantially identical to each other in shape and size, and wherein tilt angles of said liquid crystal molecules, in the vicinity of interfaces between said liquid crystal droplets and said polymer compound, to said interfaces are not more than 10 degrees, while no voltage is applied to said electrodes.

10. A polymer dispersion type liquid crystal display element as set forth in claim 1, wherein said polymer compound comprises polymers including monofunctional acrylate and/or multifunctional acrylate.

11. A polymer dispersion type liquid crystal display element as set forth in claim 10, wherein said monofunctional acrylate is isostearyl acrylate; and said multifunctional acrylate is at least one material selected from the group consisting of triethylene glycol diacrylate, PEG#200 diacrylate, PEG#400 diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

$$CH_2=CHCOO—R'—OOCNH—(R—NHCOO-(polyol)-OOC-NH)_n—R—NHCOO—R'—OCOCH=CH_2 \quad \text{Chemical formula 1}$$

where n=an integer.

12. A polymer dispersion type liquid crystal display element in which a polymer dispersion type liquid crystal is sandwiched between a pair of substrates each having an electrode at the inside thereof, wherein said polymer dispersion type liquid crystal is such that liquid crystal droplets are dispersed and held in a continuous phase of matrix comprising polymer compound or are dispersed and held in networks of a three dimensional network form of matrix comprising polymer compound, and wherein a value of (V90×R)/d is 0.7 or more, where V90 is an applied voltage required for transmittance of a voltage-transmittance characteristic of said polymer dispersion type liquid crystal display element to become 90% under 30° C. of the temperature of element; d is an interval between said pair of substrates; and R is an average particle size of said liquid crystal droplets.

13. A polymer dispersion type liquid crystal display element as set forth in claim 12, wherein liquid crystal molecules in said liquid crystal droplets present a bipolar-form orientation pattern having at least two poles in the vicinity of interfaces between said liquid crystal droplets and said polymer compound.

14. A polymer dispersion type liquid crystal display element as set forth in claim 13, wherein tilt angles of said liquid crystal molecules, in the vicinity of interfaces between said liquid crystal droplets and said polymer compound, to said interfaces are not more than 10 degrees, while no voltage is applied to said electrodes.

15. A polymer dispersion type liquid crystal display element as set forth in claim 13, wherein, where a clear point transition temperature of said liquid crystal is let be Tni, said bipolar-form orientation pattern is maintained at least when operating temperature of said element falls in the range of from 5° C. to (Tni–5)° C.

16. A polymer dispersion type liquid crystal display element as set forth in claim 15, wherein tilt angles of said liquid crystal molecules, in the vicinity of interfaces between said liquid crystal droplets and said polymer compound, to said interfaces are not more than 10 degrees, while no voltage is applied to said electrodes.

17. A polymer dispersion type liquid crystal display element as set forth in claim 13, wherein, where a clear point transition temperature of said liquid crystal is let be Tni, said bipolar-form orientation pattern is maintained at least when an operating temperature of said element falls in the range of from 0° C. to (Tni–5)° C.

18. A polymer dispersion type liquid crystal display element as set forth in claim 17, wherein tilt angles of said liquid crystal molecules, in the vicinity of interfaces between said liquid crystal droplets and said polymer compound, to said interfaces are not more than 10 degrees, while no voltage is applied to said electrodes.

19. A polymer dispersion type liquid crystal display element as set forth in claim 13, wherein, where a clear point transition temperature of said liquid crystal is let be Tni, said bipolar-form orientation pattern is maintained when an operating temperature of said element falls in the range of from –5° C. to (Tni–5)° C.

20. A polymer dispersion type liquid crystal display element as set forth in claim 19, wherein, tilt angles of said liquid crystal molecules, in the vicinity of interfaces between said liquid crystal droplets and said polymer compound, to said interfaces are not more than 10 degrees, while no voltage is applied to said electrodes.

21. A method for producing a polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein liquid crystal molecules in said liquid crystal droplets present a bipolar-form orientation pattern having at least two poles in the vicinity of interfaces between said liquid crystal droplets and said polymer compound, while no voltage is applied to said electrodes, and wherein, where a clear point transition temperature of said liquid crystal used of said polymer dispersion type liquid crystal display element is let be Tni, said bipolar-form orientation pattern is maintained under an operating temperature of said element falling in the range of from 5° C. to (Tni–5)° C., said method comprising the step that under the condition that said liquid crystal polymer precursor compatible solution including liquid crystal and polymer precursor placed between said pair of substrates is kept at a higher temperature than a thermal phase separation temperature of said liquid crystal polymer precursor compatible solution, said liquid crystal polymer precursor compatible solution is irradiate with ultraviolet to allow said liquid crystal and said polymer compound to be phase-separated from each other.

22. A method for producing a polymer dispersion type liquid crystal display element as set forth in claim 21, wherein said temperature of said liquid crystal polymer precursor compatible solution is rendered higher than said thermal phase separation temperature of said liquid crystal polymer precursor compatible solution by 2 to 15° C. and also said intensity of ultraviolet irradiation is set at not less than 100 mW/cm$^2$.

23. A method for producing a polymer dispersion type liquid crystal display element as set forth in claim 21, wherein said temperature of said liquid crystal polymer precursor compatible solution is rendered higher than said thermal phase separation temperature of said liquid crystal polymer precursor compatible solution by 6 to 13° C. and also said intensity of ultraviolet irradiation is set at 160 mW/cm$^2$ to 400 mW/cm$^2$.

24. A method for producing a polymer dispersion type liquid crystal display element as set forth in claim 21, wherein said liquid crystal polymer precursor compatible solution includes monofunctional acrylate and/or multifunctional acrylate.

25. A method for producing a polymer dispersion type liquid crystal display element as set forth in claim 24, wherein said monofunctional acrylate is isostearyl acrylate; and said multifunctional acrylate is at least one material selected from the group consisting of triethylene glycol diacrylate, polyethylene glycol (molecular weight 200) diacrylate, polyethylene glycol (molecular weight 400) diacrylate, neopentyl glycol diacrylate, 1,6-hexandiol diacrylate, trimethylolpropane triacrylate, pentaerythlytoltriacrylate, and bifunctional urethane acrylate expressed by the chemical formula 1 given below:

$$CH_2=CHCOO-R'-OOCNH-(R-NHCOO-(polyol)-OOC-NH)_n-R-NHCOO-R'-OCOCH=CH_2 \quad \text{Chemical formula 1}$$

where n=an integer.

26. A polymer dispersion type liquid crystal display element in which a polymer dispersion type liquid crystal is sandwiched between a pair of substrates each having an electrode at the inside thereof, said polymer dispersion type liquid crystal being such that liquid crystal droplets are dispersed and held in a continuous phase of matrix comprising polymer compound or are dispersed and held in networks of a three dimensional network form of matrix comprising polymer compound, wherein said polymer dispersion type liquid crystal display element is so constructed that when capacitance ratio of said element is defined by Expression 3-3 given below, said capacitance ratio becomes 60% or more for a voltage required for light transmittance of said element to become 10% or more:

Capacitance ratio=(capacitance for the case of any selected voltage being applied to the element/a maximum capacitance for the applied voltage)×100 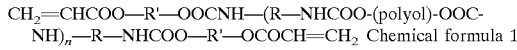 Expression 3-3.

27. A polymer dispersion type liquid crystal display element as set forth in claim 26, wherein said maximum applied voltage is 10V or more.

28. A polymer dispersion type liquid crystal display element as set forth in claim 2, wherein said polymer compound comprises polymers containing a monofunctional acrylate, a multifunctional acrylate, or mixtures thereof.

29. A polymer dispersion type liquid crystal display element as set forth in claim 3, wherein said polymer compound comprises polymers containing a monofunctional acrylate, a multifunctional acrylate, or mixtures thereof.

30. A polymer dispersion type liquid crystal display element as set forth in claim 4, wherein said polymer compound comprises polymers containing a monofunctional acrylate, a multifunctional acrylate, or mixtures thereof.

31. A polymer dispersion type liquid crystal display element as set forth in claim 5, wherein said polymer compound comprises polymers containing a monofunctional acrylate, a multifunctional acrylate, or mixtures thereof.

32. A polymer dispersion type liquid crystal display element as set forth in claim 6, wherein said polymer compound comprises polymers containing a monofunctional acrylate, a multifunctional acrylate, or mixtures thereof.

33. A polymer dispersion type liquid crystal display element as set forth in claim 7, wherein said polymer compound comprises polymers containing a monofunctional acrylate, a multifunctional acrylate, or mixtures thereof.

34. A polymer dispersion type liquid crystal display element as set forth in claim 8, wherein said polymer compound comprises polymers containing a monofunctional acrylate, a multifunctional acrylate, or mixtures thereof.

35. A polymer dispersion type liquid crystal display element as set forth in claim 9, wherein said polymer compound comprises polymers containing a monofunctional acrylate, a multifunctional acrylate, or mixtures thereof.

36. A method for producing a polymer dispersion type liquid crystal display element as set forth in claim 22, wherein said liquid crystal polymer precursor compatible solution includes a monofunctional acrylate, a multifunctional acrylate, or mixtures thereof.

37. A method for producing a polymer dispersion type liquid crystal display element as set forth in claim 23, wherein said liquid crystal polymer precursor compatible solution includes a monofunctional acrylate, a multifunctional acrylate, or mixtures thereof.

* * * * *